(12) United States Patent
Lundberg

(10) Patent No.: US 12,380,171 B2
(45) Date of Patent: Aug. 5, 2025

(54) PATENT MAPPING

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

(21) Appl. No.: 17/103,870

(22) Filed: Nov. 24, 2020

(65) Prior Publication Data

US 2021/0149969 A1    May 20, 2021

Related U.S. Application Data

(63) Continuation of application No. 13/253,936, filed on Oct. 5, 2011, now Pat. No. 10,860,657.
(Continued)

(51) Int. Cl.
*G06F 16/93* (2019.01)
*G06F 16/21* (2019.01)
(Continued)

(52) U.S. Cl.
CPC .............. *G06F 16/93* (2019.01); *G06F 16/21* (2019.01); *G06F 16/23* (2019.01); *G06F 16/2358* (2019.01); *G06F 16/24578* (2019.01); *G06F 16/248* (2019.01); *G06F 16/25* (2019.01); *G06F 16/334* (2019.01); *G06F 16/338* (2019.01); *G06F 16/35* (2019.01); *G06F 16/355* (2019.01); *G06F 16/367* (2019.01); *G06F 16/38* (2019.01);
(Continued)

(58) Field of Classification Search
CPC .................................................. G06Q 50/184
See application file for complete search history.

(56) References Cited

U.S. PATENT DOCUMENTS

| 4,807,154 | A | 2/1989 | Scully et al. |
| 4,868,733 | A | 9/1989 | Fujisawa et al. |

(Continued)

FOREIGN PATENT DOCUMENTS

| AU | 2006272510 | 2/2012 |
| AU | 2012200701 B2 | 5/2014 |

(Continued)

OTHER PUBLICATIONS

"U.S. Appl. No. 10/710,656, Non Final Office Action mailed Jan. 17, 2007", 16 pgs.
(Continued)

*Primary Examiner* — Brittany N Allen
(74) *Attorney, Agent, or Firm* — Schwegman Lundberg & Woessner, P.A.

(57) ABSTRACT

System and method permit patent mapping. A method may comprise maintaining a database of patent portfolios and a database of patents with each patent stored in the database of patents associated with one or more patent portfolios stored in the database of patent portfolios. A target subject matter to be mapped is identified and a search query associated with the target subject matter is received. Search results are generated to define a first patent portfolio in the database with the search results including one or more patent claims associated with the search query. The one or more patent claims are mapped to a patent concept.

20 Claims, 33 Drawing Sheets

Related U.S. Application Data

(60) Provisional application No. 61/542,515, filed on Oct. 3, 2011.

(51) Int. Cl.

| | | |
|---|---|---|
| *G06F 16/23* | (2019.01) | |
| *G06F 16/2457* | (2019.01) | |
| *G06F 16/248* | (2019.01) | |
| *G06F 16/25* | (2019.01) | |
| *G06F 16/334* | (2025.01) | |
| *G06F 16/338* | (2019.01) | |
| *G06F 16/35* | (2019.01) | |
| *G06F 16/355* | (2025.01) | |
| *G06F 16/36* | (2019.01) | |
| *G06F 16/38* | (2019.01) | |
| *G06F 16/951* | (2019.01) | |
| *G06F 16/9535* | (2019.01) | |
| *G06Q 10/06* | (2023.01) | |
| *G06Q 10/0631* | (2023.01) | |
| *G06Q 50/18* | (2012.01) | |
| *G06F 16/903* | (2019.01) | |

(52) U.S. Cl.
CPC ........ *G06F 16/951* (2019.01); *G06F 16/9535* (2019.01); *G06Q 10/06* (2013.01); *G06Q 10/0631* (2013.01); *G06Q 50/184* (2013.01); *G06F 16/211* (2019.01); *G06F 16/90335* (2019.01)

(56) References Cited

U.S. PATENT DOCUMENTS

| | | |
|---|---|---|
| 5,297,039 A | 3/1994 | Kanaegami et al. |
| 5,329,447 A | 7/1994 | Leedom, Jr. |
| 5,404,506 A | 4/1995 | Fujisawa et al. |
| 5,410,646 A | 4/1995 | Tondevold et al. |
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,694,523 A | 12/1997 | Wical |
| 5,696,916 A | 12/1997 | Yamazaki et al. |
| 5,699,528 A | 12/1997 | Hogan |
| 5,721,910 A | 2/1998 | Unger et al. |
| 5,745,745 A | 4/1998 | Tada et al. |
| 5,754,840 A | 5/1998 | Rivette et al. |
| 5,758,328 A | 5/1998 | Giovannoli |
| 5,768,580 A | 6/1998 | Wical |
| 5,774,833 A | 6/1998 | Newman |
| 5,787,411 A | 7/1998 | Groff et al. |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Greibenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,926,811 A | 7/1999 | Miller et al. |
| 5,940,821 A | 8/1999 | Wical |
| 5,953,726 A | 9/1999 | Carter et al. |
| 5,970,463 A | 10/1999 | Cave et al. |
| 5,991,751 A | 11/1999 | Rivette et al. |
| 5,991,756 A | 11/1999 | Wu |
| 5,991,780 A | 11/1999 | Rivette et al. |
| 5,999,907 A | 12/1999 | Donner et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,094,652 A | 7/2000 | Faisal |
| 6,182,062 B1 | 1/2001 | Fujisawa et al. |
| 6,182,078 B1 | 1/2001 | Whitmyer, Jr. |
| 6,216,128 B1 | 4/2001 | Di-Criescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,363,378 B1 | 3/2002 | Conklin et al. |
| 6,401,118 B1 | 6/2002 | Thomas |
| 6,405,190 B1 | 6/2002 | Conklin |
| 6,415,283 B1 | 7/2002 | Conklin |
| 6,415,319 B1 | 7/2002 | Ambroziak |
| 6,434,580 B1 | 8/2002 | Takano et al. |
| 6,453,312 B1 | 9/2002 | Goiffon et al. |
| 6,460,043 B1 | 10/2002 | Tabbara et al. |
| 6,490,581 B1 | 12/2002 | Neshatfar et al. |
| 6,499,026 B1 | 12/2002 | Rivette et al. |
| 6,502,081 B1 | 12/2002 | Wiltshire, Jr. et al. |
| 6,513,027 B1 | 1/2003 | Powers et al. |
| 6,526,440 B1 | 2/2003 | Bharat |
| 6,542,884 B1 | 4/2003 | Soderberg et al. |
| 6,556,992 B1 | 4/2003 | Barney et al. |
| 6,560,620 B1 | 5/2003 | Ching |
| 6,574,632 B2 | 6/2003 | Fox et al. |
| 6,629,097 B1 | 9/2003 | Keith |
| 6,654,731 B1 | 11/2003 | Mahesh |
| 6,662,178 B2 | 12/2003 | Lee |
| 6,665,656 B1 | 12/2003 | Carter |
| 6,665,670 B2 | 12/2003 | Winer et al. |
| 6,675,159 B1 | 1/2004 | Lin et al. |
| 6,678,692 B1 | 1/2004 | Hyatt |
| 6,694,315 B1 | 2/2004 | Grow |
| 6,694,331 B2 | 2/2004 | Lee |
| 6,751,621 B1 | 6/2004 | Calistri-Yeh et al. |
| 6,766,315 B1 | 7/2004 | Bratsos et al. |
| 6,789,092 B1 | 9/2004 | Oppedahl et al. |
| 6,823,331 B1 | 11/2004 | Abu-Hakima |
| 6,839,665 B1 | 1/2005 | Meyers |
| 6,847,960 B1 | 1/2005 | Li et al. |
| 6,847,966 B1 | 1/2005 | Sommer et al. |
| 6,847,979 B2 | 1/2005 | Allemang et al. |
| 6,879,990 B1 | 4/2005 | Boyer et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang |
| 6,980,984 B1 | 12/2005 | Huffman et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,035,463 B1 | 4/2006 | Monobe et al. |
| 7,051,022 B1 | 5/2006 | Faisal |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,158,983 B2 | 1/2007 | Willse et al. |
| 7,185,172 B1 | 2/2007 | Mick, Jr. et al. |
| 7,221,016 B2 | 5/2007 | Inoue |
| 7,231,384 B2 | 6/2007 | Wu et al. |
| 7,231,386 B2 | 6/2007 | Nonomura et al. |
| 7,281,008 B1 | 10/2007 | Lawrence et al. |
| 7,293,018 B2 | 11/2007 | Hattori et al. |
| 7,296,015 B2 | 11/2007 | Poltorak |

(56) References Cited

U.S. PATENT DOCUMENTS

| | | |
|---|---|---|
| 7,305,625 B1 | 12/2007 | Zilka et al. |
| 7,369,701 B2 | 5/2008 | Lundberg |
| 7,383,294 B1 | 6/2008 | Tamer et al. |
| 7,386,460 B1 | 6/2008 | Frank et al. |
| 7,395,261 B1 | 7/2008 | Atzel |
| 7,433,884 B2 | 10/2008 | Breitzman |
| 7,444,589 B2 | 10/2008 | Zellner et al. |
| 7,483,829 B2 | 1/2009 | Murakami et al. |
| 7,493,253 B1 | 2/2009 | Ceusters et al. |
| 7,523,126 B2 | 4/2009 | Rivette et al. |
| 7,536,446 B2 | 5/2009 | Blumberg |
| 7,610,185 B1 | 10/2009 | Ershov |
| 7,653,631 B1 | 1/2010 | Lundberg |
| 7,676,375 B1 | 3/2010 | Neifeld et al. |
| 7,680,733 B1 | 3/2010 | Lundberg |
| 7,698,330 B2 | 4/2010 | Kim |
| 7,702,640 B1 | 4/2010 | Vermeulen et al. |
| 7,716,226 B2 | 5/2010 | Barney |
| 7,716,581 B2 | 5/2010 | Tran |
| 7,734,545 B1 | 6/2010 | Fogliano et al. |
| 7,739,240 B2 | 6/2010 | Saito et al. |
| 7,765,227 B1 | 7/2010 | Khoshnevisan et al. |
| 7,769,685 B2 | 8/2010 | Malackowski et al. |
| 7,783,619 B2 | 8/2010 | Mcbeath et al. |
| 7,801,889 B2 | 9/2010 | Kim et al. |
| 7,801,909 B2 | 9/2010 | Poltorak |
| 7,823,061 B2 | 10/2010 | Chan |
| 7,836,048 B2 | 11/2010 | Schneider |
| 7,881,937 B2 | 2/2011 | Hasan et al. |
| 7,962,511 B2 | 6/2011 | Barney |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,041,739 B2 | 10/2011 | Glasgow |
| 8,064,736 B2 | 11/2011 | Chan et al. |
| 8,078,545 B1 | 12/2011 | Zilka et al. |
| 8,095,581 B2 | 1/2012 | Stobbs et al. |
| 8,131,701 B2 | 3/2012 | Barney |
| 8,160,306 B1 | 4/2012 | Neustel et al. |
| 8,161,025 B2 | 4/2012 | Lundberg et al. |
| 8,196,030 B1 | 6/2012 | Wang et al. |
| 8,204,816 B2 | 6/2012 | Brodsky et al. |
| 8,254,692 B2 | 8/2012 | Ramachandrula et al. |
| 8,275,708 B1 | 9/2012 | Dennes et al. |
| 8,380,548 B2 | 2/2013 | Ng et al. |
| 8,386,456 B1 | 2/2013 | Paiz |
| 8,442,814 B2 | 5/2013 | Ceusters et al. |
| 8,447,758 B1 | 5/2013 | Adler et al. |
| 8,538,794 B2 | 9/2013 | Marko et al. |
| 8,543,511 B2 | 9/2013 | Wang |
| 8,589,413 B1 | 11/2013 | Mohan et al. |
| 8,600,900 B2 | 12/2013 | Lundberg |
| 8,713,078 B2 | 4/2014 | Kunjithapatham et al. |
| 8,812,292 B2 | 8/2014 | Ceusters et al. |
| 8,892,547 B2 | 11/2014 | Lundberg |
| 8,972,385 B2 | 3/2015 | Lundberg |
| 9,003,474 B1 | 4/2015 | Smith |
| 9,098,568 B2 | 8/2015 | Li et al. |
| 9,110,971 B2 | 8/2015 | Liao et al. |
| 9,146,985 B2 | 9/2015 | Carter |
| 9,201,956 B2 | 12/2015 | Lundberg et al. |
| 9,201,966 B2 | 12/2015 | Lundberg |
| 9,286,351 B2 | 3/2016 | Lundberg |
| 9,396,274 B2 | 7/2016 | Lundberg |
| 9,541,977 B1 | 1/2017 | Lee |
| 9,652,546 B2 | 5/2017 | Lundberg |
| 9,659,071 B2 | 5/2017 | Lundberg et al. |
| 9,679,019 B2 | 6/2017 | Lundberg |
| 9,798,767 B1 * | 10/2017 | Cook ..................... G06F 40/10 |
| 9,858,319 B2 | 1/2018 | Lundberg et al. |
| 9,904,726 B2 | 2/2018 | Lundberg |
| 10,013,726 B1 | 7/2018 | Jung et al. |
| 10,268,731 B2 | 4/2019 | Lundberg |
| 10,546,273 B2 | 1/2020 | Lundberg et al. |
| 10,614,082 B2 | 4/2020 | Lundberg et al. |
| 10,628,429 B2 | 4/2020 | Lundberg |
| 10,860,657 B2 | 12/2020 | Lundberg |
| 2001/0007977 A1 | 7/2001 | Geary |
| 2001/0042064 A1 | 11/2001 | Davis et al. |
| 2001/0049688 A1 | 12/2001 | Fratkina et al. |
| 2002/0004775 A1 | 1/2002 | Kossovsky et al. |
| 2002/0007373 A1 | 1/2002 | Blair et al. |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0052971 A1 | 5/2002 | Okudera et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0072920 A1 | 6/2002 | Grainger |
| 2002/0077835 A1 | 6/2002 | Hagelin |
| 2002/0078090 A1 | 6/2002 | Hwang et al. |
| 2002/0082778 A1 | 6/2002 | Barnett et al. |
| 2002/0091541 A1 | 7/2002 | Lundberg |
| 2002/0091542 A1 | 7/2002 | Grainger |
| 2002/0091702 A1 | 7/2002 | Mullins |
| 2002/0103654 A1 | 8/2002 | Poltorak |
| 2002/0107896 A1 | 8/2002 | Ronal |
| 2002/0111824 A1 | 8/2002 | Grainger |
| 2002/0111941 A1 | 8/2002 | Roux et al. |
| 2002/0111953 A1 | 8/2002 | Snyder |
| 2002/0116363 A1 | 8/2002 | Grainger |
| 2002/0129015 A1 | 9/2002 | Caudill et al. |
| 2002/0138384 A1 | 9/2002 | Malackowski |
| 2002/0138465 A1 | 9/2002 | Lee et al. |
| 2002/0138474 A1 | 9/2002 | Lee |
| 2002/0138475 A1 | 9/2002 | Lee |
| 2002/0143496 A1 | 10/2002 | Mactas et al. |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0175934 A1 | 11/2002 | Hand et al. |
| 2002/0175941 A1 | 11/2002 | Hand et al. |
| 2002/0177907 A1 | 11/2002 | Hand et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0033333 A1 | 2/2003 | Nishino et al. |
| 2003/0046307 A1 | 3/2003 | Rivette et al. |
| 2003/0050915 A1 | 3/2003 | Allemang et al. |
| 2003/0066025 A1 | 4/2003 | Garner et al. |
| 2003/0074354 A1 | 4/2003 | Lee et al. |
| 2003/0084066 A1 | 5/2003 | Waterman et al. |
| 2003/0115191 A1 | 6/2003 | Copperman et al. |
| 2003/0154085 A1 | 8/2003 | Kelley |
| 2003/0167181 A1 | 9/2003 | Lundberg et al. |
| 2003/0187832 A1 | 10/2003 | Reader |
| 2003/0187874 A1 | 10/2003 | Peschel et al. |
| 2003/0191654 A1 | 10/2003 | Panchal et al. |
| 2003/0191780 A1 | 10/2003 | Heger et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0217335 A1 | 11/2003 | Chung et al. |
| 2003/0220891 A1 | 11/2003 | Fish |
| 2003/0225749 A1 | 12/2003 | Cox et al. |
| 2003/0229470 A1 | 12/2003 | Pejic |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0010393 A1 | 1/2004 | Barney |

(56) References Cited

U.S. PATENT DOCUMENTS

| | | |
|---|---|---|
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0049498 A1 | 3/2004 | Dehlinger et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1 | 4/2004 | Kostoff |
| 2004/0073443 A1 | 4/2004 | Gabrick et al. |
| 2004/0078192 A1 | 4/2004 | Poltorak |
| 2004/0078365 A1 | 4/2004 | Poltorak |
| 2004/0083206 A1 | 4/2004 | Wu et al. |
| 2004/0088306 A1 | 5/2004 | Murthy et al. |
| 2004/0088332 A1 | 5/2004 | Lee et al. |
| 2004/0103112 A1 | 5/2004 | Colson et al. |
| 2004/0122656 A1 | 6/2004 | Abir |
| 2004/0122841 A1 | 6/2004 | Goodman et al. |
| 2004/0133433 A1 | 7/2004 | Lee et al. |
| 2004/0133534 A1 | 7/2004 | Mahesh |
| 2004/0133555 A1 | 7/2004 | Toong et al. |
| 2004/0133566 A1 | 7/2004 | Ishiguro et al. |
| 2004/0167875 A1 | 8/2004 | Sneiders |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0223648 A1 | 11/2004 | Hoene et al. |
| 2004/0236646 A1 | 11/2004 | Wu et al. |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0010863 A1 | 1/2005 | Zernik |
| 2005/0021522 A1 | 1/2005 | Herman et al. |
| 2005/0060170 A1 | 3/2005 | Kummamura et al. |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0080723 A1 | 4/2005 | Burchetta et al. |
| 2005/0080775 A1 | 4/2005 | Colledge et al. |
| 2005/0080776 A1 | 4/2005 | Colledge et al. |
| 2005/0097628 A1 | 5/2005 | Lussier et al. |
| 2005/0108652 A1 | 5/2005 | Beretich et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0125459 A1 | 6/2005 | Sutinen et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0165600 A1 | 7/2005 | Kasravi et al. |
| 2005/0165744 A1 | 7/2005 | Taylor et al. |
| 2005/0182755 A1 | 8/2005 | Tran |
| 2005/0198026 A1 | 9/2005 | Dehlinger et al. |
| 2005/0203768 A1 | 9/2005 | Florance et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1 | 9/2005 | Powell et al. |
| 2005/0228684 A1 | 10/2005 | Pogodin et al. |
| 2005/0234738 A1 | 10/2005 | Hodes |
| 2005/0234881 A1 | 10/2005 | Burago et al. |
| 2005/0240595 A1 | 10/2005 | Chandrasekaran |
| 2005/0246194 A1 | 11/2005 | Lundberg |
| 2005/0251383 A1 | 11/2005 | Murray |
| 2005/0256734 A1 | 11/2005 | Clikeman |
| 2005/0261927 A1 | 11/2005 | Bilak et al. |
| 2005/0289524 A1 | 12/2005 | McGinnes |
| 2006/0015485 A1 | 1/2006 | Hofmann |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074836 A1 | 4/2006 | Gardner et al. |
| 2006/0074867 A1 | 4/2006 | Breitzman |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106793 A1 | 5/2006 | Lang |
| 2006/0106847 A1 | 5/2006 | Eckardt, III et al. |
| 2006/0112084 A1 | 5/2006 | Mcbeath et al. |
| 2006/0143162 A1 | 6/2006 | Bernacki et al. |
| 2006/0149720 A1 | 7/2006 | Dehlinger |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212302 A1 | 9/2006 | Lundberg et al. |
| 2006/0212402 A1 | 9/2006 | Lundberg et al. |
| 2006/0212471 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0224999 A1 | 10/2006 | Albrecht et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0005575 A1 | 1/2007 | Dai et al. |
| 2007/0010994 A1 | 1/2007 | Mueller |
| 2007/0011154 A1 | 1/2007 | Musgrove et al. |
| 2007/0011175 A1 | 1/2007 | Langseth et al. |
| 2007/0050343 A1 | 3/2007 | Siddarampappa et al. |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073625 A1 | 3/2007 | Shelton |
| 2007/0073748 A1 | 3/2007 | Barney |
| 2007/0130112 A1 | 6/2007 | Lin |
| 2007/0136116 A1 | 6/2007 | Germeraad et al. |
| 2007/0136373 A1 | 6/2007 | Piasecki |
| 2007/0150298 A1 | 6/2007 | Barney |
| 2007/0174041 A1 | 7/2007 | Yeske |
| 2007/0192272 A1 | 8/2007 | Elfayoumy et al. |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0219853 A1 | 9/2007 | Van Luchene et al. |
| 2007/0219988 A1 | 9/2007 | Mueller et al. |
| 2007/0220041 A1 | 9/2007 | Van Luchene et al. |
| 2007/0220042 A1 | 9/2007 | Mueller et al. |
| 2007/0239705 A1 | 10/2007 | Hunt et al. |
| 2007/0245380 A1 | 10/2007 | Dommer et al. |
| 2007/0250468 A1 | 10/2007 | Pieper |
| 2007/0250488 A1 | 10/2007 | Lee |
| 2007/0288256 A1 | 12/2007 | Speier |
| 2007/0288856 A1 | 12/2007 | Butlin et al. |
| 2007/0294610 A1 | 12/2007 | Ching |
| 2008/0005103 A1 | 1/2008 | Ratcliffe et al. |
| 2008/0005144 A1 | 1/2008 | Katz et al. |
| 2008/0016069 A1 | 1/2008 | Holt |
| 2008/0030800 A1 | 2/2008 | Matsukawa et al. |
| 2008/0077570 A1 | 3/2008 | Tang et al. |
| 2008/0077577 A1 | 3/2008 | Byrne et al. |
| 2008/0097931 A1 | 4/2008 | Grotto |
| 2008/0104032 A1 | 5/2008 | Sarkar |
| 2008/0109454 A1 | 5/2008 | Willse et al. |
| 2008/0140644 A1 | 6/2008 | Franks et al. |
| 2008/0154767 A1 | 6/2008 | D'Agostino |
| 2008/0154848 A1 | 6/2008 | Haslam et al. |
| 2008/0162444 A1 | 7/2008 | Lee et al. |
| 2008/0183518 A1 | 7/2008 | Jiang et al. |

(56) References Cited

U.S. PATENT DOCUMENTS

| | | |
|---|---|---|
| 2008/0195568 A1 | 8/2008 | Chen et al. |
| 2008/0195595 A1 | 8/2008 | Masuyama et al. |
| 2008/0195601 A1 | 8/2008 | Ntoulas et al. |
| 2008/0216013 A1 | 9/2008 | Lundberg et al. |
| 2008/0243799 A1 | 10/2008 | Rozich |
| 2008/0281748 A1 | 11/2008 | Newman |
| 2008/0281821 A1 | 11/2008 | Chen et al. |
| 2008/0301138 A1 | 12/2008 | Hasan et al. |
| 2008/0306952 A1 | 12/2008 | Lynn et al. |
| 2008/0312981 A1 | 12/2008 | Marlett et al. |
| 2009/0006328 A1 | 1/2009 | Lindberg et al. |
| 2009/0006379 A1 | 1/2009 | Shen et al. |
| 2009/0007200 A1 | 1/2009 | Amento et al. |
| 2009/0012827 A1 | 1/2009 | Avrunin |
| 2009/0012937 A1 | 1/2009 | Lee et al. |
| 2009/0030713 A1 | 1/2009 | Venkatachalam |
| 2009/0043797 A1 | 2/2009 | Dorie et al. |
| 2009/0048925 A1 | 2/2009 | Song et al. |
| 2009/0055721 A1 | 2/2009 | Kahn |
| 2009/0063468 A1 | 3/2009 | Berg |
| 2009/0070301 A1 | 3/2009 | McLean et al. |
| 2009/0083049 A1 | 3/2009 | Sciarrino et al. |
| 2009/0150326 A1 | 6/2009 | Sheets |
| 2009/0157717 A1 | 6/2009 | Palahnuk et al. |
| 2009/0164431 A1 | 6/2009 | Zivkovic et al. |
| 2009/0177656 A1 | 7/2009 | Carter |
| 2009/0216994 A1 | 8/2009 | Hsieh et al. |
| 2009/0228578 A1 | 9/2009 | Demers et al. |
| 2009/0228777 A1 | 9/2009 | Henry et al. |
| 2009/0248468 A1 | 10/2009 | Cronin et al. |
| 2009/0257396 A1 | 10/2009 | Eliezer et al. |
| 2009/0259459 A1 | 10/2009 | Ceusters et al. |
| 2009/0259506 A1 | 10/2009 | Barney |
| 2009/0265274 A1 | 10/2009 | Hahn-Carlson et al. |
| 2009/0282054 A1 | 11/2009 | Casey |
| 2010/0005094 A1 | 1/2010 | Poltorak |
| 2010/0023386 A1 | 1/2010 | Avisar et al. |
| 2010/0030680 A1 | 2/2010 | Malackowski et al. |
| 2010/0057533 A1 | 3/2010 | Martinez Ruiz et al. |
| 2010/0077007 A1 | 3/2010 | White et al. |
| 2010/0082395 A1 | 4/2010 | De Andrade |
| 2010/0106752 A1 | 4/2010 | Eckardt, III et al. |
| 2010/0114587 A1 | 5/2010 | Masuyama et al. |
| 2010/0131513 A1 | 5/2010 | Lundberg et al. |
| 2010/0174698 A1 | 7/2010 | Odland et al. |
| 2010/0179948 A1 | 7/2010 | Xie et al. |
| 2010/0180223 A1 | 7/2010 | Speier |
| 2010/0185689 A1 | 7/2010 | Hu et al. |
| 2010/0191622 A1 | 7/2010 | Reiss et al. |
| 2010/0191702 A1 | 7/2010 | Hofmann |
| 2010/0235337 A1 | 9/2010 | Shanahan et al. |
| 2010/0250479 A1 | 9/2010 | Carter |
| 2010/0287478 A1 | 11/2010 | Avasarala et al. |
| 2010/0306825 A1 | 12/2010 | Spivack |
| 2010/0324991 A1 | 12/2010 | Colledge et al. |
| 2010/0332511 A1 | 12/2010 | Stockton et al. |
| 2011/0029476 A1 | 2/2011 | Kasravi et al. |
| 2011/0047166 A1 | 2/2011 | Stading et al. |
| 2011/0055192 A1 | 3/2011 | Tang et al. |
| 2011/0072014 A1 | 3/2011 | Lundberg et al. |
| 2011/0072024 A1 | 3/2011 | Barney |
| 2011/0093449 A1 | 4/2011 | Belenzon et al. |
| 2011/0099084 A1 | 4/2011 | Horn et al. |
| 2011/0099186 A1 | 4/2011 | Zohar et al. |
| 2011/0112824 A1 | 5/2011 | Sayers et al. |
| 2011/0113385 A1 | 5/2011 | Sayers et al. |
| 2011/0119134 A1 | 5/2011 | Zivkovic et al. |
| 2011/0153509 A1 | 6/2011 | Lundberg et al. |
| 2011/0153852 A1 | 6/2011 | Thomas |
| 2011/0179032 A1 | 7/2011 | Ceusters et al. |
| 2011/0191310 A1 | 8/2011 | Liao et al. |
| 2011/0191314 A1 | 8/2011 | Howes et al. |
| 2011/0197121 A1 | 8/2011 | Kletter |
| 2011/0202334 A1 | 8/2011 | Abir |
| 2011/0225159 A1 | 9/2011 | Murray |
| 2011/0231449 A1 | 9/2011 | Ashley et al. |
| 2011/0246379 A1 | 10/2011 | Maddox et al. |
| 2011/0246473 A1 | 10/2011 | Stec |
| 2011/0289096 A1 | 11/2011 | Barney |
| 2011/0302172 A1 | 12/2011 | Chandrasekar et al. |
| 2011/0307499 A1 | 12/2011 | Elias et al. |
| 2011/0320367 A1 | 12/2011 | Kan et al. |
| 2011/0320582 A1 | 12/2011 | Lewis |
| 2012/0016859 A1 | 1/2012 | Sears |
| 2012/0078913 A1 | 3/2012 | Muni et al. |
| 2012/0078979 A1 | 3/2012 | Ghimire |
| 2012/0095984 A1 | 4/2012 | Wren-Hilton et al. |
| 2012/0095993 A1 | 4/2012 | Shau |
| 2012/0096027 A1 | 4/2012 | Coult |
| 2012/0102427 A1 | 4/2012 | Fenster et al. |
| 2012/0109642 A1 | 5/2012 | Stobbs et al. |
| 2012/0109794 A1* | 5/2012 | Nathanson ............. G06Q 40/12 705/32 |
| 2012/0116989 A1 | 5/2012 | Lai et al. |
| 2012/0117082 A1 | 5/2012 | Koperda et al. |
| 2012/0130773 A1 | 5/2012 | Abu-Ghazalah et al. |
| 2012/0130993 A1 | 5/2012 | Lundberg et al. |
| 2012/0174017 A1 | 7/2012 | Tidwell et al. |
| 2012/0215768 A1 | 8/2012 | Zellweger |
| 2012/0221580 A1 | 8/2012 | Barney |
| 2012/0239591 A1 | 9/2012 | Powell, Jr. et al. |
| 2012/0240026 A1 | 9/2012 | Iyer et al. |
| 2012/0254155 A1 | 10/2012 | Heim et al. |
| 2012/0259787 A1 | 10/2012 | Speier |
| 2012/0278244 A1 | 11/2012 | Lee et al. |
| 2012/0284199 A1 | 11/2012 | Lundberg |
| 2012/0290487 A1 | 11/2012 | Lee et al. |
| 2012/0317041 A1 | 12/2012 | Shaffer et al. |
| 2013/0007578 A1 | 1/2013 | Shreck et al. |
| 2013/0013645 A1 | 1/2013 | Dias et al. |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0282599 A1 | 10/2013 | Kang et al. |
| 2013/0282735 A1 | 10/2013 | Pedersen et al. |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0032513 A1 | 1/2014 | Gaither |

(56) References Cited

U.S. PATENT DOCUMENTS

| | | |
|---|---|---|
| 2014/0089210 A1 | 3/2014 | Lundberg |
| 2014/0379388 A1 | 12/2014 | Lundberg et al. |
| 2014/0379686 A1 | 12/2014 | Vadlamani et al. |
| 2015/0066842 A1 | 3/2015 | Lundberg |
| 2015/0134549 A1 | 5/2015 | Lundberg et al. |
| 2015/0149368 A1 | 5/2015 | Lundberg |
| 2015/0169777 A1 | 6/2015 | Lundberg |
| 2015/0347604 A1 | 12/2015 | Lundberg |
| 2015/0347605 A1 | 12/2015 | Lundberg et al. |
| 2015/0348217 A1 | 12/2015 | Lundberg |
| 2015/0371349 A1 | 12/2015 | Lundberg et al. |
| 2016/0078109 A1 | 3/2016 | Lundberg et al. |
| 2016/0154863 A1 | 6/2016 | Lundberg |
| 2016/0358274 A1 | 12/2016 | George |
| 2016/0378766 A1 | 12/2016 | Lundberg |
| 2017/0046398 A1 | 2/2017 | Beretich, Jr. et al. |
| 2017/0075929 A1 | 3/2017 | Lundberg |
| 2017/0213291 A1 | 7/2017 | Plow et al. |
| 2017/0316036 A1 | 11/2017 | Lundberg |
| 2017/0351682 A1 | 12/2017 | Lundberg |
| 2018/0137194 A1 | 5/2018 | Lundberg |
| 2018/0157665 A1 | 6/2018 | Lundberg et al. |
| 2018/0204180 A1 | 7/2018 | Lundberg et al. |
| 2020/0050609 A1 | 2/2020 | Lundberg |
| 2020/0210440 A1 | 7/2020 | Lundberg et al. |
| 2020/0279222 A1 | 9/2020 | Lundberg et al. |
| 2022/0230137 A1 | 7/2022 | Lundberg et al. |

FOREIGN PATENT DOCUMENTS

| | | |
|---|---|---|
| AU | 2013270517 B2 | 4/2016 |
| EP | 0638870 A1 | 2/1995 |
| GB | 2156112 A | 10/1985 |
| GB | 2260007 A | 3/1993 |
| WO | WO-9816890 A1 | 4/1998 |
| WO | WO-0054185 A1 | 9/2000 |
| WO | WO-0243306 A2 | 5/2002 |
| WO | WO-02080039 A1 | 10/2002 |
| WO | WO-2006015110 A2 | 2/2006 |
| WO | WO-2006015110 A3 | 2/2006 |
| WO | WO-2006128183 A2 | 11/2006 |
| WO | WO-2006128183 A3 | 11/2006 |
| WO | WO-2007014341 A2 | 2/2007 |
| WO | WO-2007014341 A3 | 2/2007 |
| WO | WO-2007014341 C2 | 2/2007 |
| WO | WO-2011123517 A1 | 10/2011 |

OTHER PUBLICATIONS

"U.S. Appl. No. 10/710,656, Response filed Nov. 13, 2006 to Restriction Requirement mailed Oct. 13, 2006", 6 pgs.

"U.S. Appl. No. 10/710,656, Restriction Requirement mailed Oct. 13, 2006", 9 pgs.

"U.S. Appl. No. 10/915,265, Final Office Action mailed Jul. 10, 2007", 26 pgs.

"U.S. Appl. No. 10/915,265, Final Office Action mailed Jul. 14, 2008", 23 pgs.

"U.S. Appl. No. 10/915,265, Non-Final Office Action mailed Apr. 13, 2009", 27 pgs.

"U.S. Appl. No. 10/915,265, Non-Final Office Action mailed Jun. 2, 2010", 29 pgs.

"U.S. Appl. No. 10/915,265, Non-Final Office Action mailed Nov. 5, 2008", 27 pgs.

"U.S. Appl. No. 10/915,265, Non-Final Office Action mailed Dec. 28, 2007", 25 pgs.

"U.S. Appl. No. 10/915,265, Response filed Feb. 5, 2009 to Non-Final Office Action mailed Nov. 5, 2008", 11 pgs.

"U.S. Appl. No. 10/915,265, Response filed Apr. 28, 2008 to Non-Final Office Action mailed Dec. 28, 2007", 14 pgs.

"U.S. Appl. No. 10/915,265, Response filed Jul. 18, 2008 to Final Office Action mailed Jul. 14, 2008", 17 pgs.

"U.S. Appl. No. 10/915,265, Response filed Sep. 1, 2010 to Non Final Office Action mailed Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 11/494,278, Final Office Action mailed Mar. 23, 2009", 21 pgs.

"U.S. Appl. No. 11/494,278, Final Office Action mailed Apr. 1, 2010", 20 pgs.

"U.S. Appl. No. 11/494,278, Non Final Office Action mailed Oct. 8, 2009", 21 pgs.

"U.S. Appl. No. 11/494,278, Non-Final Office Action mailed Mar. 5, 2008", 14 pgs.

"U.S. Appl. No. 11/494,278, Notice of Allowance mailed May 3, 2011", 12 pgs.

"U.S. Appl. No. 11/494,278, Notice of Allowance mailed Dec. 15, 2011", 14 pgs.

"U.S. Appl. No. 11/494,278, Notice of Non-Compliant Amendment mailed Jun. 7, 2010" 2 pgs.

"U.S. Appl. No. 11/494,278, Preliminary Amendment filed Oct. 30, 2007", 6 pgs.

"U.S. Appl. No. 11/494,278, Response filed Feb. 10, 2010 to Non Final Office Action mailed Oct. 8, 2009", 8 pgs.

"U.S. Appl. No. 11/494,278, Response filed Jun. 2, 2010 to Final Office Action mailed Apr. 1, 2010", 7 pgs.

"U.S. Appl. No. 11/494,278, Response filed Jun. 5, 2008 to Non-Final Office Action mailed Mar. 5, 2008", 12 pgs.

"U.S. Appl. No. 11/494,278, Response filed Jun. 9, 2010 to Notice of Non-Compliant Amendment mailed Jun. 7, 2010", 7 pgs.

"U.S. Appl. No. 11/494,278, Response filed Jun. 23, 2009 to Final Office Action mailed Mar. 23, 2009", 8 pgs.

"U.S. Appl. No. 11/888,632, Amendment filed Jun. 12, 2012", 8 pgs.

"U.S. Appl. No. 11/888,632, Appeal Brief filed Jun. 4, 2015", 16 pgs.

"U.S. Appl. No. 11/888,632, Appeal Decision mailed Jan. 19, 2017", 8 pgs.

"U.S. Appl. No. 11/888,632, Decision on Pre-Appeal Brief mailed Mar. 9, 2012", 2 pgs.

"U.S. Appl. No. 11/888,632, Final Office Action mailed Sep. 8, 2014", 12 pgs.

"U.S. Appl. No. 11/888,632, Final Office Action mailed Oct. 19, 2011", 9 pgs.

"U.S. Appl. No. 11/888,632, Non Final Office Action mailed Jan. 19, 2011", 12 pgs.

"U.S. Appl. No. 11/888,632, Non Final Office Action mailed Jan. 24, 2014", 12 pgs.

"U.S. Appl. No. 11/888,632, Pre-Appeal Brief Request filed Feb. 21, 2012", 4 pgs.

"U.S. Appl. No. 11/888,632, Response filed Jun. 24, 2014 to Non Final Office Action mailed Jan. 24, 2014", 9 pgs.

"U.S. Appl. No. 11/888,632, Response filed Jul. 19, 2011 to Non Final Office Action mailed Jan. 19, 2011", 8 pgs.

"U.S. Appl. No. 11/888,632, Response filed Dec. 7, 2010, to Restriction Requirement mailed Jul. 7, 2010", 7 pgs.

"U.S. Appl. No. 11/888,632, Restriction Requirement mailed Jul. 7, 2010", 5 pgs.

"U.S. Appl. No. 12/605,030, Appeal Decision mailed Sep. 1, 2017", 14 pgs.

"U.S. Appl. No. 12/605,030, Final Office Action mailed May 21, 2012", 10 pgs.

"U.S. Appl. No. 12/605,030, Final Office Action mailed Jul. 16, 2014", 16 pgs.

"U.S. Appl. No. 12/605,030, Non Final Office Action mailed Oct. 7, 2011", 12 pgs.

"U.S. Appl. No. 12/605,030, Non Final Office Action mailed Nov. 7, 2013", 16 pgs.

"U.S. Appl. No. 12/605,030, Response filed Feb. 7, 2012 to Non Final Office Action mailed Oct. 7, 2011", 9 pgs.

"U.S. Appl. No. 12/605,030, Response Filed May 7, 14 to Non Final Office Action mailed Nov. 7, 13", 8 pgs.

"U.S. Appl. No. 12/605,030, Response filed Oct. 22, 2012 to Final Office Action mailed May 21, 2012", 8 pgs.

(56) References Cited

OTHER PUBLICATIONS

"U.S. Appl. No. 12/658,113, Non Final Office Action mailed Feb. 28, 2011", 26 pgs.
"U.S. Appl. No. 12/958,113, Final Office Action mailed Aug. 8, 2011", 26 pgs.
"U.S. Appl. No. 12/958,113, Response filed May 20, 2011 to Non Final Office Action mailed Feb. 28, 2011", 13 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Appeal Decision mailed Aug. 3, 2017", 10 pgs.
"U.S. Appl. No. 13/253,936, Corrected Notice of Allowability mailed Sep. 21, 2020", 2 pgs.
"U.S. Appl. No. 13/253,936, Corrected Notice of Allowability mailed Sep. 25, 2020", 2 pgs.
"U.S. Appl. No. 13/253,936, Corrected Notice of Allowability mailed Oct. 2, 2020", 2 pgs.
"U.S. Appl. No. 13/253,936, Examiner's Answer to Appeal Brief mailed Jun. 23, 2016", 6 pgs.
"U.S. Appl. No. 13/253,936, Final Office Action mailed Feb. 4, 2015", 14 pgs.
"U.S. Appl. No. 13/253,936, Final Office Action mailed Apr. 9, 2020", 14 pgs.
"U.S. Appl. No. 13/253,936, Final Office Action mailed Jun. 24, 2013", 13 pgs.
"U.S. Appl. No. 13/253,936, Final Office Action mailed Jul. 11, 2018", 18 pgs.
"U.S. Appl. No. 13/253,936, Non Final Office Action mailed Feb. 7, 2018", 16 pgs.
"U.S. Appl. No. 13/253,936, Non Final Office Action mailed Jun. 18, 2014", 14 pgs.
"U.S. Appl. No. 13/253,936, Non Final Office Action mailed Aug. 9, 2019", 15 pgs.
"U.S. Appl. No. 13/253,936, Non Final Office Action mailed Oct. 8, 2015", 15 pgs.
"U.S. Appl. No. 13/253,936, Non Final Office Action mailed Nov. 28, 2012", 11 pgs.
"U.S. Appl. No. 13/253,936, Notice of Allowance mailed Aug. 5, 2020", 13 pgs.
"U.S. Appl. No. 13/253,936, Reply Brief filed Aug. 23, 2016", 4 pgs.
"U.S. Appl. No. 13/253,936, Response filed Feb. 10, 2020 to Non Final Office Action mailed Aug. 9, 2019", 10 pgs.
"U.S. Appl. No. 13/253,936, Response filed Mar. 27, 2013 to Non Final Office Action mailed Nov. 28, 2012", 11 pgs.
"U.S. Appl. No. 13/253,936, Response filed May 10, 2019 to Final Office Action mailed Jul. 11, 2018", 13 pgs.
"U.S. Appl. No. 13/253,936, Response Filed Jun. 7, 2018 to Non Final Office Action mailed Feb. 7, 2018", 13 pgs.
"U.S. Appl. No. 13/253,936, Response filed Jul. 9, 2020 to Final Office Action mailed Apr. 9, 2020", 12 pgs.
"U.S. Appl. No. 13/253,936, Response filed Oct. 3, 2017 to Appeal Decision mailed Aug. 3, 2017", 8 pgs.
"U.S. Appl. No. 13/253,936, Response filed Dec. 16, 2014 to Non Final Office Action mailed Jun. 18, 2014", 9 pgs.
"U.S. Appl. No. 13/253,936, Response filed Dec. 23, 2013 to Final Office Action mailed Jun. 24, 2013", 5 pgs.
"U.S. Appl. No. 13/253,941, Final Office Action mailed Jun. 6, 2013", 16 pgs.
"U.S. Appl. No. 13/253,941, Final Office Action mailed Dec. 26, 2014", 18 pgs.
"U.S. Appl. No. 13/253,941, Non Final Office Action mailed May 7, 2014", 18 pgs.
"U.S. Appl. No. 13/253,941, Non Final Office Action mailed Nov. 15, 2012", 14 pgs.
"U.S. Appl. No. 13/253,941, Response filed Apr. 15, 13 to Non Final Office Action mailed Nov. 15, 12", 13 pgs.
"U.S. Appl. No. 13/253,941, Response filed Nov. 6, 2013 to Final Office Action mailed Jun. 6, 2013", 11 pgs.
"U.S. Appl. No. 13/253,941, Response filed Nov. 7, 2014 to Non Final Office Action mailed May 7, 2014", 10 pgs.
"U.S. Appl. No. 13/365,062, Non Final Office Action mailed Mar. 19, 2015", 14 pgs.
"U.S. Appl. No. 13/365,062, Non Final Office Action mailed Apr. 30, 2014", 13 pgs.
"U.S. Appl. No. 13/365,062, Non Final Office Action mailed Aug. 19, 2013", 14 pgs.
"U.S. Appl. No. 13/365,062, Non Final Office Action mailed Oct. 9, 2014", 13 pgs.
"U.S. Appl. No. 13/365,062, Non Final Office Action mailed Nov. 30, 2012", 19 pgs.
"U.S. Appl. No. 13/365,062, Non-Final Office Action mailed Jul. 3, 2012", 20 pgs.
"U.S. Appl. No. 13/365,062, Notice of Allowance mailed Jul. 24, 2015", 11 pgs.
"U.S. Appl. No. 13/365,062, Response filed Feb. 9, 2015 to Non Final Office Action mailed Oct. 9, 2014", 6 pgs.
"U.S. Appl. No. 13/365,062, Response filed May 29, 2013 to Non Final Office Action mailed Nov. 30, 2012", 8 pgs.
"U.S. Appl. No. 13/365,062, Response filed Jun. 19, 2015 to Non Final Office Action mailed Mar. 19, 2015", 9 pgs.
"U.S. Appl. No. 13/365,062, Response filed Sep. 2, 2014 to Non Final Office Action mailed Jul. 30, 2014", 8 pgs.
"U.S. Appl. No. 13/365,062, Response filed Oct. 3, 2012 to Non Final Office Action mailed Jul. 3, 2012", 8 pgs.
"U.S. Appl. No. 13/365,062, Response filed Dec. 19, 2013 to Non Final Office Action mailed Aug. 19, 2013", 10 pgs.
"U.S. Appl. No. 13/573,803, Appeal Brief filed Dec. 29, 2015", 20 pgs.
"U.S. Appl. No. 13/573,803, Appeal Decision mailed Jul. 28, 2017", 24 pgs.
"U.S. Appl. No. 13/573,803, Final Office Action mailed Apr. 7, 2015", 16 pgs.
"U.S. Appl. No. 13/573,803, Non Final Office Action mailed Sep. 15, 2014", 15 pgs.
"U.S. Appl. No. 13/573,803, Non Final Office Action mailed Dec. 5, 2013", 16 pgs.
"U.S. Appl. No. 13/573,803, Reply Brief filed Jul. 13, 2016", 6 pgs.
"U.S. Appl. No. 13/573,803, Response filed Jun. 5, 2014 to Non Final Office Action mailed Dec. 5, 2013", 12 pgs.
"U.S. Appl. No. 13/573,803, Response filed Dec. 15, 2014 to Non Final Office Action mailed Sep. 15, 2014", 12 pgs.
"U.S. Appl. No. 13/573,804, Final Office Action mailed Mar. 23, 2015", 16 pgs.
"U.S. Appl. No. 13/573,804, Non Final Office Action mailed Oct. 20, 2014", 15 pgs.
"U.S. Appl. No. 13/573,804, Response filed Jan. 20, 2015 to Non Final Office Action mailed Oct. 20, 2014", 15 pgs.
"U.S. Appl. No. 13/573,804, Response filed Aug. 29, 2014 to Restriction Requirement mailed Jun. 30, 2014", 8 pgs.
"U.S. Appl. No. 13/573,804, Restriction Requirement mailed Jun. 30, 2014", 5 pgs.
"U.S. Appl. No. 14/010,376, Appeal Brief filed Apr. 19, 2016", 19 pgs.
"U.S. Appl. No. 14/010,376, Appeal Decision mailed Sep. 8, 2017", 17 pgs.
"U.S. Appl. No. 14/010,376, Final Office Action mailed Aug. 19, 2015", 13 pgs.
"U.S. Appl. No. 14/010,376, Non Final Office Action mailed Mar. 24, 2015", 10 pgs.
"U.S. Appl. No. 14/010,376, Reply Brief filed Nov. 22, 2016", 5 pgs.
"U.S. Appl. No. 14/010,376, Response filed Jun. 24, 2015 to Non Final Office Action mailed Mar. 24, 2015", 10 pgs.
"U.S. Appl. No. 14/010,380, Appeal Decision mailed Sep. 27, 2017", 18 pgs.
"U.S. Appl. No. 14/010,380, Examiners Answer mailed Nov. 9, 2016", 8 pgs.
"U.S. Appl. No. 14/010,380, Final Office Action mailed Oct. 6, 2015", 11 pgs.

(56) References Cited

OTHER PUBLICATIONS

"U.S. Appl. No. 14/010,380, Non Final Office Action mailed Apr. 15, 2015", 11 pgs.
"U.S. Appl. No. 14/010,380, Reply Brief filed Jan. 9, 2017", 6 pgs.
"U.S. Appl. No. 14/010,380, Response filed Aug. 17, 2015 to Non Final Office Action mailed Apr. 15, 2015", 11 pgs.
"U.S. Appl. No. 14/010,391, Appeal Brief filed Aug. 15, 2016", 23 pgs.
"U.S. Appl. No. 14/010,391, Appeal Decision mailed Oct. 25, 2017", 19 pgs.
"U.S. Appl. No. 14/010,391, Examiners Answer mailed Nov. 9, 2016", 10 pgs.
"U.S. Appl. No. 14/010,391, Final Office Action mailed Sep. 15, 2015", 11 pgs.
"U.S. Appl. No. 14/010,391, Non Final Office Action mailed Mar. 23, 2015", 11 pgs.
"U.S. Appl. No. 14/010,391, Reply Brief filed Jan. 9, 2017", 6 pgs.
"U.S. Appl. No. 14/010,391, Response filed Jul. 22, 2015 to Non Final Office Action mailed Mar. 23, 2015", 10 pgs.
"U.S. Appl. No. 14/010,400, Appeal Brief filed Aug. 8, 2016", 17 pgs.
"U.S. Appl. No. 14/010,400, Appeal Decision mailed Nov. 3, 2017", 16 pgs.
"U.S. Appl. No. 14/010,400, Examiners Answer mailed Nov. 9, 2016", 9 pgs.
"U.S. Appl. No. 14/010,400, Final Office Action mailed Sep. 10, 2015", 9 pgs.
"U.S. Appl. No. 14/010,400, Non Final Office Action mailed Apr. 22, 2015", 11 pgs.
"U.S. Appl. No. 14/010,400, Response filed Jul. 22, 2015 to Non Final Office Action mailed Apr. 22, 2015", 10 pgs.
"U.S. Appl. No. 14/010,903, Examiners Answer mailed Nov. 9, 2016", 9 pgs.
"U.S. Appl. No. 14/483,903, Appeal Brief filed Oct. 11, 2016", 21 pgs.
"U.S. Appl. No. 14/483,903, Appeal Decision mailed Sep. 25, 2017", 18 pgs.
"U.S. Appl. No. 14/483,903, Final Office Action mailed Feb. 10, 2016", 11 pgs.
"U.S. Appl. No. 14/483,903, Non Final Office Action mailed Sep. 1, 2015", 10 pgs.
"U.S. Appl. No. 14/483,903, Reply Brief filed Jan. 9, 2017", 6 pgs.
"U.S. Appl. No. 14/483,903, Response filed Jan. 4, 2016 to Non Final Office Action mailed Sep. 1, 2015", 11 pgs.
"U.S. Appl. No. 14/949,549, Notice of Allowance mailed Jan. 18, 2017", 11 pgs.
"U.S. Appl. No. 14/949,549, Response filed Jul. 20, 2016 to Non Final Office Action mailed Apr. 20, 2016", 8 pgs.
"U.S. Appl. No. 14/949,549, Response filed Aug. 26, 2016 to Non Final Office Action mailed Apr. 20, 2016", 8 pgs.
"U.S. Appl. No. 14/949,549, Response filed Dec. 27, 2016 to Final Office Action mailed Oct. 27, 2016", 7 pgs.
"U.S. Appl. No. 15/801,056, Final Office Action mailed Jan. 25, 2019", 12 pgs.
"U.S. Appl. No. 15/801,056, Non Final Office Action mailed Jul. 11, 2018", 13 pgs.
"U.S. Appl. No. 15/801,056, Preliminary Amendment filed Apr. 30, 2018", 9 pgs.
"U.S. Appl. No. 16/730,678, Preliminary Amendment filed May 26, 2020", 8 pgs.
"U.S. Appl. No. 14/949,549, Final Office Action mailed Oct. 27, 2016", 14 pgs.
"U.S. Appl. No. 14/949,549, Non Final Office Action mailed Apr. 20, 2016", 14 pgs.
"Australian Application Serial No. 2006272510, Office Action mailed Oct. 22, 2010", 3 pgs.
"Casefinder Manual, Ch. 1: Overview; Ch. 8: Hyperlinking", [Online]. Retrieved from the Internet: < URL: http://web.archive.org/web/20040419155315/http://www.casefinder.com/downloads/manual-5.00.pdf>, (Archived Apr. 19, 2004), 13 pgs.
"East Text Search Training", (Jan. 2000), 155 pgs.
"European Application Serial No. 05775617.3, Extended European Search Report mailed Mar. 24, 2009", 8 pgs.
"European Application Serial No. 06800464.7, Extended European Search Report mailed Aug. 24, 2010", 8 pgs.
"International Application Serial No. PCT/US2005/026768, Demand mailed Mar. 7, 2007", 9 pgs.
"International Application Serial No. PCT/US2005/026768, International Preliminary Report on Patentability mailed Mar. 29, 2007", 8 pgs.
"International Application Serial No. PCT/US2005/026768, International Search Report mailed Mar. 7, 2007", 5 pgs.
"International Application Serial No. PCT/US2005/026768, Written Opinion mailed Mar. 7, 2007", 5 pgs.
"International Application Serial No. PCT/US2006/029456, International Preliminary Report on Patentability mailed Feb. 7, 2008", 9 pgs.
"International Application Serial No. PCT/US2006/029456, International Search Report mailed Oct. 1, 2007", 5 pgs.
"International Application Serial No. PCT/US2006/029456, Written Opinion mailed Oct. 1, 2007", 7 pgs.
"Notice from the European Patent Office dated Oct. 1, 2007 concerning business methods", Official Journal of the European Patent Office, 30(11), (Nov. 1, 2007), 592-593.
"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.
"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.
"What is PAIR?", USPTO, [Online]. Retrieved from the Internet: <URL: http://web.archive.org/web/20040606224528/pair.uspto.gov/cgi-bin/final/help.pl>, (Archived Jun. 6, 2004), 9 pgs.
Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.
Chang, Muchiu, "Sun Tzu and sustainable competitive advantage", IEEE Int'l Engineering Management Conference, vol. 1, (Oct. 18-21, 2004), 153-157.
Davis, Lee, "The Strategic Use of Patents in International Business", The 28th Annual EIBA Conference, Athens, Greece, (Dec. 2002), 27 pgs.
East, T. W, "Patent Claims—How to Keep Track of Them", IEEE Aerospace and Electronic Systems Magazine, 10(8), (Aug. 1995), 32-33.
Fall, C.J., et al., "Literature Survey: Issue to be considered in the automatic classifications of patents", World Intellectual Property Organization, (Oct. 2002), 64 pgs.
Hall, et al., "Market Value and Patent Citations", The RAND Journal of Economics, vol. 36, No. 1, (2005), 16-38.
Hoover, A. E, "Electronic Filing Top 10 Wish List", IP Today, (Jul. 2006), 2 pgs.
Hutzell, Paula, "Image File Wrapper (IFW) Processing", USPTO PPT Presentation, (Aug. 5, 2003), 25 pgs.
Langan-Fox, Janice, "Team Mental Models: Techniques, Methods, and Analytic Approaches", The Journal of the Human Factors and Ergonomics Society, vol. 42, No. 2, (2000), 30 pgs.
Larkey, L. S, "A Patent Search and Classification System", Proc. of the 4th ACM Conference of Digital Libraries, (1999), 179-187.
Larkey, Leah S, et al., "Collection Selection and Results Merging with Topically Organized U.S. Patents and TREC Data", Proc. of the 9th Int'l Conference on Information and Knowledge Management, (2000), 8 pgs.
Luo, Si, et al., "A Semisupervised Learning Method to Merge Search Engine results", ACM Transactions on Information Systems, vol. 21, No. 4, (Oct. 2002), 35 pgs.
Madrid, Juan M, et al., "Incorporating Conceptual Matching in Search", Proc. of the 11th Conference on Information and Knowledge Management, (2002), 17 pgs.

(56) References Cited

OTHER PUBLICATIONS

Mahesh, K., "Ontology Development for Machine Translation: Ideology and Methodology", Technical Report MCCS-96-292, Computing Research Laboratory, New Mexico State University, (1996), 87 pgs.

Mary, Ellen Mogee, et al., "Patent co-citation analysis of Eli Lilly & Co. patents", Expert Opinion on Therapeutic Patents, (Feb. 25, 2005).

Mase, H., et al., "Proposal of Two-Stage Patent Retrieval Method Considering the Claim Structure", ACM Transactions on Asian Language Information Processing (TALIP), 4(2), (Jun. 2005), 190-206.

Sheremetyeva, S., et al., "Generating Patent Claims from Interactive Input", Proc. of the 8th International Workshop on Natural Language Generation (INLG), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proc. of the ACL-2003 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Woods, W. A, "Conceptual Indexing: A Better Way to Organize Knowledge", Sun Microsystems, Inc., (1997), 99 pgs.

"U.S. Appl. No. 10/915,265, Advisory Action mailed Jul. 31, 2008", 3 pgs.

"U.S. Appl. No. 10/915,265, Non Final Office Action mailed Jan. 22, 2007", 15 pgs.

"U.S. Appl. No. 10/915,265, Response filed May 18, 2007 to Noon Final Office Action mailed Jan. 22, 2007", 9 pgs.

"U.S. Appl. No. 10/915,265, Response filed Nov. 13, 2006 to Restriction Requirement mailed Oct. 11, 2006", 5 pgs.

"U.S. Appl. No. 10/915,265, Restriction Requirement mailed Oct. 13, 2006", 10 pgs.

"U.S. Appl. No. 11/915,718, Advisory Action Mailed Feb. 15, 2012", 3 pgs.

"U.S. Appl. No. 11/915,718, Final Office Action Mailed Dec. 30, 2011", 13 pgs.

"U.S. Appl. No. 11/915,718, Non Final Office Action mailed May 26, 2011", 9 pgs.

"U.S. Appl. No. 11/915,718, Non Final Office Action mailed Jul. 7, 2014", 17 pgs.

"U.S. Appl. No. 11/915,718, Notice of Non-Compliant Amendment mailed Oct. 6, 2011", 2 pgs.

"U.S. Appl. No. 11/915,718, Preliminary Amendment filed Nov. 27, 2007", 2 pgs.

"U.S. Appl. No. 11/915,718, Response filed Feb. 8, 2012 to Final Office Action mailed Dec. 30, 2011", 13 pgs.

"U.S. Appl. No. 11/915,718, Response filed Sep. 26, 2011 to Non-Final Office Action mailed May 26, 2011", 9 pgs.

"U.S. Appl. No. 11/915,718, Response filed Oct. 11, 2011 to Notice of Non-Compliant Amendment mailed Oct. 6, 2011", 4 pgs.

"U.S. Appl. No. 12/958,113, Examiner Interview Summary mailed Aug. 24, 2015", 2 pgs.

"U.S. Appl. No. 12/958,113, Final Office Action mailed Nov. 3, 2014", 25 pgs.

"U.S. Appl. No. 12/958,113, Non Final Office Action mailed Feb. 4, 2016", 25 pgs.

"U.S. Appl. No. 12/958,113, Non Final Office Action mailed Apr. 30, 2014", 21 pgs.

"U.S. Appl. No. 12/958,113, Non Final Office Action mailed Aug. 20, 2015", 25 pgs.

"U.S. Appl. No. 12/958,113, Notice of Allowance mailed Mar. 1, 2017", 14 pgs.

"U.S. Appl. No. 12/958,113, Response filed Feb. 3, 2015 to Final Office Action mailed Nov. 3, 2014", 11 pgs.

"U.S. Appl. No. 12/958,113, Response filed Feb. 8, 2012 to Final Office Action mailed Aug. 8, 2011", 12 pgs.

"U.S. Appl. No. 12/958,113, Response filed May 3, 2016 to Non Final Office Action mailed Feb. 4, 2016", 11 pgs.

"U.S. Appl. No. 12/958,113, Response filed Jul. 16, 2014 to Non Final Office Action mailed Apr. 30, 2014", 12 pgs.

"U.S. Appl. No. 12/958,113, Response filed Nov. 6, 2015 to Non Final Office Action mailed Aug. 20, 2015", 12 pgs.

"U.S. Appl. No. 13/109,080, Response filed Mar. 28, 2013 to Final Office Action mailed Nov. 5, 2012", 10 pgs.

"U.S. Appl. No. 13/253,801, Final Office Action mailed Jul. 18, 2013", 39 pgs.

"U.S. Appl. No. 13/253,801, Final Office Action mailed Oct. 1, 2012", 41 pgs.

"U.S. Appl. No. 13/253,801, Non Final Office Action mailed Apr. 10, 2013", 37 pgs.

"U.S. Appl. No. 13/253,801, Non Final Office Action mailed Aug. 2, 2012", 42 pgs.

"U.S. Appl. No. 13/253,801, Notice of Allowance mailed May 16, 2014", 10 pgs.

"U.S. Appl. No. 13/253,801, Notice of Allowance mailed Jul. 16, 2014", 9 pgs.

"U.S. Appl. No. 13/253,801, Preliminary Amendment filed Oct. 5, 2011", 4 pgs.

"U.S. Appl. No. 13/253,801, Response filed Mar. 20, 2013 to Final Office Action mailed Oct. 1, 2012", 16 pgs.

"U.S. Appl. No. 13/253,801, Response filed Jul. 5, 2013 to Non Final Office Action mailed Apr. 10, 2013", 18 pgs.

"U.S. Appl. No. 13/253,801, Response filed Sep. 7, 2012 to Non Final Office Action mailed Aug. 2, 2012", 17 pgs.

"U.S. Appl. No. 13/253,801, Response filed Nov. 18, 2013 to Final Office Action mailed Jul. 18, 2013", 16 pgs.

"U.S. Appl. No. 13/253,811, Appeal Decision mailed Nov. 1, 2017", 21 pgs.

"U.S. Appl. No. 13/253,811, Final Office Action mailed Apr. 11, 2016", 14 pgs.

"U.S. Appl. No. 13/253,811, Final Office Action mailed Jul. 2, 2013", 12 pgs.

"U.S. Appl. No. 13/253,811, Final Office Action mailed Dec. 9, 2014", 13 pgs.

"U.S. Appl. No. 13/253,811, Non Final Office Action mailed May 1, 2014", 13 pgs.

"U.S. Appl. No. 13/253,811, Non Final Office Action mailed Jun. 18, 2015", 12 pgs.

"U.S. Appl. No. 13/253,811, Non Final Office Action mailed Oct. 18, 2012", 12 pgs.

"U.S. Appl. No. 13/253,811, Preliminary Amendment filed Oct. 5, 2011", 4 pgs.

"U.S. Appl. No. 13/253,811, Response filed Jan. 2, 2014 to Final Office Action mailed Jul. 2, 2013", 13 pgs.

"U.S. Appl. No. 13/253,811, Response filed Mar. 18, 2013 to Non Final Office Action mailed Oct. 18, 2012", 13 pgs.

"U.S. Appl. No. 13/253,811, Response filed Apr. 9, 2015 to Final Office Action mailed Dec. 9, 2014", 11 pgs.

"U.S. Appl. No. 13/253,811, Response filed Oct. 1, 2014 to Non Final Office Action mailed May 1, 2014", 10 pgs.

"U.S. Appl. No. 13/253,811, Response filed Oct. 19, 2015 to Non Final Office Action mailed Jun. 18, 2015", 9 pgs.

"U.S. Appl. No. 13/253,825, Examiner Interview Summary mailed Aug. 13, 2013", 3 pgs.

"U.S. Appl. No. 13/253,825, Final Office Action mailed Aug. 14, 2013", 35 pgs.

"U.S. Appl. No. 13/253,825, Final Office Action mailed Nov. 21, 2012", 33 pgs.

"U.S. Appl. No. 13/253,825, Non Final Office Action mailed Feb. 11, 2014", 45 pgs.

"U.S. Appl. No. 13/253,825, Non Final Office Action mailed Apr. 25, 2013", 32 pgs.

"U.S. Appl. No. 13/253,825, Non Final Office Action mailed Aug. 3, 2012", 32 pgs.

"U.S. Appl. No. 13/253,825, Notice of Allowance mailed Oct. 23, 2014", 16 pgs.

"U.S. Appl. No. 13/253,825, Preliminary Amendment filed Oct. 5, 2011", 4 pgs.

(56) References Cited

OTHER PUBLICATIONS

"U.S. Appl. No. 13/253,825, Response filed Mar. 20, 2013 to Final Office Action mailed Nov. 21, 2012", 17 pgs.
"U.S. Appl. No. 13/253,825, Response filed Jun. 11, 2014 to Non Final Office Action mailed Feb. 11, 2014", 16 pgs.
"U.S. Appl. No. 13/253,825, Response filed Jul. 18, 2013 to Non Final Office Action mailed Apr. 25, 2013", 16 pgs.
"U.S. Appl. No. 13/253,825, Response filed Oct. 3, 2013 to Final Office Action mailed Aug. 14, 2013", 15 pgs.
"U.S. Appl. No. 13/253,846, Advisory Action mailed Sep. 10, 2013", 3 pgs.
"U.S. Appl. No. 13/253,846, Decision on Pre-Appeal Brief Request mailed Dec. 26, 2013", 2 pgs.
"U.S. Appl. No. 13/253,846, Final Office Action mailed Apr. 12, 2016", 22 pgs.
"U.S. Appl. No. 13/253,846, Final Office Action mailed Jun. 19, 2013", 21 pgs.
"U.S. Appl. No. 13/253,846, Final Office Action mailed Oct. 23, 2014", 19 pgs.
"U.S. Appl. No. 13/253,846, Non Final Office Action mailed Mar. 7, 2014", 20 pgs.
"U.S. Appl. No. 13/253,846, Non Final Office Action mailed Jun. 25, 2015", 19 pgs.
"U.S. Appl. No. 13/253,846, Non Final Office Action mailed Oct. 29, 2012", 12 pgs.
"U.S. Appl. No. 13/253,846, Pre-Appeal Brief Request filed Oct. 21, 2013", 4 pgs.
"U.S. Appl. No. 13/253,846, Response filed Jan. 23, 2015 to Final Office Action mailed Oct. 23, 2014", 15 pgs.
"U.S. Appl. No. 13/253,846, Response filed Mar. 26, 2013 to Non Final Office Action mailed Oct. 29, 2012", 17 pgs.
"U.S. Appl. No. 13/253,846, Response filed Aug. 16, 2013 to Final Office Action mailed Jun. 19, 2013", 16 pgs.
"U.S. Appl. No. 13/253,846, Response filed Oct. 26, 2015 to Non Final Office Action mailed Jun. 25, 2015", 14 pgs.
"U.S. Appl. No. 13/253,931, Advisory Action mailed Sep. 11, 2013", 3 pgs.
"U.S. Appl. No. 13/253,931, Examiner Interview Summary mailed Sep. 12, 2013", 2 pgs.
"U.S. Appl. No. 13/253,931, Final Office Action mailed Jun. 20, 2013", 11 pgs.
"U.S. Appl. No. 13/253,931, Final Office Action mailed Dec. 3, 2014", 11 pgs.
"U.S. Appl. No. 13/253,931, Non Final Office Action mailed Apr. 18, 2014", 11 pgs.
"U.S. Appl. No. 13/253,931, Non Final Office Action mailed Nov. 28, 2012", 13 pgs.
"U.S. Appl. No. 13/253,931, Response filed Mar. 26, 2013 to Non Final Office Action mailed Nov. 28, 2012", 13 pgs.
"U.S. Appl. No. 13/253,931, Response filed Aug. 16, 2013 to Final Office Action mailed Jun. 20, 2013", 14 pgs.
"U.S. Appl. No. 13/253,931, Response filed Sep. 18, 2014 to Non Final Office Action mailed Apr. 18, 2014", 9 pgs.
"U.S. Appl. No. 13/253,931, Response filed Sep. 20, 2013 to Final Office Action mailed Jun. 20, 2013", 13 pgs.
"U.S. Appl. No. 13/253.846, Response filed Aug. 6, 2014 to Non Final Office Action mailed Mar. 7, 2014", 14 pgs.
"U.S. Appl. No. 13/255,825, Response filed Oct. 30, 2012 to Non Final Office Action mailed Aug. 3, 2012", 18 pgs.
"U.S. Appl. No. 13/275,707, Appeal Brief filed May 26, 2015", 37 pgs.
"U.S. Appl. No. 13/275,707, Examiner Interview Summary mailed Apr. 8, 2015", 3 pgs.
"U.S. Appl. No. 13/275,707, Examiner Interview Summary mailed Jul. 29, 2013", 3 pgs.
"U.S. Appl. No. 13/275,707, Examiner Interview Summary mailed Nov. 28, 2014", 2 pgs.
"U.S. Appl. No. 13/275,707, Final Office Action mailed Jul. 30, 2013", 90 pgs.
"U.S. Appl. No. 13/275,707, Final Office Action mailed Nov. 28, 2014", 57 pgs.
"U.S. Appl. No. 13/275,707, Non Final Office Action mailed Apr. 30, 2014", 94 pgs.
"U.S. Appl. No. 13/275,707, Non Final Office Action mailed Dec. 12, 2012", 39 pgs.
"U.S. Appl. No. 13/275,707, Notice of Allowance mailed Jul. 27, 2015", 19 pgs.
"U.S. Appl. No. 13/275,707, Response filed Jan. 30, 2014 to Final Office Action mailed Jul. 30, 2013", 14 pgs.
"U.S. Appl. No. 13/275,707, Response filed Apr. 9, 2013 to Non Final Office Action mailed Dec. 12, 2012", 14 pgs.
"U.S. Appl. No. 13/275,707, Response filed Aug. 28, 2014 to Non Final Office Action mailed Apr. 30, 2014", 11 pgs.
"U.S. Appl. No. 13/309,039, Advisory Action mailed Apr. 16, 2013", 3 pgs.
"U.S. Appl. No. 13/309,039, Appeal Brief filed Jul. 5, 2013", 18 pgs.
"U.S. Appl. No. 13/309,039, Appeal Brief filed Sep. 3, 2014", 20 pgs.
"U.S. Appl. No. 13/309,039, Appeal Decision mailed Sep. 23, 2016", 10 pgs.
"U.S. Appl. No. 13/309,039, Decision on Pre-Appeal Brief Request mailed Jun. 7, 2013", 2 pgs.
"U.S. Appl. No. 13/309,039, Examiner Interview Summary mailed Oct. 23, 2012", 3 pgs.
"U.S. Appl. No. 13/309,039, Examiner's Answer to Appeal Brief mailed Nov. 14, 2014" 11 pgs.
"U.S. Appl. No. 13/309,039, Final Office Action mailed Jan. 2, 2013", 11 pgs.
"U.S. Appl. No. 13/309,039, Non Final Office Action mailed Sep. 11, 2012", 9 pgs.
"U.S. Appl. No. 13/309,039, Non Final Office Action mailed Sep. 11, 2013", 13 pgs.
"U.S. Appl. No. 13/309,039, Pre-Appeal Brief Request filed May 6, 2013", 5 pgs.
"U.S. Appl. No. 13/309,039, Response filed Jan. 14, 2015 to Examiner's Answer to Appeal Brief mailed Nov. 14, 2014", 8 pgs.
"U.S. Appl. No. 13/309,039, Response filed Apr. 1, 2013 to Final Office Action mailed Jan. 2, 2013", 13 pgs.
"U.S. Appl. No. 13/309,039, Response filed 10-22-12mailed Sep. 11, 12", 13 pgs.
"U.S. Appl. No. 13/309,039, Response filed Oct. 22, 12 to Non Final Office Action mailed Sep. 11, 12", 13 pgs.
"U.S. Appl. No. 13/309,060, Advisory Action mailed Apr. 18, 14", 3 pgs.
"U.S. Appl. No. 13/309,060, Appeal Brief filed Apr. 21, 15", 16 pgs.
"U.S. Appl. No. 13/309,060, Appeal Decision mailed Aug. 25, 17", 9 pgs.
"U.S. Appl. No. 13/309,060, Final Office Action mailed Oct. 11, 13", 13 pgs.
"U.S. Appl. No. 13/309,060, Final Office Action mailed Nov. 28, 14", 13 pgs.
"U.S. Appl. No. 13/309,060, Final Office Action mailed Dec. 7, 12", 10 pgs.
"U.S. Appl. No. 13/309,060, Non Final Office Action mailed May 30, 13", 11 pgs.
"U.S. Appl. No. 13/309,060, Non Final Office Action mailed Jun. 17, 14", 12 pgs.
"U.S. Appl. No. 13/309,060, Non Final Office Action mailed Aug. 1, 12", 8 pgs.
"U.S. Appl. No. 13/309,060, Notice of Allowance mailed Nov. 27, 17", 7 pgs.
"U.S. Appl. No. 13/309,060, Response filed Mar. 4, 14 to Final Office Action mailed Dec. 24, 13", 11 pgs.
"U.S. Appl. No. 13/309,060, Response filed Apr. 8, 13 to Final Office Action mailed Dec. 7, 12", 10 pgs.
"U.S. Appl. No. 13/309,060, Response filed Aug. 15, 13 to Non Final Office Action mailed May 30, 13", 10 pgs.
"U.S. Appl. No. 13/309,060, Response filed Sep. 20, 12 to Non Final Office Action mailed Aug. 1, 12", 8 pgs.
"U.S. Appl. No. 13/309,060, Response filed Nov. 17, 14 to Non Final Office Action mailed Jun. 17, 14", 6 pgs.

(56) References Cited

OTHER PUBLICATIONS

"U.S. Appl. No. 13/309,080, Appeal Brief filed May 20, 14", 12 pgs.
"U.S. Appl. No. 13/309,080, Appeal Decision mailed May 27, 16", 8 pgs.
"U.S. Appl. No. 13/309,080, Examiner Interview Summary mailed Sep. 5, 12", 3 pgs.
"U.S. Appl. No. 13/309,080, Examiner Interview Summary mailed Dec. 17, 12", 3 pgs.
"U.S. Appl. No. 13/309,080, Final Office Action mailed Oct. 11, 13", 11 pgs.
"U.S. Appl. No. 13/309,080, Final Office Action mailed Nov. 5, 12", 8 pgs.
"U.S. Appl. No. 13/309,080, Non Final Office Action mailed Jun. 10, 13", 12 pgs.
"U.S. Appl. No. 13/309,080, Non Final Office Action mailed Jul. 30, 12", 8 pgs.
"U.S. Appl. No. 13/309,080, Notice of Non-Compliant Appeal Brief mailed 06-03- 14", 2 pgs.
"U.S. Appl. No. 13/309,080, Notice of Panel Decision from Pre-Appeal Brief Review mailed May 1, 14", 2 pgs.
"U.S. Appl. No. 13/309,080, Pre-Appeal Brief Request for Review filed Mar. 4, 14", 5 pgs.
"U.S. Appl. No. 13/309,080, Response filed Aug. 15, 13 to Non Final Office Action mailed Jun. 10, 13", 14 pgs.
"U.S. Appl. No. 13/309,080, Response filed Aug. 29, 2012 to Non Final Office Action mailed Jul. 30, 2012", 11 pgs.
"U.S. Appl. No. 13/309,080, Response filed Sep. 30, 2014 to Examiner's Answer to Appeal Brief mailed Aug. 1, 2014", 5 pgs.
"U.S. Appl. No. 13/309,080, Examiner's Answer to Appeal Brief mailed Aug. 1, 2014", 7 pgs.
"U.S. Appl. No. 13/309,102, Appeal Brief filed Jun. 5, 2014", 19 pgs.
"U.S. Appl. No. 13/309,102, Appeal Decision mailed Jun. 1, 2016", 13 pgs.
"U.S. Appl. No. 13/309,102, Decision on Pre-Appeal Brief Request mailed May 1, 2014", 2 pgs.
"U.S. Appl. No. 13/309,102, Examiner's Answer to Appeal Brief mailed Jul. 31, 2014", 6 pgs.
"U.S. Appl. No. 13/309,102, Final Office Action mailed Nov. 27, 2013", 12 pgs.
"U.S. Appl. No. 13/309,102, Final Office Action mailed Dec. 10, 2012", 10 pgs.
"U.S. Appl. No. 13/309,102, Non Final Office Action mailed May 30, 2013", 13 pgs.
"U.S. Appl. No. 13/309,102, Non Final Office Action mailed Aug. 6, 2012", 7 pgs.
"U.S. Appl. No. 13/309,102, Pre-Appeal Brief Request filed Mar. 26, 2014", 5 pgs.
"U.S. Appl. No. 13/309,102, Response filed Apr. 9, 2013 to Final Office Action mailed Dec. 10, 2012", 13 pgs.
"U.S. Appl. No. 13/309,102, Response filed Sep. 5, 2013 to Non Final Office Action mailed May 30, 2013", 13 pgs.
"U.S. Appl. No. 13/309,102, Response filed Sep. 25, 2012 to Non Final Office Action mailed Aug. 6, 2012", 10 pgs.
"U.S. Appl. No. 13/309,102, Response filed Sep. 30, 2014 to Examiner's Answer to Appeal Brief mailed Jul. 31, 2014", 4 pgs.
"U.S. Appl. No. 13/309,127, Appeal Brief filed Apr. 30, 2014", 19 pgs.
"U.S. Appl. No. 13/309,127, Appeal Decision mailed Jul. 26, 2017", 16 pgs.
"U.S. Appl. No. 13/309,127, Final Office Action mailed Oct. 10, 2012", 18 pgs.
"U.S. Appl. No. 13/309,127, Final Office Action mailed Oct. 22, 2013", 19 pgs.
"U.S. Appl. No. 13/309,127, Non Final Office Action mailed Apr. 25, 2013", 19 pgs.
"U.S. Appl. No. 13/309,127, Non Final Office Action mailed Jun. 25, 2012", 15 pgs.
"U.S. Appl. No. 13/309,127, Pre-Appeal Brief Request filed Feb. 28, 2014", 5 pgs.

"U.S. Appl. No. 13/309,127, Response filed Mar. 25, 2013 to Final Office Action mailed Oct. 10, 2012", 13 pgs.
"U.S. Appl. No. 13/309,127, Response filed Jul. 24, 2013 to Non Final Office Action mailed Apr. 25, 2013", 11 pgs.
"U.S. Appl. No. 13/309,127, Response filed Aug. 1, 2012 to Non Final Office Action mailed Jun. 25, 2012", 15 pgs.
"U.S. Appl. No. 13/309,127, Response filed Sep. 30, 2014 to Examiner's Answer to Appeal Brief mailed Jul. 31, 2014", 6 pgs.
"U.S. Appl. No. 13/309,127, Examiner's Answer to Appeal Brief mailed Jul. 31, 2014", 9 pgs.
"U.S. Appl. No. 13/309,146, Advisory Action mailed Feb. 12, 2015", 3 pgs.
"U.S. Appl. No. 13/309,146, Appeal Brief filed Jan. 12, 2015", 10 pgs.
"U.S. Appl. No. 13/309,146, Appeal Decision mailed Jun. 1, 2016", 10 pgs.
"U.S. Appl. No. 13/309,146, Final Office Action mailed Jun. 27, 2014", 14 pgs.
"U.S. Appl. No. 13/309,146, Non Final Office Action mailed Dec. 19, 2013", 10 pgs.
"U.S. Appl. No. 13/309,146, Response filed Apr. 24, 2014 to Non Final Office Action mailed Dec. 19, 2013", 10 pgs.
"U.S. Appl. No. 13/309,166, Advisory Action mailed Dec. 1, 2017", 3 pgs.
"U.S. Appl. No. 13/309,166, Appeal Brief filed Sep. 1, 2016", 17 pgs.
"U.S. Appl. No. 13/309,166, Examiner Interview Summary mailed May 20, 2015", 3 pgs.
"U.S. Appl. No. 13/309,166, Examiner Interview Summary mailed Nov. 13, 2017", 5 pgs.
"U.S. Appl. No. 13/309,166, Final Office Action mailed Aug. 10, 2017", 15 pgs.
"U.S. Appl. No. 13/309,166, Final Office Action mailed Sep. 1, 2015", 11 pgs.
"U.S. Appl. No. 13/309,166, Final Office Action mailed Nov. 13, 2013", 9 pgs.
"U.S. Appl. No. 13/309,166, Non Final Office Action mailed Feb. 13, 2015", 10 pgs.
"U.S. Appl. No. 13/309,166, Non Final Office Action mailed Feb. 22, 2013", 9 pgs.
"U.S. Appl. No. 13/309,166, Non Final Office Action mailed May 23, 2013", 9 pgs.
"U.S. Appl. No. 13/309,166, Non Final Office Action mailed Dec. 29, 2016", 15 pgs.
"U.S. Appl. No. 13/309,166, Response filed Jan. 10, 2018 to Final Office Action mailed Aug. 10, 2017", 9 pgs.
"U.S. Appl. No. 13/309,166, Response filed Apr. 11, 2014 to Final Office Action mailed Nov. 13, 2013", 13 pgs.
"U.S. Appl. No. 13/309,166, Response filed May 1, 2017 to Non Final Office Action mailed Dec. 29, 2016", 14 pgs.
"U.S. Appl. No. 13/309,166, Response filed May 13, 2015 to Non Final Office Action mailed Feb. 13, 2015", 8 pgs.
"U.S. Appl. No. 13/309,166, Response filed May 14, 2013 to Non Final Office Action mailed Feb. 22, 2013", 10 pgs.
"U.S. Appl. No. 13/309,166, Response filed Aug. 15, 2013 to Non Final Office Action mailed May 23, 2013", 11 pgs.
"U.S. Appl. No. 13/309,166, Response filed Nov. 6, 2017 to Final Office Action mailed Aug. 10, 2017", 11 pgs.
"U.S. Appl. No. 13/309,200, Appeal Brief Filed Jun. 8, 2015", 17 pgs.
"U.S. Appl. No. 13/309,200, Appeal Decision mailed Aug. 28, 2017", 12 pgs.
"U.S. Appl. No. 13/309,200, Corrected Notice of Allowability mailed Jan. 9, 2019", 2 pgs.
"U.S. Appl. No. 13/309,200, Final Office Action mailed Jan. 8, 2015", 14 pgs.
"U.S. Appl. No. 13/309,200, Final Office Action mailed Jan. 14, 2014", 15 pgs.
"U.S. Appl. No. 13/309,200, Final Office Action mailed Jun. 18, 2018", 18 pgs.
"U.S. Appl. No. 13/309,200, Non Final Office Action mailed Jul. 2, 2013", 14 pgs.

(56) References Cited

OTHER PUBLICATIONS

"U.S. Appl. No. 13/309,200, Non Final Office Action mailed Sep. 10, 2012", 12 pgs.
"U.S. Appl. No. 13/309,200, Non Final Office Action mailed Sep. 24, 2014", 14 pgs.
"U.S. Appl. No. 13/309,200, Non Final Office Action mailed Dec. 4, 2017", 17 pgs.
"U.S. Appl. No. 13/309,200, Notice of Allowance mailed Dec. 6, 2018", 9 pgs.
"U.S. Appl. No. 13/309,200, Preliminary Amendment filed Dec. 8, 2011", 8 pgs.
"U.S. Appl. No. 13/309,200, Response filed Jan. 2, 2014 to Non Final Office Action mailed Jul. 2, 2013", 12 pgs.
"U.S. Appl. No. 13/309,200, Response filed Mar. 11, 2013 to Non Final Office Action mailed Sep. 10, 2012", 13 pgs.
"U.S. Appl. No. 13/309,200, Response filed Apr. 4, 2018 to Non Final Office Action mailed Dec. 4, 2017", 11 pgs.
"U.S. Appl. No. 13/309,200, Response filed Jul. 10, 2014 to Final Office Action mailed Jan. 14, 2014", 13 pgs.
"U.S. Appl. No. 13/309,200, Response filed Jan. 17, 2018 to Final Office Action mailed Jun. 18, 2018", 38 pgs.
"U.S. Appl. No. 13/309,200, Response filed Oct. 30, 2017 to Final Office Action mailed Jan. 8, 2017", 12 pgs.
"U.S. Appl. No. 13/309,200, Response filed Dec. 23, 2014 to Non Final Office Action mailed Sep. 24, 2014", 9 pgs.
"U.S. Appl. No. 13/310,279, Appeal Brief filed Nov. 3, 2014", 19 pgs.
"U.S. Appl. No. 13/310,279, Appeal Brief filed Sep. 11, 2019", 19 pgs.
"U.S. Appl. No. 13/310,279, Appeal Decision mailed Aug. 30, 2017", 9 pgs.
"U.S. Appl. No. 13/310,279, Examiner Interview Summary mailed Nov. 19, 2013", 3 pgs.
"U.S. Appl. No. 13/310,279, Final Office Action mailed Jul. 23, 2020", 23 pgs.
"U.S. Appl. No. 13/310,279, Final Office Action mailed Sep. 10, 2018", 24 pgs.
"U.S. Appl. No. 13/310,279, Final Office Action mailed Dec. 3, 2013", 14 pgs.
"U.S. Appl. No. 13/310,279, Non Final Office Action mailed Jan. 31, 2020", 25 pgs.
"U.S. Appl. No. 13/310,279, Non Final Office Action mailed Feb. 2, 2018", 21 pgs.
"U.S. Appl. No. 13/310,279, Non Final Office Action mailed Jun. 17, 2013", 12 pgs.
"U.S. Appl. No. 13/310,279, Pre-Appeal Brief Request filed Apr. 3, 2014", 5 pgs.
"U.S. Appl. No. 13/310,279, Reply Brief dated Jan. 4, 2016 to Appeal Brief filed Nov. 3, 2014", 3 pgs.
"U.S. Appl. No. 13/310,279, Response filed May 2, 2018 to Non Final Office Action mailed Feb. 2, 2018", 10 pgs.
"U.S. Appl. No. 13/310,279, Response filed Jun. 1, 2020 to Non Final Office Action mailed Jan. 31, 2020", 11 pgs.
"U.S. Appl. No. 13/310,279, Response filed Sep. 13, 2013 to Non Final Office Action mailed Jun. 17, 2013", 15 pgs.
"U.S. Appl. No. 13/310,279, Response filed Oct. 30, 2017 to Non Final Office Action mailed Dec. 3, 2017", 8 pgs.
"U.S. Appl. No. 13/310,322, Appeal Brief filed Jan. 15, 2015", 17 pgs.
"U.S. Appl. No. 13/310,322, Appeal Decision mailed Sep. 20, 2017", 18 pgs.
"U.S. Appl. No. 13/310,322, Decision on Pre-Appeal Brief Request mailed Sep. 15, 2015", 2 pgs.
"U.S. Appl. No. 13/310,322, Final Office Action mailed Feb. 13, 2014", 15 pgs.
"U.S. Appl. No. 13/310,322, Final Office Action mailed Mar. 31, 2015", 16 pgs.
"U.S. Appl. No. 13/310,322, Non Final Office Action mailed Jul. 2, 2013", 16 pgs.
"U.S. Appl. No. 13/310,322, Non Final Office Action mailed Oct. 3, 2014", 16 pgs.
"U.S. Appl. No. 13/310,322, Pre-Appeal Brief Request filed Jul. 31, 2015", 5 pgs.
"U.S. Appl. No. 13/310,322, Reply Brief filed Aug. 15, 2016", 4 pgs.
"U.S. Appl. No. 13/310,322, Response filed Jan. 5, 2015 to Non Final Office Action mailed Oct. 3, 2014", 12 pgs.
"U.S. Appl. No. 13/310,322, Response filed Nov. 1, 2013 to Non Final Office Action mailed Jul. 2, 2013", 12 pgs.
"U.S. Appl. No. 13/310,332, Response filed Jul. 14, 2014 to Final Office Action mailed Feb. 13, 2014", 12 pgs.
"U.S. Appl. No. 13/310,368, Advisory Action mailed Jun. 9, 2015", 3 pgs.
"U.S. Appl. No. 13/310,368, Advisory Action mailed Jul. 8, 2015", 2 pgs.
"U.S. Appl. No. 13/310,368, Advisory Action mailed Aug. 21, 2015", 2 pgs.
"U.S. Appl. No. 13/310,368, Appeal Brief filed Aug. 2, 2018", 17 pgs.
"U.S. Appl. No. 13/310,368, Appeal Brief filed Aug. 17, 2015", 27 pgs.
"U.S. Appl. No. 13/310,368, Appeal Decision mailed Aug. 30, 2017", 11 pgs.
"U.S. Appl. No. 13/310,368, Final Office Action mailed Jan. 7, 2014", 17 pgs.
"U.S. Appl. No. 13/310,368, Final Office Action mailed Mar. 18, 2015", 15 pgs.
"U.S. Appl. No. 13/310,368, Final Office Action mailed Jul. 18, 2019", 12 pgs.
"U.S. Appl. No. 13/310,368, Non Final Office Action mailed Jun. 17, 2013", 17 pgs.
"U.S. Appl. No. 13/310,368, Non Final Office Action mailed Sep. 12, 2014", 19 pgs.
"U.S. Appl. No. 13/310,368, Non Final Office Action mailed Nov. 29, 2018", 16 pgs.
"U.S. Appl. No. 13/310,368, Non Final Office Action mailed Dec. 1, 2017", 17 pgs.
"U.S. Appl. No. 13/310,368, Notice of Allowance mailed Dec. 5, 2019", 11 pgs.
"U.S. Appl. No. 13/310,368, Response filed May 18, 2015 to Final Office Action mailed Mar. 18, 2015", 11 pgs.
"U.S. Appl. No. 13/310,368, Response filed Jan. 7, 2014 to Final Office Action mailed Jan. 7, 2014", 12 pgs.
"U.S. Appl. No. 13/310,368, Response filed Sep. 17, 2013 to Non Final Office Action mailed Jun. 17, 2013", 15 pgs.
"U.S. Appl. No. 13/310,368, Response filed Oct. 18, 2019 to Final Office Action mailed Jul. 18, 2019", 10 pgs.
"U.S. Appl. No. 13/310,368, Response filed Oct. 30, 2017 to Final Office Action mailed Mar. 18, 2015", 8 pgs.
"U.S. Appl. No. 13/310,368, Response filed Dec. 12, 2014 to Non Final Office Action mailed Sep. 12, 2014", 9 pgs.
"U.S. Appl. No. 13/310,368, Response filed Apr. 29, 2019 to Non Final Office Action mailed Nov. 29, 2018", 12 pgs.
"U.S. Appl. No. 13/310,417, Appeal Brief filed Sep. 11, 2015", 19 pgs.
"U.S. Appl. No. 13/310,417, Final Office Action mailed Jan. 9, 2014", 17 pgs.
"U.S. Appl. No. 13/310,417, Final Office Action mailed Mar. 11, 2015", 17 pgs.
"U.S. Appl. No. 13/310,417, Non Final Office Action mailed Feb. 11, 2016", 12 pgs.
"U.S. Appl. No. 13/310,417, Non Final Office Action mailed Jun. 17, 2013", 13 pgs.
"U.S. Appl. No. 13/310,417, Non Final Office Action mailed Sep. 8, 2014", 17 pgs.
"U.S. Appl. No. 13/310,417, Response filed May 27, 2014 to Final Office Action mailed Jan. 9, 2014", 14 pgs.
"U.S. Appl. No. 13/310,417, Response filed Sep. 17, 2013 to Non Final Office Action mailed Jun. 17, 2013", 14 pgs.
"U.S. Appl. No. 13/310,452, Advisory Action mailed Jul. 17, 2014", 3 pgs.

(56) References Cited

OTHER PUBLICATIONS

"U.S. Appl. No. 13/310,452, Appeal Brief filed Oct. 17, 2016", 25 pgs.
"U.S. Appl. No. 13/310,452, Appeal Decision mailed Sep. 29, 2017", 20 pgs.
"U.S. Appl. No. 13/310,452, Decision on Pre-Appeal Brief mailed Apr. 17, 2015", 2 pgs.
"U.S. Appl. No. 13/310,452, Final Office Action mailed May 1, 2014", 18 pgs.
"U.S. Appl. No. 13/310,452, Final Office Action mailed Dec. 15, 2015", 21 pgs.
"U.S. Appl. No. 13/310,452, Non Final Office Action mailed May 4, 2015", 17 pgs.
"U.S. Appl. No. 13/310,452, Non Final Office Action mailed Jul. 10, 2013", 14 pgs.
"U.S. Appl. No. 13/310,452, Non Final Office Action mailed Oct. 6, 2014", 18 pgs.
"U.S. Appl. No. 13/310,452, Pre-Appeal Brief Request filed Mar. 5, 2015", 5 pgs.
"U.S. Appl. No. 13/310,452, Response filed Jan. 10, 2014 to Non Final Office Action mailed Jul. 10, 2013", 11 pgs.
"U.S. Appl. No. 13/310,452, Response filed Jul. 1, 2014 to Final Office Action mailed May 1, 2014", 11 pgs.
"U.S. Appl. No. 13/310,452, Response filed Sep. 3, 2015 to Non Final Office Action mailed May 4, 2015", 14 pgs.
"U.S. Appl. No. 13/312,507, Final Office Action mailed Nov. 21, 2014", 12 pgs.
"U.S. Appl. No. 13/312,507, Non Final Office Action mailed Mar. 26, 2015", 13 pgs.
"U.S. Appl. No. 13/312,507, Non Final Office Action mailed May 27, 2014", 13 pgs.
"U.S. Appl. No. 13/312,507, Notice of Allowance mailed Oct. 30, 2015", 19 pgs.
"U.S. Appl. No. 13/312,507, PTO Response to Rule 312 Communication mailed Feb. 16, 2016", 2 pgs.
"U.S. Appl. No. 13/312,507, Response filed Feb. 19, 2015 to Final Office Action mailed Nov. 21, 2014", 10 pgs.
"U.S. Appl. No. 13/312,507, Response filed Jul. 27, 2015 to Non Final Office Action mailed Mar. 26, 2015", 11 pgs.
"U.S. Appl. No. 13/312,507, Response filed Oct. 27, 2014 to Non Final Office Action mailed May 27, 2014", 10 pgs.
"U.S. Appl. No. 13/351,533, Final Office Action mailed Jan. 23, 2013", 33 pgs.
"U.S. Appl. No. 13/351,533, Final Office Action mailed Mar. 20, 2015", 28 pgs.
"U.S. Appl. No. 13/351,533, Non Final Office Action mailed Feb. 4, 2014", 26 pgs.
"U.S. Appl. No. 13/351,533, Non Final Office Action mailed May 25, 2012", 20 pgs.
"U.S. Appl. No. 13/351,533, Non Final Office Action mailed Sep. 6, 2012", 26 pgs.
"U.S. Appl. No. 13/351,533, Non Final Office Action mailed Oct. 14, 2014", 25 pgs.
"U.S. Appl. No. 13/351,533, Response filed Jan. 14, 2015 to Non Final Office Action mailed Oct. 14, 2014", 18 pgs.
"U.S. Appl. No. 13/351,533, Response filed Apr. 10, 2013 to Final Office Action mailed Jan. 23, 2013", 12 pgs.
"U.S. Appl. No. 13/351,533, Response Filed Jun. 3, 2014 to Non Final Office Action mailed Feb. 4, 2014", 14 pgs.
"U.S. Appl. No. 13/351,533, Response filed Jun. 8, 2012 to Non Final Office Action mailed May 25, 2012", 12 pgs.
"U.S. Appl. No. 13/351,533, Response filed Nov. 20, 2012 to Non Final Office Action mailed Sep. 6, 2012", 14 pgs.
"U.S. Appl. No. 13/408,877, Appeal Brief filed Nov. 10, 2015", 14 [gs/.
"U.S. Appl. No. 13/408,877, Appeal Decision mailed Sep. 6, 2017", 23 pgs.
"U.S. Appl. No. 13/408,877, Final Office Action mailed May 8, 2015", 24 pgs.
"U.S. Appl. No. 13/408,877, Final Office Action mailed Sep. 3, 2013", 27 pgs.
"U.S. Appl. No. 13/408,877, Non Final Office Action mailed Feb. 28, 2013", 22 pgs.
"U.S. Appl. No. 13/408,877, Non Final Office Action mailed Oct. 8, 2014", 26 pgs.
"U.S. Appl. No. 13/408,877, Response filed Jan. 8, 2015 to Non Final Office Action mailed Oct. 8, 2014", 15 pgs.
"U.S. Appl. No. 13/408,877, Response filed May 16, 2013 to Non Final Office Action mailed Feb. 28, 2013", 17 pgs.
"U.S. Appl. No. 13/408,877, Response filed Dec. 3, 2013 to Final Office Action mailed Sep. 3, 2013", 18 pgs.
"U.S. Appl. No. 13/408,917, Appeal Brief filed Jan. 19, 2016", 18 pgs.
"U.S. Appl. No. 13/408,917, Appeal Decision mailed Sep. 12, 2017", 19 pgs.
"U.S. Appl. No. 13/408,917, Decision on Pre-Appeal Brief Request mailed Sep. 17, 2015", 2 pgs.
"U.S. Appl. No. 13/408,917, Examiner Interview Summary mailed Aug. 28, 2013", 3 pgs.
"U.S. Appl. No. 13/408,917, Final Office Action mailed May 11, 2015", 23 pgs.
"U.S. Appl. No. 13/408,917, Final Office Action mailed Aug. 28, 2013", 24 pgs.
"U.S. Appl. No. 13/408,917, Non Final Office Action mailed Mar. 5, 2013", 18 pgs.
"U.S. Appl. No. 13/408,917, Non Final Office Action mailed Oct. 9, 2014", 24 pgs.
"U.S. Appl. No. 13/408,917, Pre-Appeal Brief Request filed Aug. 12, 2015", 5 pgs.
"U.S. Appl. No. 13/408,917, Reply Brief filed Oct. 3, 2016", 4 pgs.
"U.S. Appl. No. 13/408,917, Response filed Jan. 9, 2015 to Non Final Office Action mailed Oct. 9, 2014", 13 pgs.
"U.S. Appl. No. 13/408,917, Response filed Jun. 3, 2013 to Non Final Office Action mailed Mar. 5, 2013", 16 pgs.
"U.S. Appl. No. 13/408,917, Response filed Nov. 27, 2013 to Final Office Action mailed Aug. 28, 2013", 17 pgs.
"U.S. Appl. No. 13/409,189 Examiner's Answer mailed Jan. 4, 2017", 12 pgs.
"U.S. Appl. No. 13/409,189, Appeal Brief filed Oct. 25, 2016", 30 pgs.
"U.S. Appl. No. 13/409,189, Appeal Decision mailed Dec. 18, 2017", 14 pgs.
"U.S. Appl. No. 13/409,189, Examiner Interview Summary mailed Aug. 30, 2013", 3 pgs.
"U.S. Appl. No. 13/409,189, Final Office Action mailed May 8, 2015", 23 pgs.
"U.S. Appl. No. 13/409,189, Final Office Action mailed Aug. 28, 2013", 22 pgs.
"U.S. Appl. No. 13/409,189, Non Final Office Action mailed Feb. 28, 2013", 20 pgs.
"U.S. Appl. No. 13/409,189, Non Final Office Action mailed Oct. 9, 2014", 23 pgs.
"U.S. Appl. No. 13/409,189, Non Final Office Action mailed Dec. 23, 2015", 12 pgs.
"U.S. Appl. No. 13/409,189, Response filed Jan. 9, 2015 to Non Final Office Action mailed Oct. 9, 2014", 13 pgs.
"U.S. Appl. No. 13/409,189, Response filed May 28, 2013 to Non Final Office Action mailed Feb. 28, 2013", 16 pgs.
"U.S. Appl. No. 13/409,189, Response filed Sep. 8, 2005 to Final Office Action mailed May 8, 2015", 16 pgs.
"U.S. Appl. No. 13/409,189, Response filed Nov. 27, 2013 to Final Office Action mailed Aug. 28, 2013", 15 pgs.
"U.S. Appl. No. 13/422,750, Final Office Action mailed Jun. 15, 2016", 37 pgs.
"U.S. Appl. No. 13/422,750, Final Office Action mailed Aug. 7, 2013", 29 pgs.
"U.S. Appl. No. 13/422,750, Non Final Office Action mailed Apr. 1, 2014", 32 pgs.
"U.S. Appl. No. 13/422,750, Non Final Office Action mailed Apr. 12, 2013", 19 pgs.
"U.S. Appl. No. 13/422,750, Non Final Office Action mailed Oct. 31, 2014", 32 pgs.

(56) References Cited

OTHER PUBLICATIONS

"U.S. Appl. No. 13/422,750, Response filed Jan. 30, 2014 to Final Office Action mailed Aug. 7, 2013", 13 pgs.
"U.S. Appl. No. 13/422,750, Response filed Feb. 2, 2015 to Non Final Office Action mailed Oct. 31, 2014", 11 pgs.
"U.S. Appl. No. 13/422,750, Response filed Jul. 12, 2013 to Non Final Office Action mailed Apr. 12, 2013", 14 pgs.
"U.S. Appl. No. 13/422,750, Response filed Sep. 2, 2014 to Non Final Office Action mailed Apr. 1, 2014", 10 pgs.
"U.S. Appl. No. 13/424,682, Non Final Office Action mailed Apr. 11, 2013", 6 pgs.
"U.S. Appl. No. 13/424,682, Notice of Allowance mailed Jul. 30, 2013", 13 pgs.
"U.S. Appl. No. 13/424,682, Response filed Jul. 5, 2013 to Non Final Office Action mailed Apr. 11, 2013", 10 pgs.
"U.S. Appl. No. 13/424,705, Advisory Action mailed Nov. 29, 2013", 3 pgs.
"U.S. Appl. No. 13/424,705, Final Office Action mailed Sep. 11, 2015", 28 pgs.
"U.S. Appl. No. 13/424,705, Final Office Action mailed Sep. 19, 2013", 11 pgs.
"U.S. Appl. No. 13/424,705, Non Final Office Action mailed Apr. 12, 2013", 14 pgs.
"U.S. Appl. No. 13/424,705, Non Final Office Action mailed Jun. 16, 2014", 21 pgs.
"U.S. Appl. No. 13/424,705, Non Final Office Action mailed Jul. 23, 2014", 21 pgs.
"U.S. Appl. No. 13/424,705, Response filed Jul. 12, 2013 to Non Final Office Action mailed Apr. 12, 2013", 11 pgs.
"U.S. Appl. No. 13/424,705, Response filed Nov. 19, 2013 to Final Office Action mailed Sep. 19, 2013", 11 pgs.
"U.S. Appl. No. 13/424,705, Response filed Nov. 24, 2014 to Non Final Office Action mailed Jul. 23, 2014", 14 pgs.
"U.S. Appl. No. 13/452,400, Examiner Interview Summary mailed Sep. 11, 2013", 3 pgs.
"U.S. Appl. No. 13/452,400, Final Office Action mailed Jul. 5, 2013", 25 pgs.
"U.S. Appl. No. 13/452,400, Final Office Action mailed Jul. 30, 2015", 32 pgs.
"U.S. Appl. No. 13/452,400, Non Final Office Action mailed Jan. 15, 2015", 24 pgs.
"U.S. Appl. No. 13/452,400, Non Final Office Action mailed Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action mailed Oct. 5, 2012", 12 pgs.
"U.S. Appl. No. 13/452,400, Response filed Apr. 15, 2015 to Non Final Office Action mailed Jan. 15, 2015", 31 pgs.
"U.S. Appl. No. 13/452,400, Response filed Sep. 26, 2013 to Final Office Action", 12 pgs.
"U.S. Appl. No. 13/464,598, Appeal Brief filed Jan. 28, 2016", 19 pgs.
"U.S. Appl. No. 13/464,598, Appeal Decision mailed Jul. 31, 2017", 18 pgs.
"U.S. Appl. No. 13/464,598, Examiner Interview Summary mailed May 1, 2014", 3 pgs.
"U.S. Appl. No. 13/464,598, Final Office Action mailed Jul. 28, 2015", 38 pgs.
"U.S. Appl. No. 13/464,598, Non Final Office Action mailed Mar. 16, 2015", 51 pgs.
"U.S. Appl. No. 13/464,598, Non Final Office Action mailed Dec. 4, 2013", 26 pgs.
"U.S. Appl. No. 13/464,598, Notice of Allowance mailed Oct. 12, 2017", 5 pgs.
"U.S. Appl. No. 13/464,598, Response filed Apr. 5, 2014 to Non Final Office Action mailed Dec. 4, 2013", 44 pgs.
"U.S. Appl. No. 13/464,598, Response filed Jul. 16, 2015 to Non Final Office Action mailed Mar. 16, 2015", 24 pgs.
"U.S. Appl. No. 13/464,598, Response filed Oct. 2, 2017 to Final Office Action mailed Jul. 28, 2017", 17 pgs.
"U.S. Appl. No. 13/553,572 Response filed Jun. 3, 2013 to Non-Final Office Action mailed Mar. 7, 2013", 17 pgs.
"U.S. Appl. No. 13/553,572, Final Office Action mailed Jul. 2, 2013", 12 pgs.
"U.S. Appl. No. 13/553,572, Non Final Office Action mailed Mar. 7, 2013", 14 pgs.
"U.S. Appl. No. 13/553,572, Non Final Office Action mailed Nov. 4, 2014", 13 pgs.
"U.S. Appl. No. 13/553,572, Preliminary Amendment filed Sep. 17, 2012", 7 pgs.
"U.S. Appl. No. 13/553,572, Response filed Jan. 2, 2014 to Final Office Action mailed Jul. 2, 2013", 15 pgs.
"U.S. Appl. No. 13/553,596, Advisory Action mailed Apr. 29, 2015", 3 pgs.
"U.S. Appl. No. 13/553,596, Final Office Action mailed Feb. 4, 2015", 16 pgs.
"U.S. Appl. No. 13/553,596, Non Final Office Action mailed Jul. 28, 2014", 14 pgs.
"U.S. Appl. No. 13/553,596, Non Final Office Action mailed Aug. 31, 2015", 17 pgs.
"U.S. Appl. No. 13/553,596, Response filed Apr. 6, 2015 to Final Office Action mailed Feb. 4, 2015", 10 pgs.
"U.S. Appl. No. 13/553,596, Response filed Nov. 26, 2014 to Non Final Office Action mailed Jul. 28, 2014", 8 pgs.
"U.S. Appl. No. 13/594,002, Final Office Action mailed Mar. 19, 2015", 36 pgs.
"U.S. Appl. No. 13/594,002, Final Office Action mailed Jul. 31, 2013", 24 pgs.
"U.S. Appl. No. 13/594,002, Final Office Action mailed Sep. 6, 2016", 55 pgs.
"U.S. Appl. No. 13/594,002, Non Final Office Action mailed Feb. 27, 2013", 21 pgs.
"U.S. Appl. No. 13/594,002, Non Final Office Action mailed Nov. 30, 2015", 41 pgs.
"U.S. Appl. No. 13/594,002, Non Final Office Action mailed Dec. 4, 2014", 29 pgs.
"U.S. Appl. No. 13/594,002, Response filed Mar. 3, 2015 to Non Final Office Action mailed Dec. 4, 2014", 23 pgs.
"U.S. Appl. No. 13/594,002, Response filed May 14, 2013 to Non Final Office Action mailed Feb. 27, 2013", 11 pgs.
"U.S. Appl. No. 13/594,002, Response filed May 31, 2016 to Non Final Offic Action mailed Nov. 30, 2015", 12 pgs.
"U.S. Appl. No. 13/594,002, Response filed Aug. 19, 2015 to Final Office Action mailed Mar. 19, 2015", 14 pgs.
"U.S. Appl. No. 13/594,002, Response filed Oct. 28, 2013 to Final Office Action mailed Jul. 31, 2013", 11 pgs.
"U.S. Appl. No. 13/679,830, Examiner Interview Summary mailed Sep. 28, 2017", 3 pgs.
"U.S. Appl. No. 13/679,830, Final Office Action mailed Jan. 31, 2014", 27 pgs.
"U.S. Appl. No. 13/679,830, Final Office Action mailed Apr. 23, 2015", 36 pgs.
"U.S. Appl. No. 13/679,830, Final Office Action mailed Sep. 9, 2016", 59 pgs.
"U.S. Appl. No. 13/679,830, Final Office Action mailed Nov. 15, 2017", 98 pgs.
"U.S. Appl. No. 13/679,830, Non Final Office Action mailed Jan. 4, 2016", 61 pgs.
"U.S. Appl. No. 13/679,830, Non Final Office Action mailed Jun. 14, 2013", 21 pgs.
"U.S. Appl. No. 13/679,830, Non Final Office Action mailed Jun. 15, 2017", 82 pgs.
"U.S. Appl. No. 13/679,830, Non Final Office Action mailed Nov. 6, 2014", 36 pgs.
"U.S. Appl. No. 13/679,830, Response filed Feb. 6, 2015 to Non Final Office Action mailed Nov. 6, 2014", 12 pgs.
"U.S. Appl. No. 13/679,830, Response filed Feb. 9, 2017 to Final Office Action mailed Sep. 9, 2016", 19 pgs.
"U.S. Appl. No. 13/679,830, Response filed Jun. 12, 2014 to Final Office Action mailed Jan. 31, 2014", 16 pgs.

(56) References Cited

OTHER PUBLICATIONS

"U.S. Appl. No. 13/679,830, Response filed Jul. 5, 2016 to Non Final Office Action mailed Jan. 4, 2016", 11 pgs.
"U.S. Appl. No. 13/679,830, Response filed Sep. 23, 2015 to Final Office Action mailed Apr. 23, 2015", 14 pgs.
"U.S. Appl. No. 13/679,830, Response Filed Oct. 16, 2017 to Non Final Office Action mailed Jun. 15, 2017", 13 pgs.
"U.S. Appl. No. 13/679,830, Response filed Nov. 14, 2013 to Non Final Office Action mailed Jun. 14, 2013", 14 pgs.
"U.S. Appl. No. 14/094,542, Final Office Action mailed Feb. 9, 2015", 6 pgs.
"U.S. Appl. No. 14/094,542, Final Office Action mailed Sep. 2, 2015", 6 pgs.
"U.S. Appl. No. 14/094,542, Non Final Office Action mailed Feb. 12, 2014", 7 pgs.
"U.S. Appl. No. 14/094,542, Non Final Office Action mailed May 19, 2015", 5 pgs.
"U.S. Appl. No. 14/094,542, Non Final Office Action mailed Aug. 15, 2014", 7 pgs.
"U.S. Appl. No. 14/094,542, Response filed Jan. 15, 2015 to Non Final Office Action mailed Aug. 15, 2014", 10 pgs.
"U.S. Appl. No. 14/094,542, Response filed May 11, 2015 to Final Office Action mailed Feb. 9, 2015", 12 pgs.
"U.S. Appl. No. 14/094,542, Response filed Jul. 14, 2014 to Non Final Office Action mailed Feb. 12, 2014", 12 pgs.
"U.S. Appl. No. 14/094,542, Response filed Aug. 19, 2015 to Non Final Office Action mailed May 19, 2015", 12 pgs.
"U.S. Appl. No. 14/536,320, Non Final Office Action mailed Mar. 25, 2015", 9 pgs.
"U.S. Appl. No. 14/540,346, Non Final Office Action mailed Aug. 24, 2015", 16 pgs.
"U.S. Appl. No. 14/540,346, Notice of Allowance mailed Mar. 18, 2016", 7 pgs.
"U.S. Appl. No. 14/540,346, Preliminary Amendment filed Dec. 11, 2014", 8 pgs.
"U.S. Appl. No. 14/540,346, Response filed Dec. 23, 2015 to Non Final Office Action mailed Aug. 24, 2015", 7 pgs.
"U.S. Appl. No. 14/608,520, Appeal Brief filed May 12, 2017", 25 pgs.
"U.S. Appl. No. 14/608,520, Appeal Decision mailed Nov. 27, 2017", 14 pgs.
"U.S. Appl. No. 14/608,520, Final Office Action mailed Oct. 12, 2016", 44 pgs.
"U.S. Appl. No. 14/608,520, Non Final Office Action mailed Mar. 18, 2016", 39 pgs.
"U.S. Appl. No. 14/608,520, Non Final Office Action mailed Oct. 15, 2015", 19 pgs.
"U.S. Appl. No. 14/608,520, Preliminary Amendment filed Feb. 26, 2015", 10 pgs.
"U.S. Appl. No. 14/608,520, Response filed Jan. 15, 2016 to Non Final Office Action mailed Oct. 15, 2015", 9 pgs.
"U.S. Appl. No. 14/608,520, Response filed Sep. 19, 2016 to Non Final Office Action mailed Mar. 18, 2016", 12 pgs.
"U.S. Appl. No. 14/628,941, Appeal Brief filed May 12, 2017".
"U.S. Appl. No. 14/628,941, Appeal Decision mailed Dec. 6, 2017", 14 pgs.
"U.S. Appl. No. 14/628,941, Final Office Action mailed Oct. 13, 2016", 43 pgs.
"U.S. Appl. No. 14/628,941, Non Final Office Action mailed Mar. 18, 2016", 38 pgs.
"U.S. Appl. No. 14/628,941, Non Final Office Action mailed Sep. 24, 2015", 21 pgs.
"U.S. Appl. No. 14/628,941, Preliminary Amendment filed Feb. 26, 2015", 9 pgs.
"U.S. Appl. No. 14/628,941, Response filed Sep. 19, 2016 to Non Final Office Action mailed Mar. 18, 2016", 12 pgs.
"U.S. Appl. No. 14/628,941, Response filed Dec. 23, 2015 to Non Final Office Action mailed Sep. 24, 2015", 9 pgs.
"U.S. Appl. No. 14/750,559, Final Office Action mailed Nov. 29, 2018", 22 pgs.
"U.S. Appl. No. 14/750,559, Non Final Office Action mailed Feb. 27, 2018", 15 pgs.
"U.S. Appl. No. 14/750,559, Non Final Office Action mailed Jun. 13, 2019", 11 pgs.
"U.S. Appl. No. 14/750,559, Preliminary Amendment filed Jun. 26, 2015 t", 9 pgs.
"U.S. Appl. No. 14/750,559, Response filed Jul. 27, 2018 to Non Final Office Action mailed Feb. 27, 2018", 12 pgs.
"U.S. Appl. No. 14/750,559, Response filed Mar. 29, 2019 to Final Office Action mailed Nov. 29, 2018", 13 pgs.
"U.S. Appl. No. 14/750,559, Response filed Sep. 13, 2019 to Non-Final Office Action mailed Jun. 13, 2019", 12 pgs.
"U.S. Appl. No. 14/826,006, Advisory Action mailed May 10, 2017", 3 pgs.
"U.S. Appl. No. 14/826,006, Final Office Action mailed Jan. 17, 2017", 13 pgs.
"U.S. Appl. No. 14/826,006, Final Office Action mailed Jan. 19, 2018", 17 pgs.
"U.S. Appl. No. 14/826,006, Non Final Office Action mailed Jun. 2, 2016", 11 pgs.
"U.S. Appl. No. 14/826,006, Non Final Office Action mailed Aug. 18, 2017", 16 pgs.
"U.S. Appl. No. 14/826,006, Preliminary Amendment filed Aug. 28, 2015", 6 pgs.
"U.S. Appl. No. 14/826,006, Response filed Apr. 18, 2017 to Final Office Action mailed Jan. 17, 2017", 13 pgs.
"U.S. Appl. No. 14/826,006, Response filed Nov. 1, 2016 to Non Final Office Action mailed Jun. 2, 2016", 7 pgs.
"U.S. Appl. No. 14/826,006, Response filed Nov. 17, 2017 to Non Final Office Action mailed Aug. 18, 2017", 11 pgs.
"U.S. Appl. No. 14/826,018, Non Final Office Action mailed Jan. 11, 2017", 19 pgs.
"U.S. Appl. No. 14/826,018, Notice of Allowance mailed Aug. 28, 2017", 13 pgs.
"U.S. Appl. No. 14/826,018, Preliminary Amendment filed Aug. 28, 2015", 8 pgs.
"U.S. Appl. No. 14/826,018, Response Filed May 11, 2017 to Non Final Office Action mailed Jan. 11, 2017", 14 pgs.
"U.S. Appl. No. 14/826,025, Final Office Action mailed May 15, 2017", 13 pgs.
"U.S. Appl. No. 14/826,025, Non Final Office Action mailed Aug. 25, 2016", 14 pgs.
"U.S. Appl. No. 14/826,025, Preliminary Amendment filed Aug. 28, 2015", 6 pgs.
"U.S. Appl. No. 14/826,025, Response filed Jan. 25, 2017 to Non Final Office Action mailed Aug. 25, 2016", 13 pgs.
"U.S. Appl. No. 14/952,699, Non Final Office Action mailed Jun. 8, 2016", 9 pgs.
"U.S. Appl. No. 14/952,699, Notice of Allowability mailed Oct. 7, 2016", 5 pgs.
"U.S. Appl. No. 14/952,699, Notice of Allowance mailed Jan. 9, 2017", 9 pgs.
"U.S. Appl. No. 14/952,699, Notice of Allowance mailed Sep. 19, 2016", 8 pgs.
"U.S. Appl. No. 14/952,699, Preliminary Amendment filed May 27, 2016", 8 pgs.
"U.S. Appl. No. 14/952,699, Response filed Sep. 8, 2016 to Non Final Office Action mailed Jun. 8, 2016", 8 pgs.
"U.S. Appl. No. 15/057,047, Non Final Office Action mailed Sep. 29, 2016", 19 pgs.
"U.S. Appl. No. 15/057,047, Notice of Allowance mailed Feb. 10, 2017", 11 pgs.
"U.S. Appl. No. 15/057,047, Preliminary Amendment filed Sep. 15, 2016", 5 pgs.
"U.S. Appl. No. 15/057,047, Response Filed Dec. 29, 2016 to Non Final Office Action mailed Sep. 29, 2016", 11 pgs.
"U.S. Appl. No. 15/211,917, Non Final Office Action mailed Nov. 15, 2017", 13 pgs.
"U.S. Appl. No. 15/211,917, Preliminary Amendment filed Dec. 2, 2016", 8 pgs.
"U.S. Appl. No. 15/595,629, Preliminary Amendment filed Jul. 24, 2017", 8 pgs.

(56) References Cited

OTHER PUBLICATIONS

"U.S. Appl. No. 15/619,150, Preliminary Amendment filed Aug. 28, 2017", 8 pgs.
"U.S. Appl. No. 15/722,868, Advisory Action mailed Apr. 8, 2020", 3 pgs.
"U.S. Appl. No. 15/722,868, Examiner Interview Summary mailed Aug. 27, 2020", 3 pgs.
"U.S. Appl. No. 15/722,868, Final Office Action mailed Jan. 28, 2020", 23 pgs.
"U.S. Appl. No. 15/722,868, Non Final Office Action mailed May 18, 2020", 26 pgs.
"U.S. Appl. No. 15/722,868, Non Final Office Action mailed Oct. 4, 2019", 19 pgs.
"U.S. Appl. No. 15/722,868, Notice of Allowance mailed Sep. 3, 2020", 22 pgs.
"U.S. Appl. No. 15/722,868, Preliminary Amendment filed Jan. 19, 2018", 8 pgs.
"U.S. Appl. No. 15/722,868, Response filed Jan. 6, 2020 to Non Final Office Action mailed Oct. 4, 2019", 12 pgs.
"U.S. Appl. No. 15/722,868, Response filed Mar. 30, 2020 to Final Office Action mailed Jan. 28, 2020", 11 pgs.
"U.S. Appl. No. 15/722,868, Response filed Aug. 18, 2020 to Non Final Office Action mailed May 18, 2020", 12 pgs.
"U.S. Appl. No. 15/801,056, Corrected Notice of Allowability mailed Nov. 7, 2019", 2 pgs.
"U.S. Appl. No. 15/801,056, Corrected Notice of Allowability mailed Dec. 17, 2019", 2 pgs.
"U.S. Appl. No. 15/801,056, Notice of Allowance mailed Sep. 13, 2019", 11 pgs.
"U.S. Appl. No. 15/801,056, Response filed Jul. 25, 2019 to Final Office Action mailed Jan. 25, 2019", 10 pgs.
"U.S. Appl. No. 15/849,362, Final Office Action mailed May 2, 2019", 8 pgs.
"U.S. Appl. No. 15/849,362, Non Final Office Action mailed Oct. 5, 2018", 9 pgs.
"U.S. Appl. No. 15/849,362, Notice of Allowance mailed Jul. 18, 2019", 10 pgs.
"U.S. Appl. No. 15/849,362, Notice of Allowance mailed Nov. 20, 2019", 11 pgs.
"U.S. Appl. No. 15/849,362, Preliminary Amendment filed Feb. 22, 2018", 7 pgs.
"U.S. Appl. No. 15/849,362, Response filed Jan. 7, 2019 to Non Final Office Action mailed Oct. 5, 2018", 14 pgs.
"U.S. Appl. No. 15/849,362, Response filed Jul. 2, 2019 to Final Office Action mailed May 2, 2019", 10 pgs.
"U.S. Appl. No. 16/352,364, Non Final Office Action mailed Aug. 27, 2020", 10 pgs.
"U.S. Appl. No. 16/352,364, Preliminary Amendment filed Dec. 27, 2019", 8 pgs.
"U.S. Appl. No. 16/730,678, Corrected Notice of Allowability mailed Nov. 8, 2021", 2 pgs.
"U.S. Appl. No. 16/730,678, Non Final Office Action mailed May 7, 2021", 10 pgs.
"U.S. Appl. No. 16/730,678, Notice of Allowance mailed Oct. 29, 2021", 9 pgs.
"U.S. Appl. No. 16/730,678, Response filed Oct. 7, 2021 to Non Final Office Action mailed May 7, 2021", 8 pgs.
"U.S. Appl. No. 13/310,417, Response filed Dec. 8, 2014 to Non Final Office Action mailed Sep. 8, 2014", 11 pgs.
"U.S. Appl. No. 13/408,877, Reply Brief mailed Aug. 8, 2016", 5 pgs.
"Australian Application Serial No. 2006272510, Response filed Oct. 6, 2011 to Office Action mailed Oct. 22, 2011", 15 pgs.
"Australian Application Serial No. 2012200701, Office Action mailed Aug. 21, 2013", 2 pgs.
"Australian Application Serial No. 2012200701, Response filed Dec. 12, 2013 to Office Action mailed Aug. 21, 2013", 33 pgs.
"Australian Application Serial No. 2013270518, Response filed May 25, 2016 to Subsequent Examiners Report mailed Feb. 1, 2016", 13 pgs.
"Australian Application Serial No. 2013270518, Subsequent Examiners Report mailed Feb. 1, 2016", 2 pgs.
"Australian Application Serial No. 2013270518, Subsequent Examiners Report mailed Jun. 7, 2016", 2 pgs.
"ClaimMaster Software User Guide", ClaimMaster Software LLP, (2009), 36 pgs.
"Definition of Timeline", [Online] Retrieved from the Internet: <URL: https://www.yourdictionary.com/>, (Mar. 17, 2015), 1 pg.
"European Application Serial No. 06800464.7, Amendment filed Mar. 21, 2011", 7 pgs.
"European Application Serial No. 06800464.7, Examination Notification Art. 94(3) mailed May 2, 2014", 8 pgs.
"European Application Serial No. 06800464.7, Response filed Sep. 11, 2014 to Office Action mailed May 2, 2014", 16 pgs.
"European Application Serial No. 06800464.7, Summons to Attend Oral Proceedings mailed Oct. 10, 2017", 10 pgs.
"Google Definition: System", [Online] Retrieved from the Internet: <URL: http://www.google.com>, (Retrieved Aug. 13, 2012), 3 pgs.
"International Application Serial No. PCT/US2006/020950, International Preliminary Report on Patentability mailed Dec. 13, 2007", 6 pgs.
"International Application Serial No. PCT/US2006/020950, International Search Report mailed Feb. 5, 2007", 2 pgs.
"International Application Serial No. PCT/US2006/020950, Written Opinion mailed Feb. 5, 2007", 4 pgs.
"International Search Report and Written Opinion in PCT/US05/26768, mailed Mar. 7, 2007", 15 pgs.
"Module", Dictionary.com, [Online] Retrieved from Internet: <URL: http://dictionary.reference.com/browse/module>, (Retrieved Aug. 13, 2012), 5 pgs.
"Patent Rank: A Network-Dominant Logic for Innovation", Submitted to Marketing Science, manuscript MKSC-Oct 10-0356, (Oct. 2010), 36 pgs.
"PatentOptimizer", LexisNexis, (2009), 2 pgs.
Brinn, Michael W, et al., "Investigation of forward citation count as a patent analysis method", Proceedings of the 2003 Systems and Information Engineering Design Symposium, (2003), 6 pgs.
Fenton, Gillian M., et al., "Freedom to Operate: The Law Firms Approach and Role", In: Intellectual Property Management in Health and Agricultural Innovation: A Handbook of Best Practices, [online]. [retrieved on Mar. 17, 2015]. Retrieved from the Internet: <URL: www.iphandbook.org/handbook/ch14/p04/index_print.html>, (2007), 11 pgs.
Gipp, Bela, et al., "Comparative Evaluation of Text-and Citation based Plagiarism Detection Approaches using GuttenPlag", [Online] Retrieved from the Internet: <URL: http://gipp.com/wp-content/papercite-data/pdf/gipp11b.pdf>, (2011), 4 pgs.
Gruber, T R, et al., "A Translation Approach to Portable Ontology Specifications", KSL Report KSL-92-71, Knowledge Systems Laboratory, Stanford University, (1993), 24 pgs.
Indukuri, Kishore Varma, et al., "Similarity Analysis of Patent Claims Using Natural Language Processing Techniques", International Conference on Computational Intelligence and Multimedia Applications, (2007), 169-175.
Jagalla, Christopher, "Searching USPTO Assignments on the Web", (Nov. 20, 2010), 4 pgs.
Paul, Stockwell, et al., "Use of an automatic content analysis tool: Atechnique for seeing both local and global scope", Int. J. Human-Computer Studies 67, (2009), 424-436.
Quinn, B., "Internet Access to Patent Application Files Now Available", Press Release, [Online]. Retrieved from the Internet: <URL: http://web.archive.org/web/20040813210925/http://www.USPTO.gov/web/offices/com/speeches/04-13.htm>, (Aug. 2, 2004), 1 pg.
Sheremetyeva, Svetlana, "Natural Language Analysis of Patent Claims", Department of Computational Linguistics Copenhagen Business School, Bernhard Bangs Alle 17 B, DK-year 2000, Denmark, (2000), 66-73.
Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.
U.S. Appl. No. 17/589,635, filed Jan. 31, 2022, Patent Mapping.

(56) References Cited

OTHER PUBLICATIONS

U.S. Appl. No. 17/589,635, Non Final Office Action mailed Oct. 25, 2022, 11 pgs.
U.S. Appl. No. 17/589,635, Non Final Office Action mailed Aug. 23, 2023, 6 pgs.
U.S. Appl. No. 17/589,635, Notice of Allowance mailed May 2, 2023, 8 pgs.
U.S. Appl. No. 17/589,635, Response filed Feb. 27, 2023 to Non Final Office Action mailed Oct. 25, 2022, 11 pgs.
U.S. Appl. No. 17/589,635, Final Office Action mailed Feb. 23, 2024, 8 pgs.
U.S. Appl. No. 17/589,635, Response filed Dec. 22, 2023 to Non Final Office Action mailed Aug. 23, 2023, 11 pgs.
U.S. Appl. No. 17/589,635, Response filed Jun. 24, 2024 to Final Office Action mailed Feb. 23, 2024, 11 pgs.
U.S. Appl. No. 17/589,635, Notice of Allowance mailed Sep. 16, 2024, 8 pgs.

* cited by examiner

FIG. 9

| Matter | Portfolio | Product | Ontology | Report | Search | Contact | | Patent# | ∨ | | ∨ Go |

Portfolio : Omni Map

| Portfolio | Edit | List | Quick Rank | Panoramic Claim Map | | Status | Open |
|---|---|---|---|
| Title | Perpetual Motion | Created On | Aug 06, 2008 |
| Default Ontology | Perpetual Motion  [Intelli-Map Ontology(s)] | Last Modified | Aug 06, 2008 |

| Details | Matters | Rankings | Holding Area | Participants | Search | Omni Map |

Search Criteria ‹‹

| Search Claims | ⦿ Independent Claims  ○ Dependent Claims  ○ Both | | Search |
|---|---|---|---|
| Search Expression ○ | * | | Reset Filters |
| Highlight Keywords | ☑ Searched Keywords  ☐ Mapped Keywords | | |
| Tech Category(s) | Select Tech Category(s) | Tech Category(s) are - ○ And ⦿ Or | ☑ Show TC |
| Scope Concept(s) | Select Scope Concept(s) | Scope Concept(s) are - ⦿ And ○ Or | ☑ Show SC |

Map TC | Map SC
DM Directly Mapped, DNM Does Not Map, U Unresolved, NO No Operation

| | | Matter # | Claim # | Claim Text | TC | SC |
|---|---|---|---|---|---|---|
| ○ ○ ○ ⦿ <br> DM DNM U NO | | 6,960,975 | 1 | 1. A space vehicle propelled by the pressure of inflationary vacuum state is claimed comprising: a hollow superconductive shield, an inner shield, the inner shield disposed inside said hollow superconductive shield, said inner shield comprising an upper shell and a lower shell, a support structure, the support structure disposed between said hollow superconductive shield and said inner shield concentrically to said hollow superconductive shield, said support structure comprised of an upper roatating element and a lower rotating element, upper means for generating an electromagnetic field disposed between said hollow superconductive shield and said upper shell, affixed to said upper rotating element at an electromagnetic field-penetrable distance to said hollow superconductive shield, lower means for | 2,0,0 <br> Space Vehicle <br> Electrical Device or Method | 1,0,0 <br> flux modulation controller generating an electromagnetic field or a gravidomagnetic field |
| ○ ○ ○ ⦿ <br> DM DNM U NO | | | | | | |

Ontology Concept(s)

Search Criteria

| Where | Text | * | | ☐ | New Portfolio Ontology openty responses<br>Perpetual Motion | Back to Ontology Page<br>Clear Filters |
|---|---|---|---|---|---|---|

○ Technology Category   ○ Keyword   ⊙ Scope Concept   [Go]

Show [100] root concept per page.   Go to Page [  ] [Go]    Show inherited    [Go]    Search

[First] [Previous] Concept 1 to 2 of 2 [Next] [Last]    Bulk Add | Add new

ScopeConcept

| 🔍 Clipboard Concept | Claim(s) Count | Ontology | Concept | Claim(s) Count | Indirect Claims Count | Hier. Claim(s) Count | Ontology | Actions |
|---|---|---|---|---|---|---|---|---|
| | | | ☐ ○ fluid with randomly moving particles | 3 | 0 | 3 | Perpetual Motion | 📋 ✏️ 🗑️ |
| | | | ☐ ○ flux modulation controller generating an electromagnetic field of a gravidomagnetic field | 3 | 0 | 3 | Perpetual Motion | 📋 ✏️ 🗑️ |

*FIG. 11*

| Search Criteria | | |
|---|---|---|
| Search Claims | ⊙ Independent Claims ○ Dependent Claims ○ Both | |
| Search Expression |⊙| razor && handle |
| Highlight Keywords | ☑ Searched Keywords ☐ Mapped Keywords | |
| Tech Category(s) | Select Tech Category(s) Tech Category(s) are - ○ And ⊙ Or ☑ Show TC Clear Tech Category(s) | Search |
| | Technology Concept Name Filter | Reset Filters |
| | Liquid Dispensing Razors ⊙ Direct Mapped Claims<br>○ Direct Mapped or 'Does Not Map'<br>○ Direct Mapped or "Unresolved" | |
| Scope Concept(s) | Select Scope Concept(s) Scope Concept(s) are - ⊙ And ☑ Show SC | |

*FIG. 12*

| Scope Concept(s) | |
|---|---|
| Scope Concept Name | Filter |
| Multiple Blades | ○ Direct Mapped Claims<br>⦿ Do not include Direct Mapped and 'Does Not Map'<br>○ Direct Mapped or 'Does Not Map'<br>○ Direct Mapped or 'Unresolved' |

FIG. 13

*1406* — Add_New | Cancel | Return_to_Mapping    Help

*1402* — Search:

Where | Text [*]
Show Inherited ☐ Selected Ontology [Razors - Shaving]    [Search] [Clear]
☐ Intelli-Search

Search Results

Showing [100] Concepts per page. Go to Page [ ] [Go]

[First]  [Previous]    Concept 1 to 1 of 1    [Next]  [Last]

*1404* — [Map]

| | Category/Concept | Description | Ontology | Action |
|---|---|---|---|---|
| ☐ | multiple blades | Subject created by Claimbot | Razors - Shaving | Map \| Modify and Map |

*1410* points to header row; *1408* points to checkbox; *1412* points to Action cell.

FIG. 14

Create/Edit Concept

[Save] [Cancel]

| Concept Name | handle having a conduit for the passage of liquid |
|---|---|
| Description | Subject created by Claimbot |
| Concept Type | Scope Concept ▽ |
| Attach To Ontology | New Portfolio Ontology<br>Perpetual Motion<br>Perpetual Motion 2<br>Razors - Shaving<br>SLW IP |

FIG. 15

| Title | | Title #1 | | | | Title #2 |
|---|---|---|---|---|---|---|
| Patent# | | 6,697,xxx | | | | 7,272,xxx |
| Filing Date | | Oct 01, 1999 | | | | Jan 14, 20 |
| Total Claims | | 58 | | | | 28 |
| Claim# (Independent) | 1 | 11 | 30 | 44 | 52 | 1 | 14 | 22 |
| Owner | | Acme Co. | | | | Dynamite, |
| Scope Concept introduced first by: | Date SC first introduced | Total | | | | | | |
| Acme | 1999 | 5 | 10% | 1 | 1 | 1 | 1 | 1 | | | |
| Dynamite | 2004 | 4 | 8% | | | | | | 1 | 1 | 1 |
| Scope Concept (Frequency, Desc.) | | | | | | | | | | | |
| SC #1 | | | | 1 | 1 | 1 | 1 | 1 | | | |
| SC #2 | | | | | | | | | 1 | 1 | 1 |

FIG. 16

| Title | | Title 1 | | | | Title 2 | | | | Title 3 | | | |
|---|---|---|---|---|---|---|---|---|---|---|---|---|---|
| Patent# | | 6,697,xxx | | | | 7,272,xxx | | | | 7,327,xxx | | | |
| Filing Date | | Oct 01, 1999 | | | | Jan 14, 2004 | | | | Mar 02, 2004 | | | |
| Total Claims | | 58 | | | | 28 | | | | 24 | | | |
| Claim# (Independent) | | 1 | 11 | 30 | 44 | 52 | 1 | 14 | 22 | 27 | 1 | 11 | 18 | 24 |
| Claim Coverage | | 3 | 3 | 3 | 3 | 3 | 1 | 1 | 1 | 1 | 2 | 2 | 2 | 2 |
| Product Coverage | | Potentially Applies | | | | Doesn't Apply | | | | Not sure | | | |
| | | 2 | 2 | 2 | 2 | 2 | 2 | 2 | 2 | 2 | 1 | 1 | 1 | 1 |
| Scope Concept (Frequency, Desc.) | Has Feature? Rating (1-3) | Total | | | | | | | | | | | | |
| SC 1 | 3 | 20 | 38% | | | | | | | | | | | |
| SC 2 | 2 | 7 | 13% | | | | | | | | | | | |
| SC 3 | 3 | 7 | 13% | | | | | | | | | | | |
| SC 4 | 1 | 6 | 12% | | | | | | | | | | | |
| SC 5 | 3 | 5 | 10% | | | | | | | | | | | |
| SC 6 | 1 | 4 | 8% | | | | | | | | | | | |

*FIG. 17*

| Title | | | | Title 1 | | | | | Title 2 | | | | Title 3 | | | |
|---|---|---|---|---|---|---|---|---|---|---|---|---|---|---|---|---|
| Patent# | | | | 6,697,xxx | | | | | 7,272,xxx | | | | 7,327,xxx | | | |
| Filing Date | | | | Oct 01, 1999 | | | | | Jan 14, 2004 | | | | Mar 02, 2004 | | | |
| Total Claims | | | | 58 | | | | | 28 | | | | 24 | | | |
| Claim# (Independent) | | | | 1 | 11 | 30 | 44 | 52 | 1 | 14 | 22 | 27 | 1 | 11 | 18 | 24 |
| Claim Status | | | | Don't Need | | | | | Possibly Need | | | | Want | | | |
| Scope Concept (Frequency, Desc.) | Need Feature? Rating (1-3) | Total | % | | | | | | | | | | | | | |
| SC 1 | 3 | 20 | 38% | 2 | 2 | 2 | 2 | 2 | 2 | 2 | 2 | 2 | 1 | 1 | 1 | 1 |
| SC 2 | 2 | 7 | 13% | | | | | | | | | | | | | |
| SC 3 | 3 | 7 | 13% | | | | | | 3 | 3 | 3 | 3 | | | | |
| SC 4 | 1 | 6 | 12% | 2 | 2 | 2 | 2 | 2 | | | | | | | | |
| SC 5 | 1 | 5 | 10% | | | | | | | | | | 2 | 2 | 2 | 2 |
| SC 6 | 3 | 4 | 8% | | | | | | 2 | 2 | 2 | 3 | | | | |

FIG. 18

| Title | | | | Title 1 | | | | | Title 2 | | | | Title 3 | | | |
|---|---|---|---|---|---|---|---|---|---|---|---|---|---|---|---|---|
| Patent# | | | | 6,697,xxx | | | | | 7,272,xxx | | | | 7,327,xxx | | | |
| Filing Date | | | | Oct 01, 1999 | | | | | Jan 14, 2004 | | | | Mar 02, 2004 | | | |
| Total Claims | | | | 58 | | | | | 28 | | | | 24 | | | |
| Claim# (Independent) | | | | 1 | 11 | 30 | 44 | 52 | 1 | 14 | 22 | 27 | 1 | 11 | 18 | 24 |
| Claim Value | | | | 1 | 1 | 1 | 1 | 1 | 3 | 3 | 3 | 3 | 2 | 2 | 2 | 2 |
| Potential Patent Value | | | | Not Important | | | | | Essential | | | | Important | | | |
| Scope Concept (Frequency, Desc.) | Need Feature? | | | | | | | | | | | | | | | |
|  | Rating (1-3) | Total | % | | | | | | | | | | | | | |
| SC 1 | 3 | 20 | 38% | 2 | 2 | 2 | 2 | 2 | 2 | 2 | 2 | 2 | 1 | 1 | 1 | 1 |
| SC 2 | 2 | 7 | 13% | | | | | | | | | | | | | |
| SC 3 | 3 | 7 | 13% | | | | | | 2 | 2 | 2 | 2 | | | | |
| SC 4 | 1 | 6 | 12% | | | | | | | | | | | | | |
| SC 5 | 1 | 5 | 10% | 2 | 2 | 2 | 2 | 2 | | | | | | | | |
| SC 6 | 3 | 4 | 8% | | | | | | 2 | 2 | 2 | 2 | | | | |

FIG. 19

| Title | | | Scope Concept (Frequency, Desc.) | | | Title 1 | | | Title 2 | | | Title 3 | | |
|---|---|---|---|---|---|---|---|---|---|---|---|---|---|---|
| Patent# | | | | | | 6,697,xxx | | | 7,272,xxx | | | 7,327,xxx | | |
| Filing Date | | | | | | Oct 01, 1999 | | | Jan 14, 2004 | | | Mar 02, 2004 | | |
| Total Claims | | | | | | 58 | | | 28 | | | 24 | | |
| Claim# (Independent) | | | | | | 1 | 11 | 30 | 44 | 52 | 1 | 14 | 22 | 27 | 1 | 11 | 18 | 24 |
| Claim Status | | | | | | 2 | 2 | 2 | 2 | 3 | 3 | 3 | 3 | 1 | 1 | 1 | 1 |
| Feature rating | | | Feature Shown? | | | Some Overlap | | | Complete Overlap | | | No Overlap | | |
| Scope Concept (Frequency, Desc.) | Rating (1-3) | Total | | | | | | | | | | | | |
| SC 1 | 3 | 20 | 38% | | | 2 | 2 | 2 | 2 | 2 | 2 | 2 | 2 | 1 | 1 | 1 | 1 |
| SC 2 | 1 | 7 | 13% | | | | | | | | | | | | | | |
| SC 3 | 3 | 7 | 13% | | | | | | | | | | | | | | |
| SC 4 | 1 | 6 | 12% | | | | | | | | | | | | | | |
| SC 5 | 1 | 5 | 10% | | | | | | | | | | | | | | |
| SC 6 | 3 | 4 | 8% | | | | | | | | | | | | | | |

FIG. 20

| Claim Concept White Space Analysis | | |
|---|---|---|
| Used Scope Concepts in Red | | |
| Unused/Unclaimed Scope Concepts in Blue | | |
| Scope Concept (Frequency, Desc.) | Number of Uses | Percent |
| SC 1 | 20 | 38% |
| SC 2 | 7 | 13% |
| SC 3 | 7 | 13% |
| SC 4 | 6 | 12% |
| SC 5 | 5 | 10% |
| SC 6 | not found | 0% |
| SC 7 | not found | 0% |

| Matter | Portfolio | Reference | Contact | | |
|---|---|---|---|---|---|
| Portfolio | | | | | Patent # ▽ |
| Title: | | Save Cancel | | | |
| Description: | | | | | |
| Review Recording | ● On ○ Off | (Patent mapping confidence will be displayed along with mapping status) | | | |
| Mapping Status Indicator | ● On ○ Off | (If enabled, application will automatically set mapping status incomplete/ | | | |
| Type | Analysis Portfolio ▽ ← 242 | | | | |
| | Analysis Portfolio | | | | |
| | Prior Art Portfolio | | | | |
| ☐ ⊚ (PA) test ← 240 | | 2 | June 05, 2011 | test | Create/Assign |
| ☐ ⊚ (PA) test | | 1 | June 05, 2011 | | Create/Assign |
| ☐ ⊚ (PA) test | | 2 | June 05, 2011 | | Create/Assign |

*FIG. 24*

| List View | | Chart View | | | | | |
|---|---|---|---|---|---|---|---|
| Remove | Bulk Update Status | | | Show Dismissed ☐ | Add New | Patent Reference ▽ | Go |

US Patents

| ☐ | Patent/Pub# | Grant/Pub Date | Inventor | Flow level | Source Date | Status | Actions |
|---|---|---|---|---|---|---|---|
| ☐ | 100001 | Apr 01, 2011 | Last1up, First2 M | 0 | Jun 02, 2011 | Unmarked | View | Edit | 🗋 |

Foreign Patents

| ☐ | Patent/Pub# | Country | Inventor | Flow level | Source Date | Status | Actions |
|---|---|---|---|---|---|---|---|
| ☐ | 67892462 | Thailand | Test1 | | Jun 13, 2011 | Received from PTO | View | Edit |

Non Patent Reference

| ☐ | Author | Grant/Pub Date | Inventor | Flow level | Source Date | Status | Actions |
|---|---|---|---|---|---|---|---|
| ☐ | sss | Jun 30, 2011 | ss | 0 | Jun 02, 2011 | Unmarked | View | Edit |

| List View | Chart View | | | | |
|---|---|---|---|---|---|
| Remove | Bulk Update Status ▼ —272 | | 270→ Show Dismissed ☐ Add New | Patent Reference ▼ | Go |

US Patents

| | Patent/Pub# | Grant/Pub Date | Inventor | Flow level | Source Date | Status | Actions |
|---|---|---|---|---|---|---|---|
| ☐ | | | | | | | |
| ☐ | 100001 | Apr 01, 2011 | Last1up, First2 M | 0 | Jun 02, 2011 | Unmarked | View \| Edit \| |

Foreign Patents

| | Patent/Pub# | Country | Inventor | Flow level | Source Date | Status | Actions |
|---|---|---|---|---|---|---|---|
| ☐ | | | | | | | |
| ☐ | 67892462 | Thailand | Test1 | | Jun 13, 2011 | Received from PTO | View \| Edit \| |

*FIG. 27*

| List View | Chart View | | | | | |
|---|---|---|---|---|---|---|
| Remove | Bulk Update Status | | | Show Dismissed ☐ | Add New | Patent Reference ▽ Go |

US Patents

| ☐ | Patent/Pub# | Grant/Pub Date | Inventor | Flow level | Source Date | Status | Actions |
|---|---|---|---|---|---|---|---|
| ☐ | 100001 | Apr 01, 2011 | Last1up, First2 M | 0 | Jun 02, 2011 | Unmarked | View | Edit |

Foreign Patents

| ☐ | Patent/Pub# | Country | Inventor | Flow level | Source Date | Status | Actions |
|---|---|---|---|---|---|---|---|
| ☐ | 67892462 | Thailand | Test1 | | Jun 13, 2011 | Received from PTO | View | Edit |

Non Patent Reference

| ☐ | Author | Grant/Pub Date | Inventor | Flow level | Source Date | Status | Actions |
|---|---|---|---|---|---|---|---|
| ☐ | sss | Jun 30, 2011 | ss | 0 | Jun 02, 2011 | Unmarked | View | Edit |

LUCID PATENT

Matter | Portfolio | Reference | Claim Mapping | Claim Tracking    Logout | Setup

Portfolio: Reference(s)

| Portfolio | | Panoramic Claim Map | Matter Count | 2 |
|---|---|---|---|---|
| Title | | (O) (PA) test | Created On | June 02, 2011 |
| Default Ontology | | test | Last Modified | Jun 13, 2011 |

Details | Participants | Matters | References ← 290
All References | Patent References | Non-Patent References | Bulk Add | Job Status | Holding List ▽ Search Criteria

| | | | Add Patent Reference | | Add Non Patent Reference | |
|---|---|---|---|---|---|---|
| Delete | Official Number | Unofficial Number | Title | Inventor/Author Name | Issue/Publication Date | Effective Date | Type | Attachment |
| ☐ | | | | | | | | |
| ☐ | 67,892,462 | MAN-669650 | | Test1 ; | | | Patent Reference | |

*FIG. 29*

PATENT MAPPING

RELATED APPLICATIONS

This application is a continuation of and claims the benefit of priority under 35 U.S.C. § 120 to U.S. patent application Ser. No. 13/253,936, filed on Oct. 5, 2011, which claims the benefit under 35 U.S.C. § 119(e) of U.S. Provisional Patent Application Ser. No. 61/542,515 filed Oct. 3, 2011, each of which is incorporated herein by reference in its entirety and made a part hereof.

This application is related to U.S. patent application Ser. No. 12/605,030, entitled "Patent Mapping" by Steve W. Lundberg and Thomas G. Marlow filed Oct. 23, 2009, which is incorporated herein by reference in its entirety and made a part hereof. U.S. patent application Ser. No. 12/605,030 claims the benefit under 35 U.S.C. 119 (e) of U.S. Provisional Patent Application Ser. No. 61/107,930 filed Oct. 23, 2008, which is also incorporated herein by reference in its entirety and made a part hereof.

This application is further related to U.S. patent application Ser. No. 11/494,278, entitled "Patent Mapping," by Steven W. Lundberg, Janal M. Kalis, and Pradeep Sinha, filed Jul. 27, 2006, which is incorporated herein by reference; and is further related to U.S. patent application Ser. No. 11/888,632, entitled "Patent Tracking," by Steven W. Lundberg and Janal M. Kalis, filed Aug. 1, 2007 which is incorporated herein by reference; and is further related to U.S. patent application Ser. No. 10/710,656, entitled "Patent Mapping," by Steven W. Lundberg, Janal M. Kalis, and Pradeep Sinha, filed Jul. 27, 2004 which is incorporated herein by reference and corresponding PCT application PCT/US2005/026768 filed Jul. 27, 2005.

BACKGROUND

Tools for identifying patents for a particular purpose such as a prior art search, validity analysis, or a freedom to operate investigation, operate by performing Boolean queries using various search operators. These operators allow for searching by date, terms, document number, and patent classification, among others. These tools further allow for searching individual document portions such as a document title, abstract, or claim set.

Other searching tools accept freeform text. Such tools accept a freeform text block and extract information from the text block deemed most likely to return acceptable results. However, such tools are still limited to only performing Boolean queries and displaying a list of results.

These search tools often provide large numbers of results, most of which are irrelevant. These tools fail to present results in a manner allowing for quick relevancy determinations. The presentation also fails to provide enough detail suggesting how to adjust a search for obtaining only relevant results. Further, the search tools provide the documents of the result set in a manner very similar to the traditional paper format of the documents. Quick relevancy determination is important in managing the assessment of large volumes of prior art for potential citation to government patent agencies.

BRIEF DESCRIPTION OF THE DRAWINGS

Some example embodiments are illustrated by way of example and not limitation in the figures of the accompanying drawings in which:

FIGS. 9-15 are user interfaces, according to example embodiments.

FIGS. 16-22 are example generated charts, according to example embodiments.

FIGS. 24-30 are further user interfaces, according to example embodiments.

DETAILED DESCRIPTION

Figure 1:
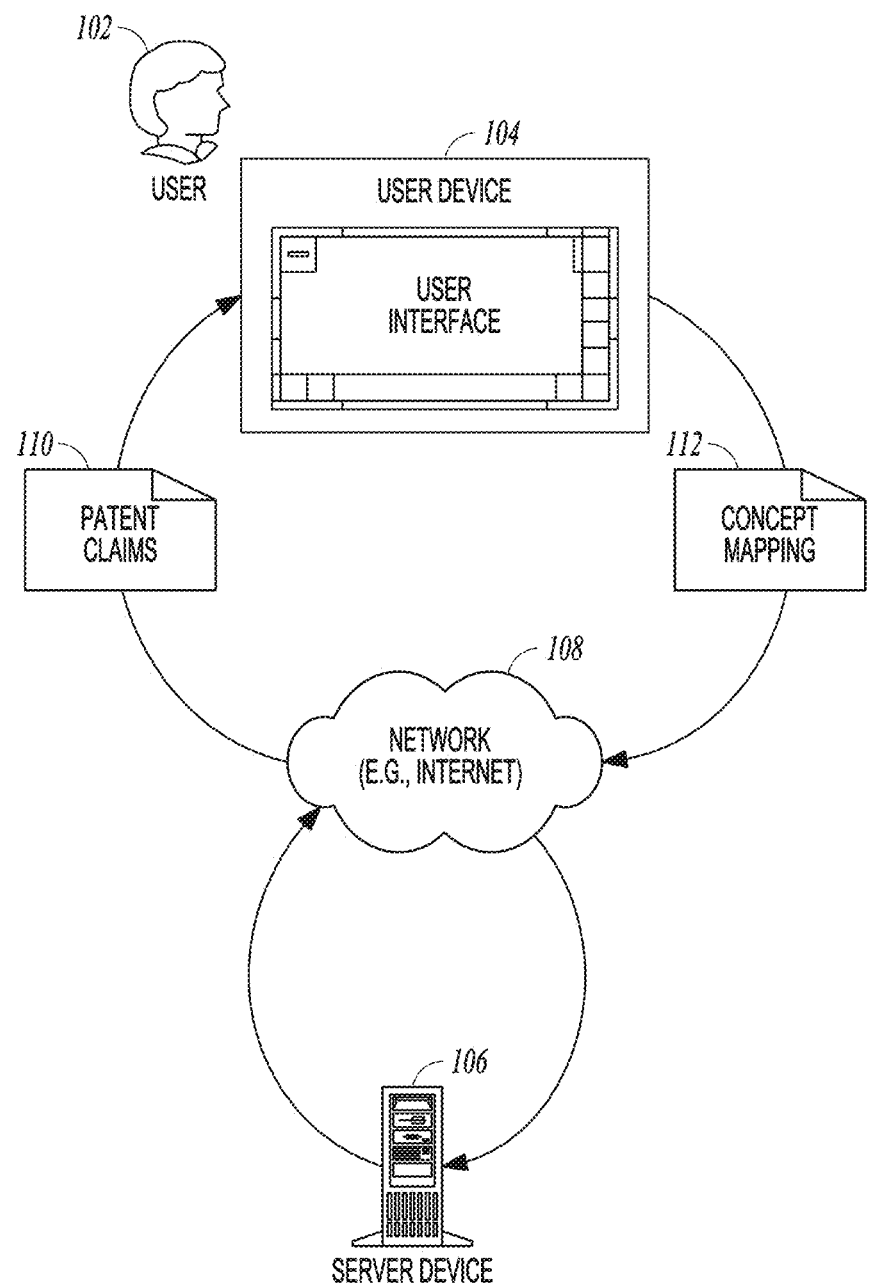
FIG. 1 is a diagram of a system, according to an example embodiment.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The subject matter herein provides systems, software, methods, and data structures for patent mapping, ranking and rating of patents, searching, and generating visual representations of the patents and patent portfolios to quickly analyze the patents for many reasons including, but not limited to, claim coverage and value. In an example embodiment, a patent portfolio may comprise one or more patents that may or may not be commonly owned or related. The collection of patent portfolios and patents may be stored in one or more databases. A patent may belong to more than one portfolio at the same time. In an example embodiment, the underlying patents and patent claims included in each patent portfolio may be categorized by patent concepts (sometimes referred herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is contrast to technology categories, where the claim may be mapped to a TC but it not necessarily limited to it. A scope concept may defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical categories in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc, may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful is disqualify claims that are not of interest to a particular target (e.g., if an analysis is being done to find a claim that covers an alleged infringer). In some example embodiments, specific scope concepts are mapped patent by patent or by patent family. These may enable a person to create one or two scope concepts that can be mapped across all claims in given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family.

FIG. 1 illustrates an example system to implement the methods described herein. Shown is a user 102 and a user device 104. The user device 104 may be, for example, a personal computer, mobile phone, or personal digital assistant. The user device 104 may be a computer system as described in FIG. 17. Users of the system may include specialized personnel trained to map patent claims as well as personnel trained to analyze the resulting claim map. The user device 102 may communicate with a server device 106 over a network 108 (e.g., the Internet) using a variety of communication means including, but not limited to, wired and wireless communication. The server device 106 may be a computer system as described in FIG. 17. In an example embodiment, the user 102 requests patent claims 110 from the server device 106 and transmits concept mappings 112 back to the server device 106 through the user device 104 via the network 108. In various embodiments, one or more software applications are executed on the user device which facilitate the interactions and data transmissions between user 102, user device 104, and server device 106. Other information needed to complete the methods described herein may be transmitted between the user device 102 and server device 106 according to example embodiments.

Figure 2:
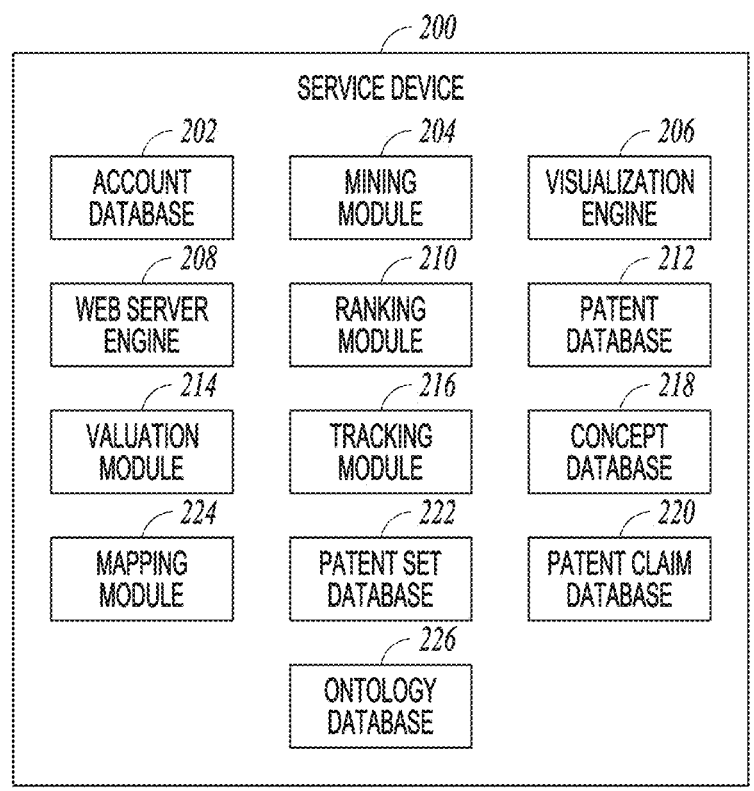
FIG. 2 is a block diagram of a server device, according to an example embodiment.

FIG. 2 illustrates an example server device 200. In an example embodiment, the server device includes one or more modules, databases, and engines. The various modules, databases, and engines may interact with each other and may take on the functionality of other modules, databases, and engines. Databases, according to an example embodiment, generally refer to sets of data stored in tables and may be implemented using a variety of database solutions including Oracle and MySQL. Engines, according to an example embodiment, generally refer to the generation of a product/image that is presented to a user (e.g., a webpage). Modules, according to an example embodiment, generally refer to functionality or features of the system that a user may invoke. For example, the mapping module may provide the necessary logic to create a mapping between a concept and a patent claim. According to an example embodiment, server device 200 includes an account database 202, a mining module 204, visualization engine 206, a web server engine 208, a ranking module 210, a patent database 212, a valuation module 214, a tracking module 216, a concept database 218, a patent claim database 220, a patent set database 222, a mapping module 224, and an ontology database 226.

In various embodiments, the modules, engines, and databases are implemented in a combination of software and hardware. For example, a mapping module can be stored as set of instructions stored on a machine-readable medium. The instructions can be executed on a processor and cause a machine to perform operations related to mapping. Additionally, the visual presentation of data in not limited to engines and may be done by modules as well. Similarly, engines may contain underlying logic dictating on how each engine functions and interacts with the user, software, and hardware of the system. In various embodiments, the modules, engines, and databases are combined.

In an example embodiment, the account database 202 includes data pertaining to the different users of the system. In some embodiments, different levels of user are defined. For example, an administrator level allows the creation of an ontology (e.g., a collection of patent concepts and keywords) and mapping of patent claims while an analysis level user may only mine the map for patent claims. The web server engine 208 may present webpages to the user via the user device. The webpages may include forms and user interfaces for the user to interact with such that the user may manipulate the underlying data stored on the server device on one or more databases.

In an example embodiment, databases 212, 218, 220, 222, and 226 store the underlying data that the server device interacts with and modifies according to user input. The patent database 212 may include information related to all the patents, patent applications and patent portfolios stored in the system such as title, filing data, assignee, etc. As used in this specification, the term "patent matter" is intended to include within its scope and meaning any matter patent-related matter or case, for example a granted patent, a pending patent application, or an invention disclosure statement. The patent database 212 may include information related to prior art reference citations, or "references". The prior art references may be associated with one or more of patents and/or patent applications stored in the patent database 212. The references may have been cited against or be otherwise potentially relevant to one or more of the patents or applications stored in the patent database 212. In an example embodiment and method, the prior art references may require relevancy assessment prior to submission and/ or citation to the USPTO or other international government patent agency imposing disclosure requirements on applicants. The prior art references may be collected, reviewed and cited accordingly in example embodiments and methods described in more detail further below. In this specification, references to mapping include references to prior art mapping. In example embodiments, two types of portfolio may be created and stored in the patent database 212, an "Analysis" portfolio and a "Prior Art" portfolio.

The concept database 218 may store all the concepts that have been defined either by the user or automatically by the system. The patent claim database 220 may include information related to patent claims including which patent they belong to as well as concepts that have been mapped to the patent claims. The patent set database 222 may store information on sets of patents that have been defined by the user. In an example embodiment, a patent set may be defined by exclusion mining (e.g., the set of patents that have NOT been mapped to a certain concept). The ontology database 226 may store information on a user defined set of concepts.

The mapping module 224, in an example embodiment, enables a user to map a concept to a patent claim. For example, the user may create and define a patent concept which is then stored in the concept database. The user may then send an indication, through the user device, that a patent claim in the patent claim database 220 should be mapped to the new concept. The indication may take the form of a type of user input such as clicking on an interface using an input device. The server device may then store this mapping in the patent claim database. For example, a relationship between the patent claim and concept may be stored in one or more of the databases. The mining module 204, in an example embodiment, allows a user to search through the data stored in the databases to find patent claims of interest. For example, a user may wish to find all the patent claims related to a gear used in a bicycle. Rather than having the user define what the gear is, the user may indicate to the mining module what the gear is not, by indicating what concepts do not apply (exclusion mining). The mining module may search the entire universe of claims in the patent claim database, or a portion of the patent claim database, and retrieve the remaining patent claims (those claims that not have the concept) and present them to the user.

The visualization engine, in an example embodiment, generates reports and visual depictions of the data contained in a set of claims. For example, the visualization engine may generate a spreadsheet with the concepts in the concept database as rows and the patent claims as the columns. Color coding may be used to signify where a patent claim has been mapped to a concept. In some example embodiments, a user of the system may add additional data that influences the spreadsheet created. Some example embodiments include the generation of competitor landscape, freedom to operate, product coverage, validity, valuation, white space analysis, and white space claim generation spreadsheets. In various embodiments, other forms of coding are used such as shading and patterning.

The tracking module 216, according to an example embodiment, maintains information related to a specific patent, group of patents, or concept. For example, the tracking module may store information related to a patent's prosecution and litigation history such as office actions or claim amendments. Alerts (e.g., electronic mail) may be sent to a user indicating a change in a patent or patent application.

The ranking module 210 and valuation module 214, according to example embodiments, enable the user to provide additional information related to patents, patent claims, and concepts that may be used to determine a course of action such as abandoning a patent or pursing research in a specific field. For example, a user may indicate a specific concept as being key to her business. Further, a lawyer or other trained patent professional may provide a ranking for each patent included in her portfolio related to scope, design around protection, and detectability effort. The system may take this knowledge and through the visualization engine generate a chart that shows the highest ranked patents that also include her important concept.

Data Models

In an example embodiment, data models are defined to store the information related to the patents being analyzed. FIGS. 3-8 illustrate example data models that may be utilized. These may be defined in any suitable programming language such as C, C++, Java, Ruby, etc, that allows the manipulation of data models. In some embodiments, data models are referred to as classes and both terms will be used in the following descriptions. Further, an object may refer to a specific instance of a class or data model. As one skilled in the art will recognize, there may be more than one way to define the models and the relationships between the models. The illustrated models are to be taken only as one way of implementing the systems and methods described in this application. FIGS. 3-8, in some example embodiments, provide the lower level details of the information stored in databases 212, 218, 220, 222 and 226.

Figure 3:
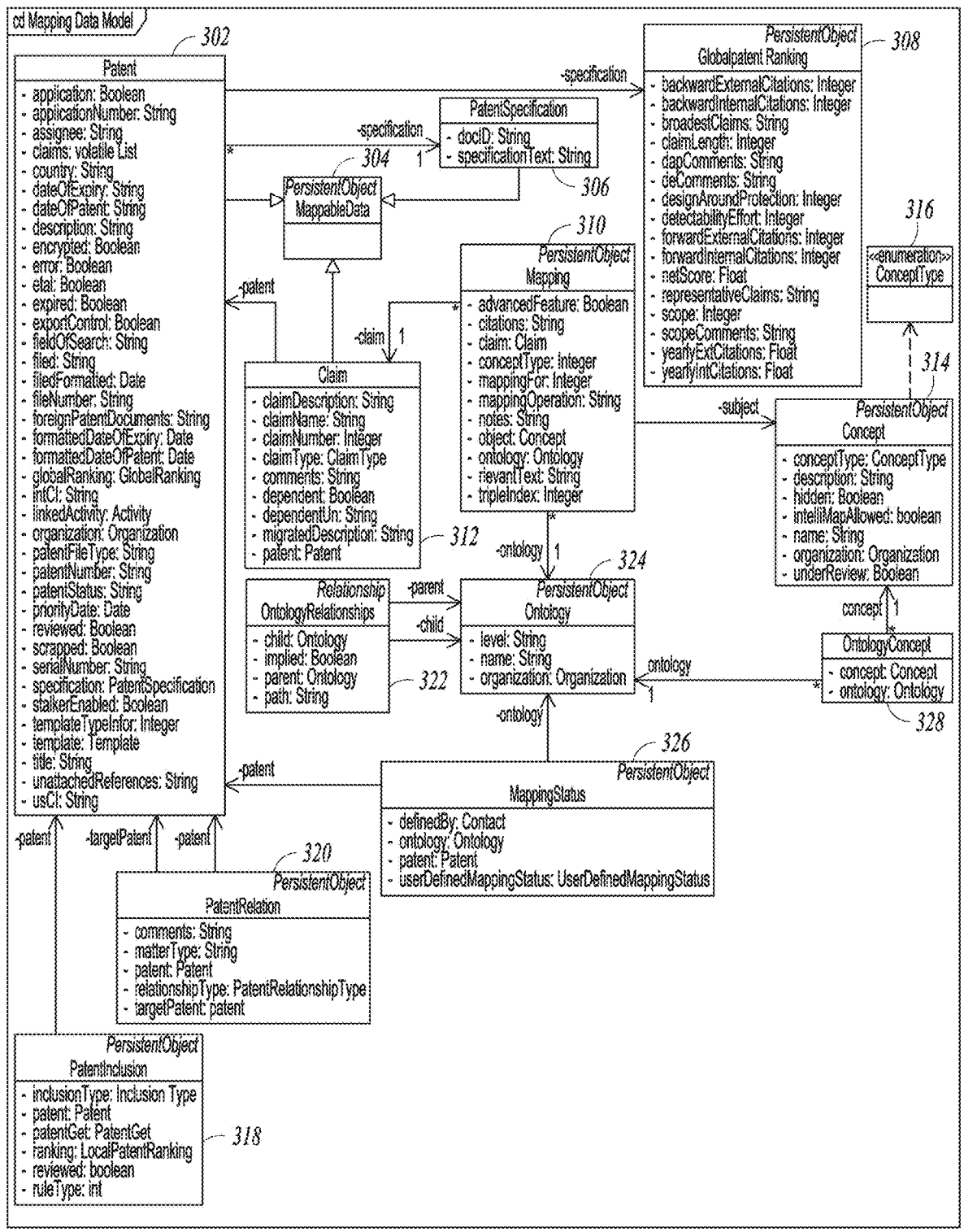
FIGS. 3-8 are data model diagrams, according to example embodiments.

FIG. 3, according to an example embodiment, illustrates data models related generally to mappable data. Shown are models and relationships for a Patent 302, Mappable Data 304, Patent Specification 306, Global Patent Ranking 308, Mapping 310, Claim 312, Concept 314, Concept Type 316, Patent Inclusion 318, Patent Relation 320, Ontology Relationships 322, Ontology 324, Mapping Status 326, and Ontology Concept 328. Each model may contain one or more elements that are defined either by the system or a user. Further, as illustrated, some models are related to each in other in a one to many relationship. For example, an Ontology object 324 may be related to many Ontology Concept objects 328.

In an example embodiment, Patent model 302 includes types of information related to a patent including, but not limited to, whether or not it is an application, the number of claims, when it was filed, what organization it may belong to, the serial number, and its status. As can be seen, each piece of information may have an associated class such as a Boolean or string. In some cases, the type is actually another class (e.g, global ranking has a class of Global Ranking). Further shown are the elements of a data model that relate to another data model. For example, example Mapping Status 326, Patent Relation 320, Patent Inclusion 318, and Claim 312 models all include an element of patent with a class of Patent. This relationship allows the system to examine a Claim class and determine the Patent in which the Claim is included.

In some embodiments, the Mapping 310 data model defines persistent objects that define the relationships between the a concept (e.g., technology categories and scope concept), a claim, and an ontology. As shown, there are many elements that a Mapping 320 class may include, such as, but not limited to, citations, notes, ontology, concept type and claim. Further, in an example embodiment, many Mapping objects may be related to one Ontology object and one Claim object. Thus, if one were to examine a Mapping object, there would be a relationship defining the ontology to which the object belongs to as well as the claim to which it has been assigned. In addition, there may be an integer signifying the type of concept to which the Mapping object belongs. As data model Concept Type 316 suggests each type of concept may be enumerated as well as be defined by an integer value. For example, the concept of scope concept may be given the value of '1.' Also, the "object" element illustrated has an associated class of Concept 314. Accordingly, the Mapping object may be linked to an example concept that has been defined as "two wheeled transportation." The mapping operation element may define the relationship between the cited claim and the concept. For example, a concept may be directly mapped to a claim.

Figure 10:
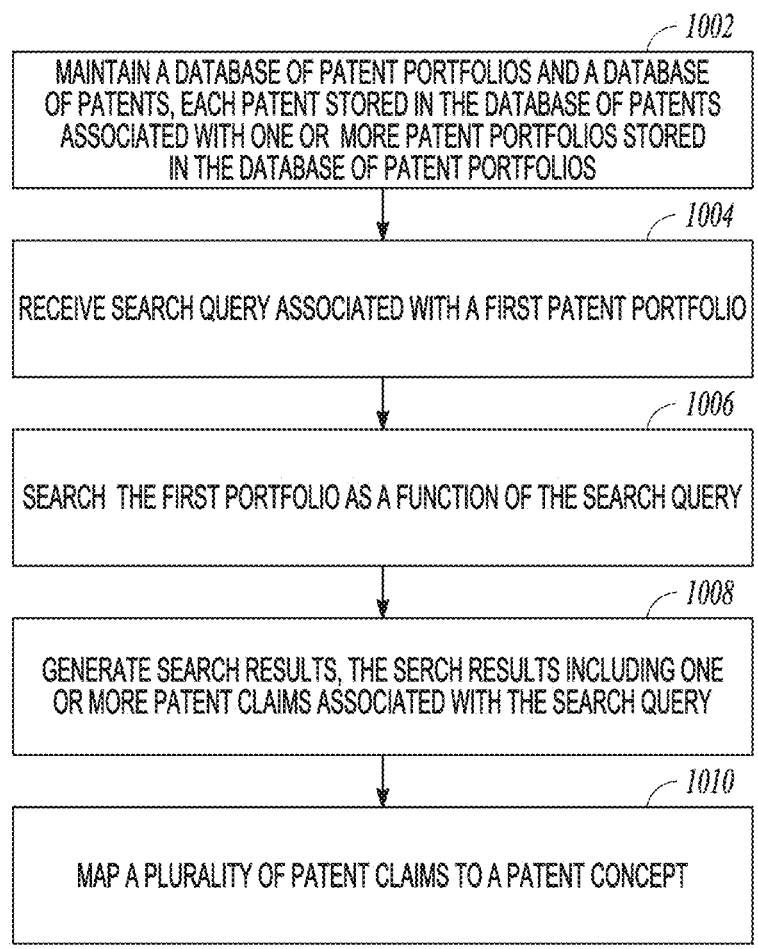

Other possibilities are discussed further with reference to FIG. 10. Accordingly, a Mapping object may contain the following information with regards to some of the displayed elements.

claim: Claim A
    conceptType: 1
    object: Two wheeled transportation
    ontology: Bikes
    mapping operation: Directly Mapped In an example embodiment, a Mapping object is created each time the system receives an indication a concept is to be mapped to a claim. In an embodiment, an indication may be stored that a concept is not mapped to a claim.

In an example embodiment, a Concept 314 object is created for every user defined concept as well as any concept the system may define automatically. Each Concept 314 may contain, but is not limited to elements of, conceptType, description, hidden, intelliMapAllowed, keywordLabel, name, organization, and underReview. As discussed above, a Concept 314 object may contain an enumeration of the ConceptType 316 object. For example, the conceptType element may have an example value of "scope concept." The description element may describe when a concept should be applied to a claim or other helpful information relating to the concept. The intelliMapAllowed Boolean may indicate whether the system may automatically apply the concept to other claims included in the system. For example, a concept type might be "keyword." These keywords may be verbatim phrases or individual words in the claim. Thus, a user may be able to safely have the system search other claims and find the same keyword and automatically create Mapping 310 objects for the keyword and found claims. The intelliMapAllowed may indicate whether the system should search automatically for these keywords.

In an example embodiment, the OntologyConcept 328 class only contains two elements, ontology and concept. An Ontology Concept 328 may be created to signify the relationship between a Concept 314 object and an Ontology 324 object. As shown, an Ontology 324 object may include many OntologyConcept objects. Also, as shown, a Concept 314 object may belong to many OntologyConcept 328 objects.

Also shown in FIG. 3, is the PatentInclusion 318 object. A PatentInclusion Object may include elements of inclusionType, patent, patentSet, ranking, reviewed, and ruleType. A PatentInclusion 318 object may be used to signify the relationship between a patent and a patentSet. This relationship is more fully explained with reference to FIG. 4.

Figure 4:
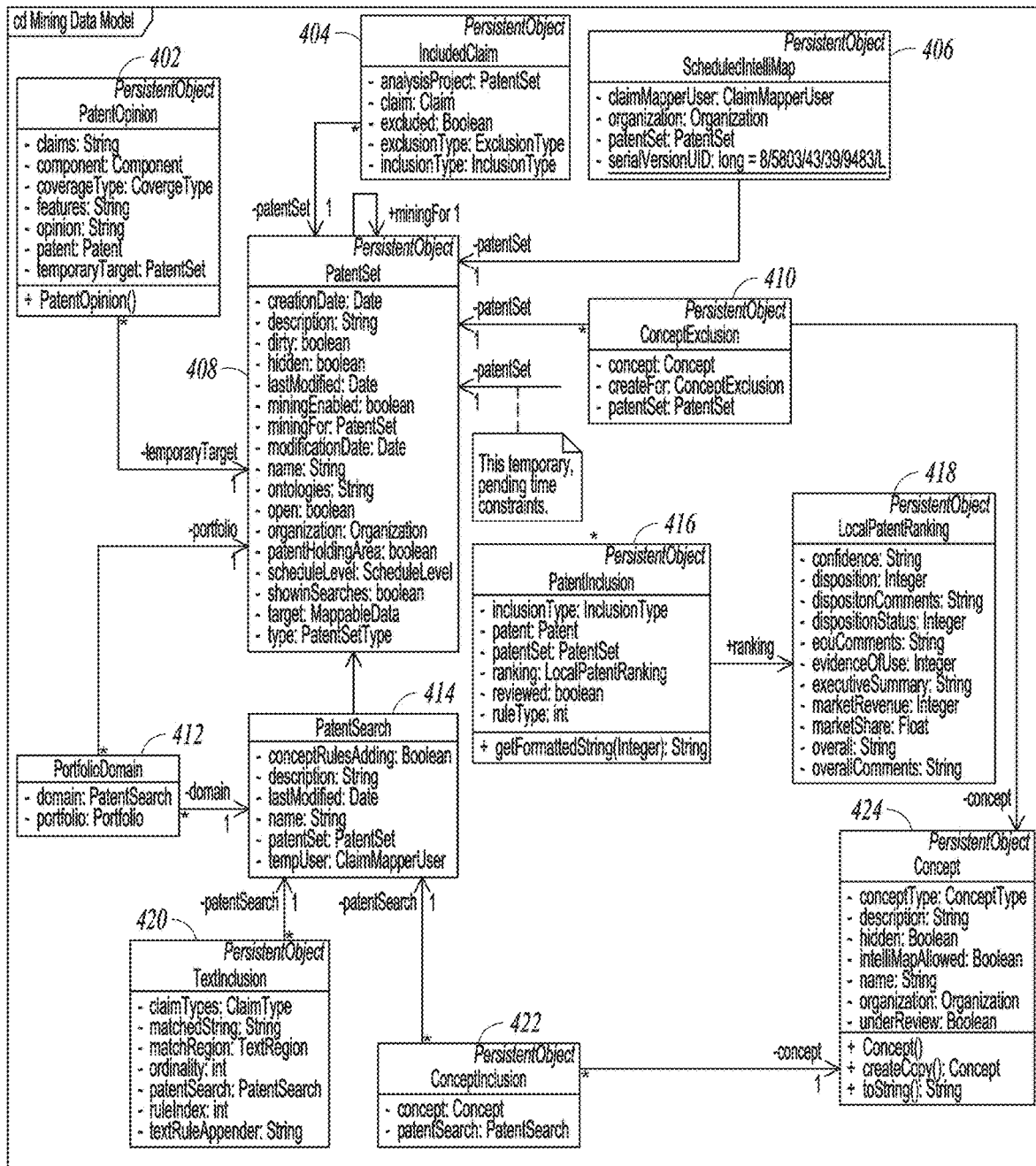

FIG. 4, according to an example embodiment, illustrates data models related, generally, to mining mapped data. Shown are models and relationships for PatentOpinion 402, IncludedClaim 404, SchedulediniteliMap 406, PatentSet 408, ConceptExclusion 410, PortfolioDomain 412, PatentSearch 414, PatentInclusion 416, LocalPatentRanking 418, TextInclusion 420, ConceptInclusion 422, and Concept 424 classes. In some embodiments, classes with the same name as in FIG. 3 are defined similarly. For example, Concept class 424 may contain the same elements as Concept class 314. However, as illustrated, additional functions are included that may operate on the class. For example, function "createCopy( )" is illustrated in Concept class 424.

In an example embodiment, the PatentSet 408 class operates as the central class for mining. As illustrated, many of the other classes shown relate to the PatentSet 408 class. A PatentSet object may have many PatentInclusion 416, ConceptExclusion 410, and IncludedClaim 404 objects. Also, in an example embodiment, a PatentSet object may have many ConceptInclusion 422 objects related to it by virtue of the PatentSearch 414 class. Through user interfaces presented to a user and user input, a patent Set may be defined. This may be done by a user adding claims manually or by a more sophisticated method involving a user defining which concepts to exclude or include. The various data models support an almost endless amount of customization for users of the system in the creation of patent sets.

In an example embodiment, the created patent sets may be saved for future use, as well as themselves becoming the basis for creating a new patent set. This may enable a user to efficiently search through any number of patents. The system may operate in such a manner that when a request is made to retrieve patents included in a patent set, the system responds by applying the relationships defined by the objects for that patent set. For example, the ConceptExclusion objects. This execution method may allow newly mapped patents to be included or excluded from the patent set with no additional input from a user. Thus, if a user wishes to find the intersection between a patent set related to vehicles and a patent set related to audio, the most current mapped patents available will be presented. As will be discussed in greater detail with respect to portfolio mapping, the ability to create patent sets and combine them may greatly speed up the process of finding common concepts across patents.

Figure 5:
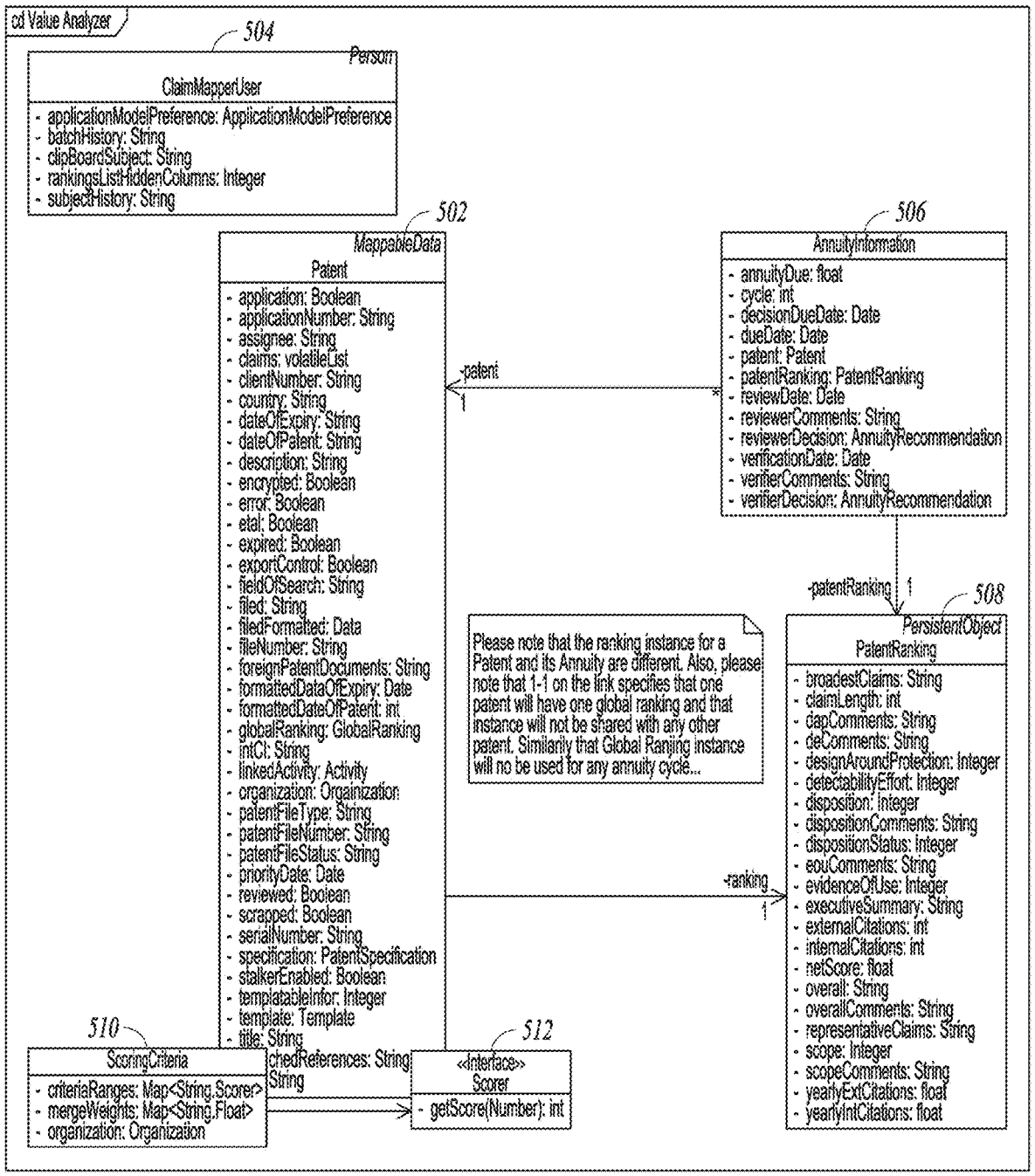

FIG. 5, according to an example embodiment, illustrates data models related, generally, to annuity data. Shown are models and relationships for Patent 502, ClaimMappedUser 504, AnnuityInformation 506, PatentRanking 508, ScoringCriteria 510, and Scorer objects 512. In an example embodiment to further enable a person to quickly analyze a large group of patent claims, patents may be given a rating. In an example embodiment, only the broadest independent claim in each patent is given a ranking, as the broadest claim will often have the most value. The patent claims may be ranked according to multiple criteria, including, but not limited to scope, detectability, and the ability to design around the patent. In an example embodiment, the ranking information may be stored in a PatentRanking object and retrieved through the Scorer interface. Each criteria may be given a weighting depending on the client's needs. For example, a client may decide that scope is twice as important as the other two criteria. Therefore, the formula to rank the patents may be:

$$0.5(\text{scope}) + 0.25(\text{detectability}) + 0.25(\text{design around}) = \text{rating}.$$

Once all of the patents have been ranked, the results may be presented to the user in a web browser, in the form of a chart, or using any other suitable display mechanism.

An AnnuityInformation object may include information related to annuities for an issued patent. Depending on the rating and annuity information of a patent, a user may automatically let patents go abandoned, a user may be alerted, or an annuity may automatically be paid. Other example embodiments will be obvious to one skilled in the art.

Figure 6:
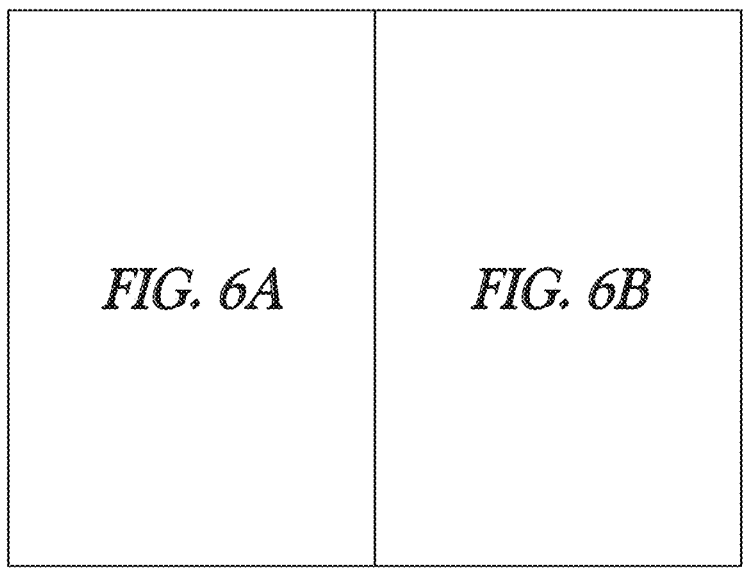
Figure 6A:
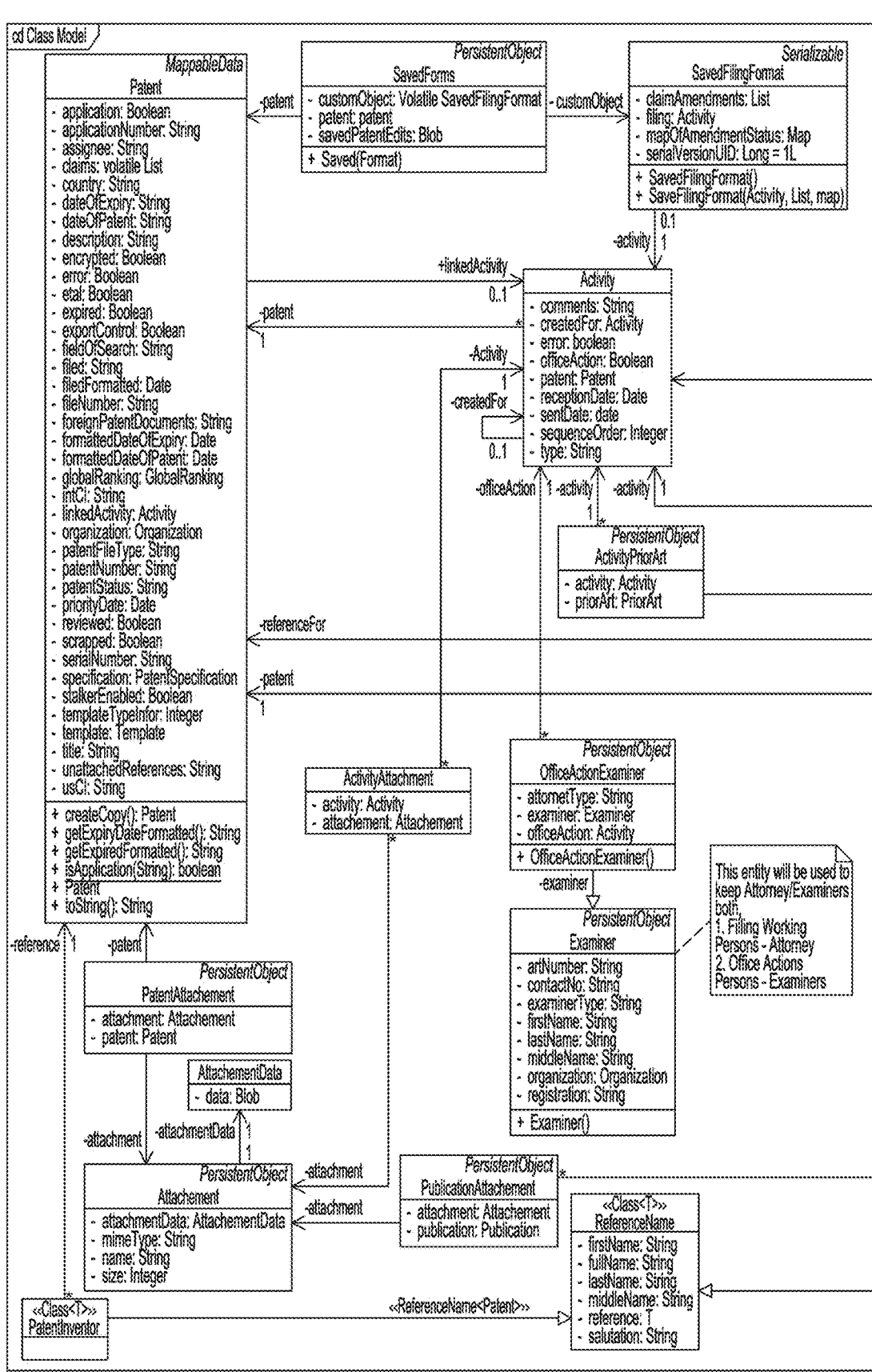
Figure 6B:
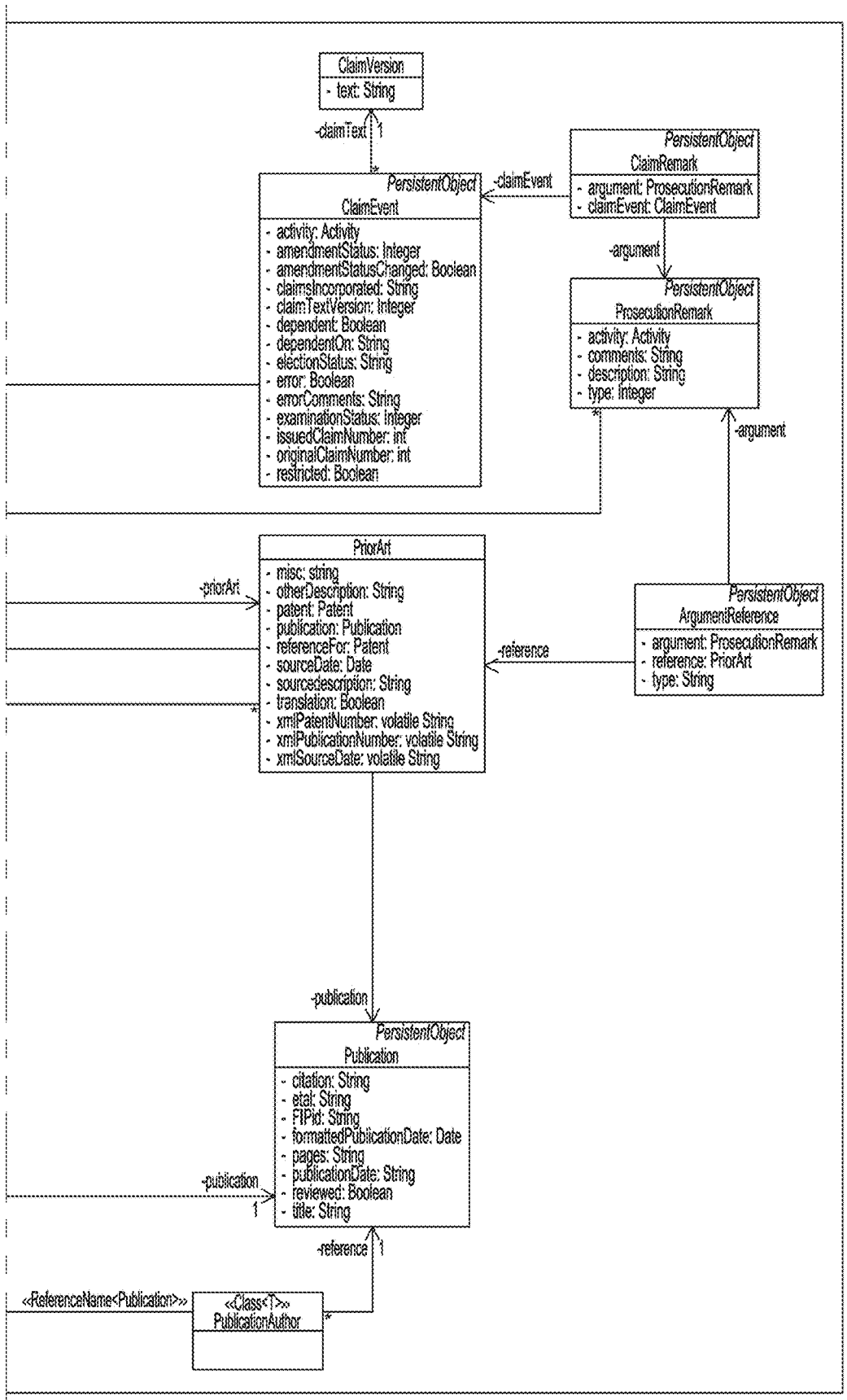
Figure 7:
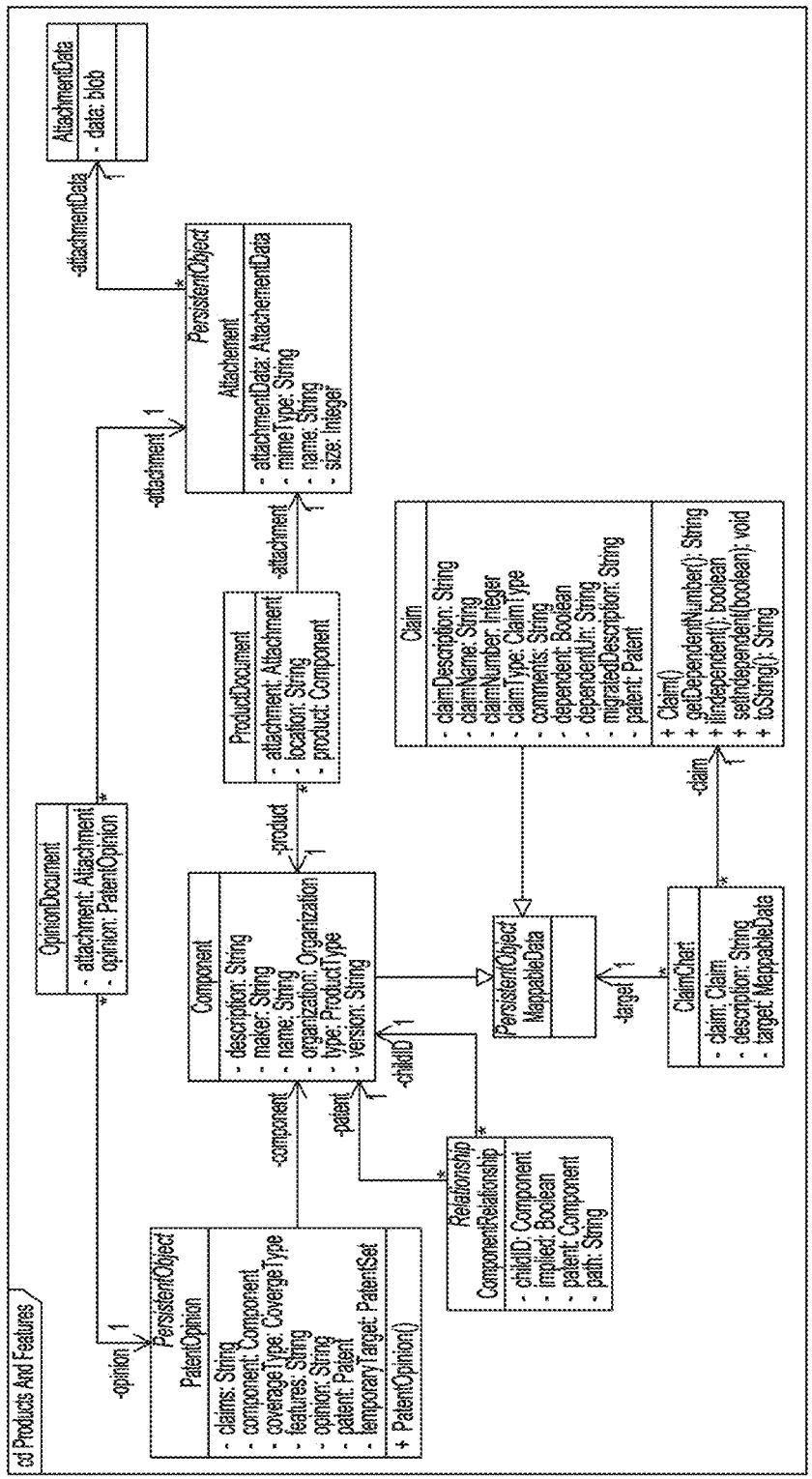
Figure 8:
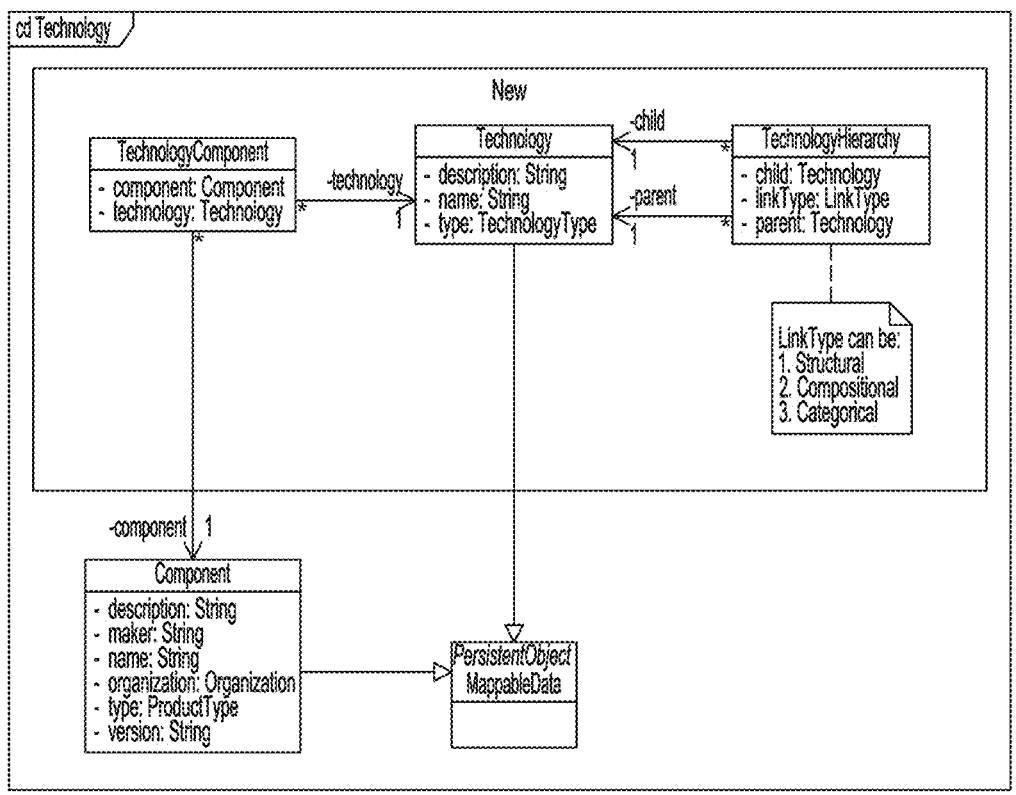

FIG. 6, according to an example embodiment, illustrates data models related generally to patent tracking. FIG. 7, according to an example embodiment, illustrates data models related generally to products and features. FIG. 8, according to an example embodiment, illustrates data models related generally to technology hierarchies.

Portfolio Mapping

FIG. 9 illustrates an example user interface that may be utilized to facilitate the methods described to map patent claims, according to an example embodiment. Displayed is the title 902 of a patent portfolio, controls are also illustrated that allow a user to edit to the portfolio, list the patents in the portfolio, "quick rank," and generate a panoramic claim map. Also shown is the "Default Ontology" 904 being used. In an example embodiment, "Quick Rank" allows a user to map all the patent claims in a patent to concepts at the same time. An ontology, in an example embodiment, includes the different concepts available to a user to map to one or more of the patent claims. Further, there is an example search criteria box 906 which allows a user to specify a search query. Included are options to narrow the search by type of claim 908 including searching independent claims, dependent claims, or both. The search expression box 910 may allow a user to specify a regular expression to use as a search query. There is also an option to have keywords highlighted 912 in the search results. In an example embodiment, this may include the searched for keywords or keywords that have previously been mapped to the claims. Also shown are options to narrow the search results by technology categories 914 and scope concepts 916.

FIG. 10 illustrates a method to map concepts to patent claims according to an example embodiment. A user interface such as the one illustrated in FIG. 9 may be used to facilitate this example method. Further, in an example embodiment, the method may be implemented using the data models and server device described above (e.g., server device 106 with reference to FIG. 1). At block 1002, a database of patent portfolios and a database of patents are maintained, each patent stored in the database of patents associated with one or more patent portfolios stored in the database of patent portfolios. A database management system may be used (DBMS) for storing and retrieving data from a data store which includes the database of patents and database of patent portfolios. In some embodiments, the DBMS is a relational database management system (RDBMS). In some other embodiments, the data store includes storing data in a Resource Description Framework Schema (RDFS). In some embodiments, communication with the data store includes using a language such as Structured Query Language (SQL) or eXtensible Markup Language (XML).

In an example embodiment, a database of ontologies may also be maintained, the ontologies including one or more patent concepts. As discussed above, an ontology may include all the metadata (patent concepts) that one may wish to map to a patent claim. For instance, the one or more patent concepts may include a technology category. The one or more patent claims may also include a scope concept, the scope concept defining a scope to which a patent claim is limited. The one or more patent or scope concepts in the database of ontologies may be organized in a hierarchical manner. Concepts lower in the hierarchy will typically be subsumed within the meaning or fall within the scope of a concept higher in the hierarchy. In an example embodiment, an indication of a relationship between a given patent concept and one or more patent claims in the database of patent claims may be stored. In further example embodiments, an indication stored against a concept higher in the hierarchy of patent concepts causes the same indication to be stored against associated concepts lower in the hierarchy of patent concepts. This ability to map and indicate claims against concepts collectively expedites and facilitates mapping review as several patent or scope concepts may be reviewed and dealt with at one time.

Keywords may also be used as patent concepts. These may be any term or short phrase that appears in the claim, exactly as it appears in the claim. As these terms are taken from the claims, they may be thought of as limitations in the sense that if the term cannot be read on an accused device, the claim probably does not cover the accused device. Example user interfaces showing scope concepts in an ontology can be seen with reference to FIG. 11.

In an example embodiment, at block 1004, a search query associated with a first patent portfolio is retrieved. A user of the system may wish to search a previously created portfolio of patents. A patent portfolio may include patents that a user wishes to analyze. For example, a portfolio might include all of the patents for a company ABC Corp (ABC). A portfolio may be stored and defined as a patent set in the patent set database (e.g., patent set database 222 in FIG. 2) ABC might have received information on a potential infringing product. In order to find the patent claims relevant to the product, ABC may wish to map its entire patent portfolio and use the resulting mapped portfolio to quickly find the best claims to assert in an infringement lawsuit. However, it may also be useful to map the patents of the alleged infringer. These patents may also be added to the portfolio as it is likely ABC's patents and the alleged infringer's patents will have overlapping subject matter.

The search query may help to narrow down the patent. In an example embodiment, the search query many include a regular expression. For example, if the search query is "*" all the patent claims in the patent portfolio will be displayed. Boolean expressions such as "car && dog" may also be used. In some example embodiments, an option is included to only search independent claims, dependent claims, or to search both. In some example embodiments, the portfolio may further be narrowed by using patent concepts that have been included in the current ontology.

FIG. 12 shows an example user interface with example options available to search by technology category. An example option is presented allowing a user to search technology categories disjunctively or conjunctively. In an example embodiment, each technology category in the ontology is shown to the user with three example options "Direct mapped claims," "Direct Mapped or 'Does Not Map,'" and "Direct Mapped or 'Unresolved.'" These terms will be discussed in greater detail with respect to block 1010.

FIG. 13 shows an example user interface with example options available to search by scope concept. In an example embodiment, each scope concept in the ontology is shown to the user with four example options "Direct mapped claims," "Do not include Direct Mapped or 'Does Not Map,'" "Direct Mapped or 'Does Not Map,'" and "Direct Mapped and 'Unresolved.'" These terms will be discussed in greater detail with respect to block 1010.

Referring back to FIG. 10, in an example embodiment at block 1006, the first portfolio is searched as a function of the search query. At block 1008, in an example embodiment, search results 918 are generated, the search results including one or more patent claims associated with the search query. Using the search query provided, a query may be formatted as an SQL query or other suitable format to query the underlying databases. Generating the search results may include retrieving patent claims which include terms from the search query and synonyms of the terms as well as plural versions of terms in the search query. The results of the query may then be presented to the user in an example user interface as shown in FIG. 9. Only one patent claim is illustrated, however, more patent claims may have resulted from the search and may be shown simultaneous as to have the ability to manipulate multiple patent claims. Column headings may include four radio buttons 920 signifying the options available for mapping, the matter number, the claim number, the claim text, and other technology categories or scope concepts currently mapped to the claim. Because the generated search results are searching an entire portfolio of patents it may be possible that not all of the claims of a given patent will match to the search query. A trio of numbers 922 may also be displayed for each claim in relationship to the technology category heading and the scope concept heading. These represent the nature of the relationship between the claim and the technology category or scope concept. For example, as illustrated, claim 1 has two technology categories directly mapped: "space vehicle" and "Electric Device or Method." It also has one scope concept directly mapped.

Referring back to FIG. 10, at block 1010, in an example embodiment, a plurality of patent claims are mapped to a patent concept. In an example embodiment, in addition to the database of patents and patent portfolios, a database of patent claims may be maintained. The database of patent claims may be administered and interacted with using a DBMS as described above. As described more fully with reference to FIG. 3, each patent claim may have one or more patent concepts that have been mapped to the claim. As discussed above with reference to narrowing down search results, the relationship between a patent concept and a patent claim may take on many forms. For example, the relationship may be one where the patent concept is directly mapped to a patent claim. This may indicate that a user who looked at the claim made the decision that the patent claim was in a particular technology category, for example. Another relationship may indicate that a patent concept is not mapped to a patent claim. If a user is sure that a particular claim is not in a technology category, for example, it may be beneficial for that information to be saved so that the mapping process is not unnecessarily duplicative.

With reference back to FIG. 9, a user may select one or more patent claims to map based on the radio buttons displayed. In an example embodiment, there are four radio buttons indicating options for the claim: "Direct Mapped," "Does Not Map," "Unresolved," and "No Operation." The first two options are described in detail above. The "Unresolved" radio button may indicate that a user is not sure whether the concept should be mapped to the patent claim. This may be helpful in cases where the user does not have the legal or technical expertise to make a decision one way or another. A more senior user may then review the unresolved patent claims en masse at a later time. The last radio button may indicate that a user does not wish to have any relationship defined between the patent claim and a patent concept. In an example embodiment the "No Operation" radio button is selected by default for all the patent claims returned from the search query.

Upon a user indicating a preferred mapping for each patent claim, a user may further indicate a preference of which category of patent concept to map. In an example embodiment, there are two categories: technology categories and scope concepts (e.g., elements 924 and 926 in FIG. 9). In an example embodiment, a user clicks on the button corresponding to their preference and this preference is sent to the service device which detects the category of concept the user clicked. In response, a user interface is presented to the user corresponding to his or her preference. For example, FIG. 14 may be presented.

FIG. 14 illustrates an example search box 1402 and an example search results 1404 section. Across the top is an option to add a new patent concept 1406 (see FIG. 15 for a more detailed look at an example method to add a patent concept). Other options may include returning to the main mapping screen (e.g. FIG. 9) or canceling the mapping. In an example embodiment, the search box allows a user to search across an entire ontology for potential patent concepts. Similar to searching for patent claims, a user may enter a regular expression such as '*' to retrieve all the concepts included in the present ontology. For example, the results of the search 1404 displayed in FIG. 14 only returns "multiple blades." A checkbox is presented allowing a user to select the concept 1408. If there is more than one concept displayed a user may select more than one of the concepts by selecting the respective checkboxes next to the patent concepts. A checkbox at the top of the results may be selected if a user wishes to select all 1410 of the concepts returned from the ontology search.

Further example options may be presented to the right of each concept. An option to "modify and map" 1412 may be selected if the user wishes to modify the concept. This may be useful if a user wishes to broaden the concept so that it may be mapped to more patent claims. For example, a narrow technology category may have been defined as "power computer speakers." Rather than a user defining a new technology category of "passive computer speakers," the user might decide it makes more logical sense to only have one technology category titled "computer speakers." In an example embodiment, the user can safely select "modify and map" and change the technology category to "computer speakers." This may safely be done because all "powered computer speakers" are also "computer speakers." In an example embodiment, every patent claim, regardless of which portfolio(s) it may be included in, will be updated to reflect the modified concept. Thus, it may not be advisable to narrow a concept without being certain every patent claim in the system adheres to the modified concept. In an example embodiment, a warning may be displayed to the user explaining the effects of modifying a concept.

In an example embodiment, an indication of a relationship between the patent concept and the plurality of claims in the database of patents may be stored (e.g., updating one or more databases). This may be accomplished, for example, by the user selecting the map button as displayed in FIG. 14. As discussed above, a user may have selected multiple patent claims resulting from searching and may have further indicated a preference for one or more patents claims to have concepts directly mapped as well as indicated a preference to have one or more patent claims have patent concepts not mapped. Thus, in an example embodiment, the indication of the relationship may include an indication that the plurality of patent claims are not mapped to the patent concept. In an example embodiment, the indication of the relationship includes an indication that the plurality of patent claims are mapped to the patent concept.

It some example embodiments mapping a plurality of patent claims to a patent concept includes defining the patent concept. Defining the patent concept may be initiated by a user clicking on the example "add_new" button 1406 as displayed in FIG. 14. An example user interface that may be presented to the user in response to this selection is illustrated in FIG. 15. Two example options may be presented, "Save" and "Cancel." Also shows are two input text boxes, "Concept Name" and "Description." The concept name may be the actual concept and may be, for example, either a technology category or a scope concept. A user may indicate which category of patent concept the new concept belongs using a pull down menu. The user may further wish to add the concept to an existing ontology by selecting one or more ontologies as presented in FIG. 15.

Report and Chart Generation

As described, the system may allow the generation of visual representation of the data included in the databases to further maximize the value of concepts to patent claims. In some example embodiments the charts may be interactive. In some example embodiments, a method to generate the charts includes formulating a query to send to one or more databases, the query requesting whether or not a set of patent claims have been mapped to a set of patent concepts. An additional query may be sent to the databases to determine additional metadata about the patent claims including, but not limited to, the filing data and owner of each patent. Ranking data may be received for each patent concept retrieved from the databases. In an example embodiment, the system generates a relationship between a ranking, a patent concept, and a patent claim and displays the relationship to the user in the form of a chart. The ranking data may be stored in the database or may be received from a user. In some embodiments, ranking data may include integer values of disparate range (e.g., 1-10 or 1-100) alphabetical letters (e.g., a grading scale of A-F), or any other means to characterize a claim or concept.

In an example embodiment, a competitor landscape chart may be generated. An example simple competitor landscape chart is shown in FIG. 16. Shown is the title, patent number, filing data, total claims, each independent claim, and owner of each patent in a patent set. The patent set may reflect the patents owned by the competitors of a company requesting the map. The scope concepts that have been mapped to the patent claims in the patent set may be displayed as rows in the chart. If a scope concept has been mapped to a patent claim than the intersecting cell between the patent claim and concept may be filled in, checked, change color, patterned, shaded or otherwise have an indication of the mapping. Additional columns may indicate the competitor that first introduced a concept as well as the date it was introduced. This may be determined by examining each patent that has a concept mapped to at least one of the claims and examining the dates of each of the matching patents. In addition, the scope concepts may be sorted by frequency. Each competitor may be assigned a color or other designation such that a user may quickly determine which company owns each patent as well as who introduced what concepts first.

In an example embodiment, a product coverage chart may be generated. An example product coverage chart is shown in FIG. 17. As with FIG. 16, relevant patent information for patents included in the patent set is displayed. Also, displayed is a column titled "Has Feature?" This column may have values ranging from one to three signifying the degree to which the product includes the concept. For example, a value of three may mean the product definitely includes the concept and a value of one means the product definitely does not relate to the concept. Based on these values, the chart may dynamically update and determine values for the claim coverage and product coverage rows. For example, SC 1 and SC 5 both have a rating of '3' and are present in all of the claims of patent "Title 1." Thus, "Title 1" has a claim coverage of '3' and a product coverage value of "potentially applies." It is only "potentially applies" because it cannot be known for certain whether the patent applies but only that that SC 1 and SC 5 are present in the claims. However, because scope concepts always describe limitations, if a claim has two scope concepts mapped, as shown with respect to the claims in patent "Title 2," the lowest ratings score will control the claim coverage. As shown, SC 6 is described as not being present in the product and the "Title 2" claims have been mapped to SC 6. Therefore, regardless of the fact the SC 3 has also been mapped and the product has this feature, the "Title 2" claims cannot apply to the product as they are at least limited to SC 6.

This chart may also allow interactivity with a user. This interactivity may include the user changing the "Has feature" values and the chart automatically updating the claim coverage and product coverage rows. For example, if the SC 1 rating was changed to '1,' the claim coverage value of the patent "Title 1" may change to "1" signifying the patent does not apply to the product. In some embodiments, any changes that result from input from the user are highlighted on the chart. This may allow a user to quickly see the effects of potential changes to product coverage.

FIG. 18 illustrates an example freedom to operate chart. In an example embodiment, a freedom to operate chart allows a user to quickly see which patents may be necessary to obtain licenses from or purchase to produce a product, sell a service, etc. FIG. 18 is similar to FIG. 17 except for in place of a "Has feature?" column there is a "Need Feature?" column. The values in this column may represent whether or not, and to what extent, a user believes a feature is necessary in his or her product. A '3' may indicate that the scope concept is necessary, a '2' may indicate the scope concept is wanted, but not needed, and a '1' may indicate the scope concept is not needed. In an example embodiment, the "claim status" row shown in FIG. 18 reflects whether a patent in the patent set needs to be licensed or purchased in order for the user to operate freely. As with the product coverage chart, the lowest value in the "need feature" column controls. Thus, patent "Title 1" is not needed even though SC 1 is mapped to all the claims and the user has indicated the feature is necessary. Similarly to above, a user may interact with the ratings to see in real-time the impact of removing or adding features in terms of the number of patents needing to be licensed or purchased.

FIG. 19 illustrates an example claim/patent valuation chart. In an example embodiment, a claim/patent valuation chart allows a user to see which patents/claims may be necessary to license, etc., to maximize the value of a currently owned patent or patent claim. FIG. 19 is similar to FIG. 17 except the values in the ratings column reflect whether or not a scope concept is necessary to maximize a patent's value. The values in this column may represent whether or not, and to what extent, a user believes a feature is necessary in maximize a patent's value. A '3' may indicate that the scope concept is necessary, a '2' may indicate the scope concept is wanted, but not needed, and a '1' may indicate the scope concept is not needed. In an example embodiment, the "claim value" row shown in FIG. 19 reflects whether a patent in the patent set needs to be licensed or purchased in order to maximize the user's patent. As with the product coverage chart, the lowest value in the rating column controls. Thus, patent "Title 1" is not important, even though SC 1 is mapped to all the claims and the user has indicated a high value for SC 1. Similarly to the above charts, a user may interact with the chart by changing the ratings to see in real-time the effects on patents in the patent set.

FIG. 20 illustrates an example validity chart. In an example embodiment, a validity chart allows a user to see the overlap between a patent and a patent set. FIG. 20 is similar to FIG. 17 except the values in the ratings column reflect whether or not a feature is shown in the patent in question (the patent to which the patent set is being compared). The values in this column may represent whether or not, and to what extent, a user believes a feature is present in the patent in question. A '3' may indicate that the scope concept is shown, a '2' may indicate the scope concept is possibly shown, and a '1' may indicate the scope concept is not shown. In an example embodiment, the claim status row shown in FIG. 20 reflects the extent to which the patent in question and the patents in the patent set overlap. Unlike the product coverage chart, if two scope concepts are mapped to a patent, but contain different ratings, the feature rating becomes "some overlap". Thus, even though SC 5 has been rated as not shown and mapped to patent "Title 1," SC 1 is also mapped to the patent but is shown and therefore there is some overlap between the patent in question and patent "Title 1." A finding of "complete overlap" may indicate to a user that a patent or claim is completed anticipated. As above, the user may interact with the chart by changing the ratings to see in real-time the effects on patents in the patent set.

Figure 22:
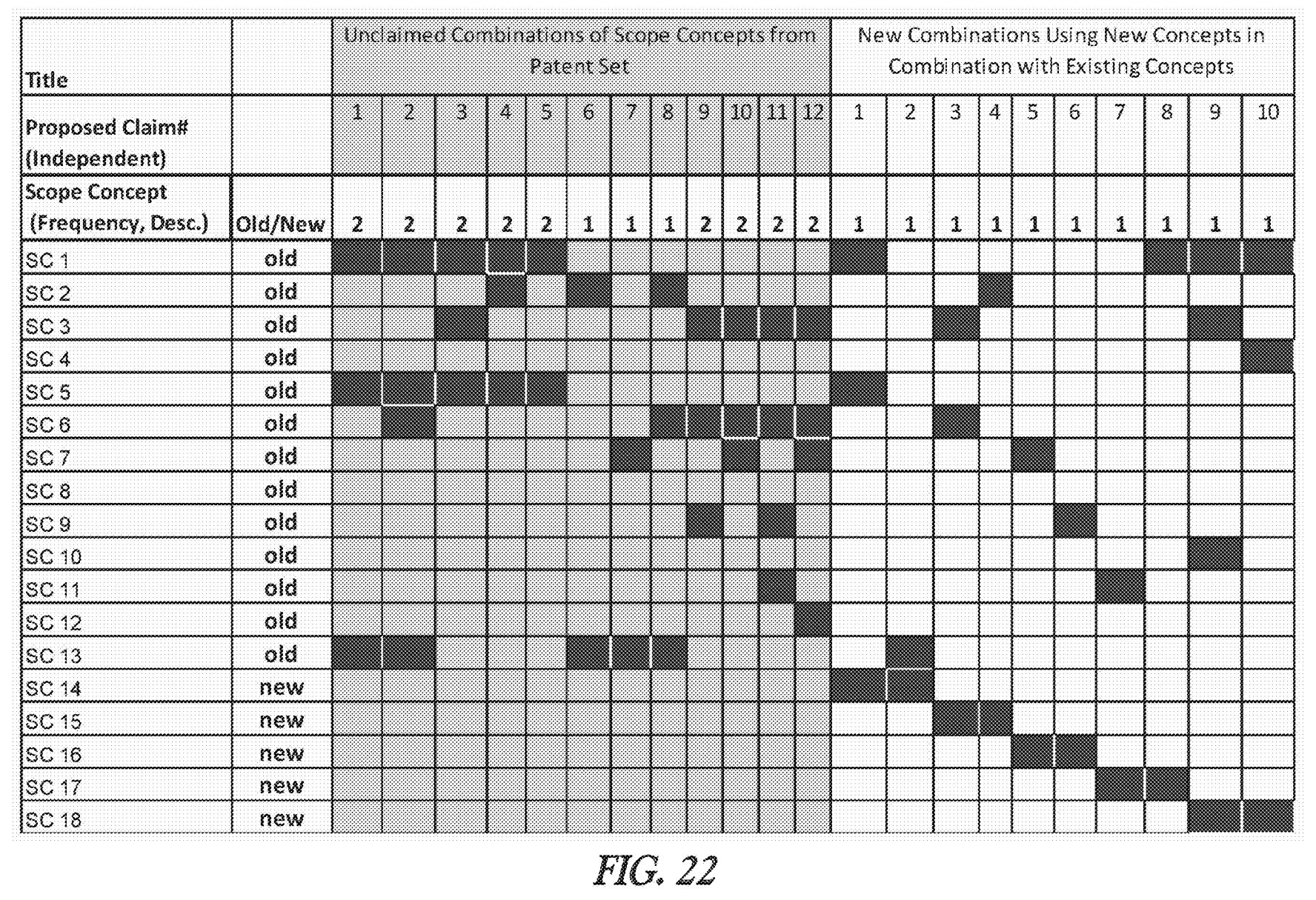

FIG. 21 illustrates an example white space analysis chart. In an example embodiment, a white space analysis chart allows a user to see the frequency in which scope concepts appear in a patent set. In some embodiments there are scope concepts that are in no patent claims. The chart may be color coded to allow a user to quickly ascertain the least frequently used scope concepts. FIG. 22 illustrates an example white space claim generation chart. In an example embodiment the generated chart illustrates suggested combinations of unclaimed combinations of existing scope concepts as well as suggested combinations of new scope concepts with existing scope concepts.

Computer System

Figure 23:
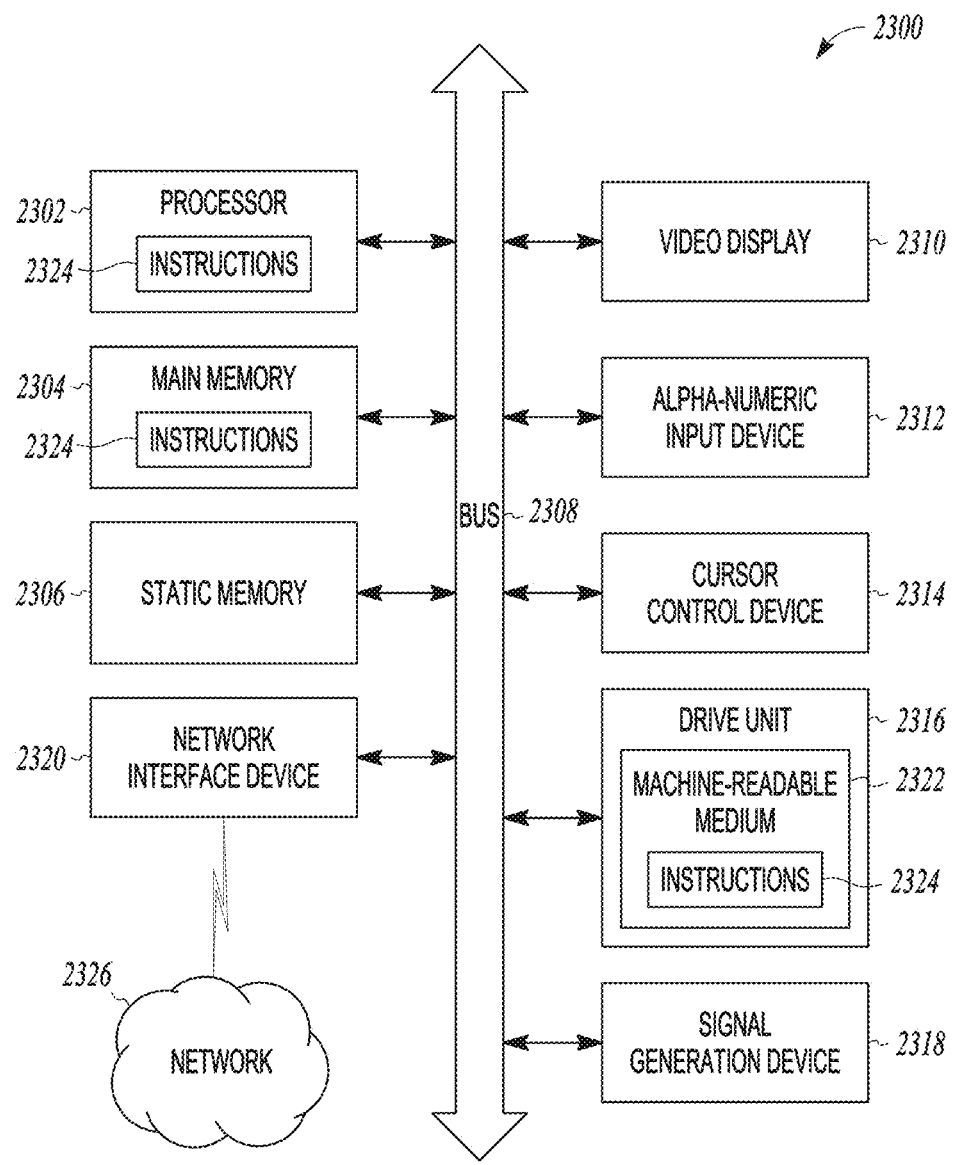
FIG. 23 is a computer system, according to an example embodiment.

FIG. 23 shows a diagrammatic representation of a machine in the example form of a computer system 2300 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 2300 includes a processor 2302 (e.g., a Central Processing Unit (CPU), a Graphics Processing Unit (GPU) or both), a main memory 2304 and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 may also includes an alphanumeric input device 2312 (e.g., a keyboard), a User Interface (UI) cursor controller (e.g., a mouse), a disc drive unit 2316, a signal generation device 2318 (e.g., a speaker) and a network interface device (e.g., a transmitter) 2320.

The disc drive unit 2316 includes a machine-readable medium 2328 on which is stored one or more sets of instructions 2317 and data structures (e.g., software) embodying or utilized by any one or more of the methodologies or functions illustrated herein. The software may also reside, completely or at least partially, within the main memory 2304 and/or within the processor 2302 during execution thereof by the computer system 2300, the main memory 2304 and the processor 2302 also constituting machine-readable media.

The instructions 2317 may further be transmitted or received over a network (e.g., the INTERNET) 2326 via the network interface device 2320 utilizing any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Prior Art Citation and Management

FIGS. 24 to 28 illustrate examples of user interfaces that may be utilized to facilitate the methods described to create and manage prior art portfolios and to map, assess and display an indication of the relevancy of prior art. In an example embodiment, patent claims may be mapped against one or more of the patents stored in a prior art patent portfolio. The prior art patents may be assessed for relevancy before potential submission to the USPTO or other international patent office according to any one or more of the patent mapping example embodiments described in this specification. In an example embodiment, two types of portfolio may be created and stored in the database 212 of patents and portfolios, an "Analyis" portfolio and a "Prior Art" portfolio. These portfolios may be used in many different ways, but an "Analysis" portfolio will typically be used for example in freedom-to-operate or "white space" investigations, while a "Prior Art" portfolio will be used for example in validity or relevancy assessments.

Example embodiments of the "Prior Art" portfolio may be used in the course of patent prosecution or in the preparation of Information Disclosure Statements. Prior art may be collected manually or automatically from one or more sources and reviewed for potential citation. Relevancy assessments may be displayed in one or more of the exemplary charts described in this specification. Prior Art portfolios may be created for the purpose of assembling related patent matters into groups so that prior art references cited, for example, against one of the matters within the group may propagate or "flow" into other matters for consideration as downstream or related citations in those other matters. This holistic overview and assessment of prior art greatly facilitates an applicant in discharging his or her duty to make full disclosure of all potentially relevant subject matter. A Prior Art portfolio will have all the features and capabilities of an Analysis portfolio and may be used in mapping techniques as described more fully above under the heading Portfolio Mapping.

As shown in FIG. 24, a visual indicator 240 is displayed in a Prior Art portfolio at graphic user interface (GUI) level in order to distinguish this portfolio. A portfolio "type" field 242 may also be introduced in similar way.

Cross citation of prior art references in portfolios may be accomplished using one or more of the functional modules described above in relation to FIG. 2. References added to a patent matter listed in a selected Prior Art portfolio will automatically propagate or "flow" to other matters listed in that portfolio and into all other Prior Art portfolios where common matters exist between the portfolios until all the possibilities of reference flow (described further below) have been exhausted. At least one of the matters within a Prior Art portfolio must exist in another Prior Art portfolio in order for the added references to flow outside of that portfolio. This flow only occurs between Prior Art portfolios, and does not occur for example between a Prior Art portfolio and an Analysis portfolio. For example, a reference will not flow into any matters in Prior Art portfolio P2 below if any reference is cited or added to a matter in Prior Art portfolio P1, since there are no common matters between these two portfolios. Similarly, no references will flow from either of Prior Art portfolios P1 or P2 to Analysis portfolio PA1 since these portfolios are of different type, notwithstanding that matters C and E are respectively shared or "common".

Prior Art P1—matters A, B, C
Analysis PA1—matters C, D, E
Prior Art P2—matters E, F, G If an Analysis portfolio is converted into a Prior Art portfolio (by redesignation of the "type" field selector 242 described above, for example), the existing references cited against the various individual matters in this portfolio will flow to all other matters contained within the portfolio. In other words, all matters will have the same set of references for review, or mapping and/or potential submission to the USPTO, for example. Additionally on conversion of an Analysis portfolio to a Prior Art portfolio, references will flow to other Prior Art portfolios based on the existence of "common" matters as described above. In order to avoid a proliferation of potentially confusing reference flow, "reverse" or "roll back" reference flow is not allowed (i.e. is disabled) when a Prior Art portfolio is converted into an Analysis portfolio. All references associated with that portfolio will remain as they are at that point in time, but no further flow will occur if new references are added to the (converted) Analysis portfolio.

Certain further rules and exceptions may be provided for reference flow. A reference cannot flow into a matter having the status of one of the following types: Issued, Archived Expired, Abandoned, Expired, Expired Pending Renewal/Extension, and Expired/Terminated. New references flowing into matters are initially referenced as "Unmarked". Duplicate references cannot flow into any matter. For example, if a matter already contains Version 1 of reference R, the system will not allow Version 2 of Reference R to flow into the same matter.

In some example embodiments, the propagation or "flow level" of references flowing between respective Prior Art portfolios may be indicated. The term "flow level" can also be referred to as "generation level" or "generation flow". Such an indication can serve to categorize the prior art citations and may greatly assist in determining the likely relevance of a listed prior art reference to be cited in a potential Information Disclosure Statement, for example. A "source" patent matter, in a given patent portfolio, that a prior art reference is added to or associated with initially does not have a "flow level" or "level indicator" since that matter is indicated as the "source" matter for that reference. This "source" level may be considered as a "zero" or "base" level for the reference. FIG. 25 indicates such a designation at 250.

All matters in the portfolio in which that "source" matter is contained receiving the "flow" of that reference to them will exhibit a "Flow Level" indication of "1". When the reference flows outside the portfolio, for example, where a "common" matter exists between portfolios, a "Flow Level" indication of "2" is displayed. Further "flow" of that reference into other portfolios will yield "Flow Level" indications of "3", and so on. The further a reference "flows" from its source, the higher the flow level indication. Potential relevancy of a given reference may be considered inversely proportional to its flow level.

Figure 26:
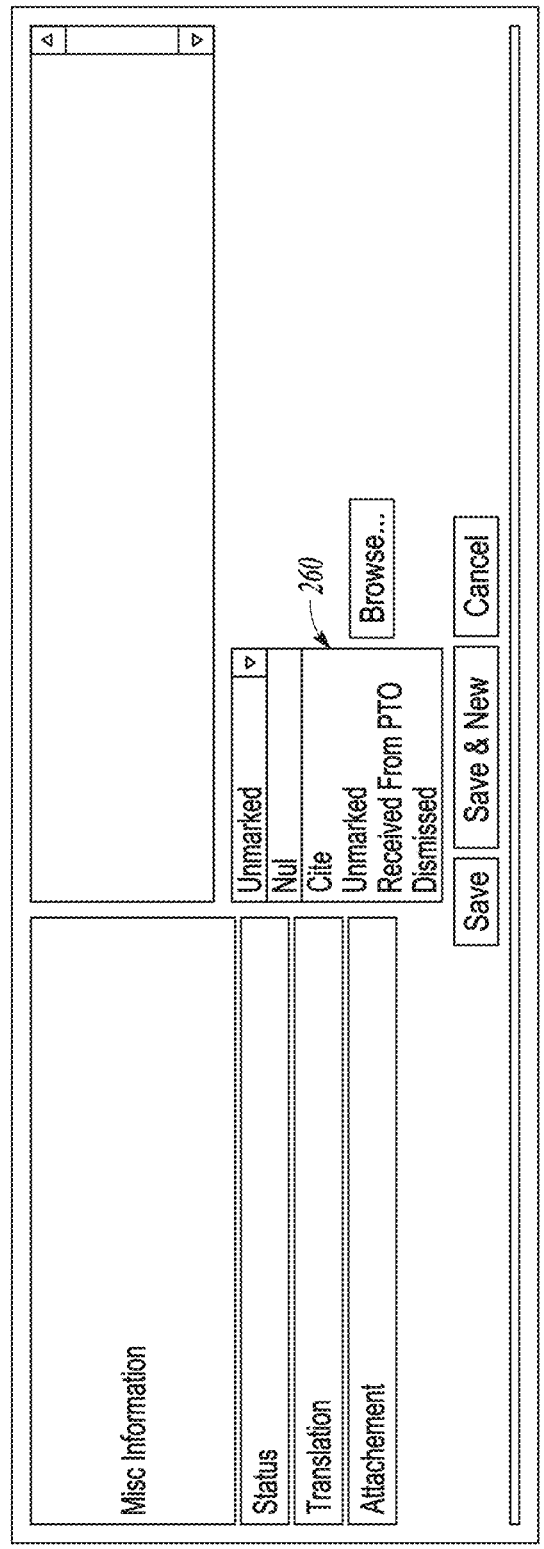

In example embodiments, "Status" indicators may be provided for prior art references in the course of their initial identification and subsequent flow between portfolios. In FIG. 26 at 260, a status indication of "NUL" indicates that a reference is not applicable as or does not constitute prior art. For example, the referenced document may simply be a formal notice from a patent office indicating that an action is outstanding. The notice itself does not contain any technical disclosure pertaining to the relevant subject matter. "UNMARKED" is the default status indication provided when a new reference flows to a patent matter under reference flow. "CITED" is designated by a user when a reference is submitted to a patent office as part of an Information Disclosure Statement, for example. "RECEIVED FROM PTO" is designated when a reference is received from the relevant Patent Office, typically after examination or search. "DISMISSED" is designated by a user when a reference is considered not to pertain to a matter i.e. it is not relevant subject matter for submission under an Information Disclosure Statement, for example. In this instance, the mapping or other modules (see FIG. 2) operate to "hide" this reference from further consideration in the matter it has been dismissed from, but the reference is still available for "flow" to other matters within the portfolio or to other portfolios. In some example embodiments, a check box (for example shown at 270 in FIG. 27) is provided which can be selected to display all dismissed references in a listing. A user can change the reference status at any time and may do so collectively, or "in bulk", in an example embodiment. The "bulk" selection can be used by check box 272 in FIG. 27, for example. A user can select multiple references from a reference list and can change the status of all selected references at one time. There is no restriction on what a status can be changed to or from. A mismarked reference can be corrected, for example.

In other example embodiments and with reference to FIG. 28, a source date column is added to the user interface at 280. The source date is stored in the patent database and is displayed in the reference listing screen to indicate the date the reference was first introduced into or associated with the source matter. This source date may be useful in assessing relevancy when the reference flows to other matters or other portfolios.

Figure 30:

Displayed at 290 in FIG. 29 is a "References" tab which may be selected to generate a list of references contained in a given portfolio against one or more matters listed in that portfolio. In some example embodiments shown in FIG. 30, sub-tabs 312 with associated functionality are provided. The sub-tabs may include sub-tab 300 (All References), sub-tab 302 (Patent References), sub-tab 304 (Non-Patent References), sub-tab 306 (Bulk Add), sub-tab 308 (Job Status) and sub-tab 310 (Holding List). This additional functionality allows, for example, a user to add (or "scrape") references into a given matter or portfolio "in bulk", or selectively display references under one or more different headings or reference types (patent, non-patent etc).

Figure 31:
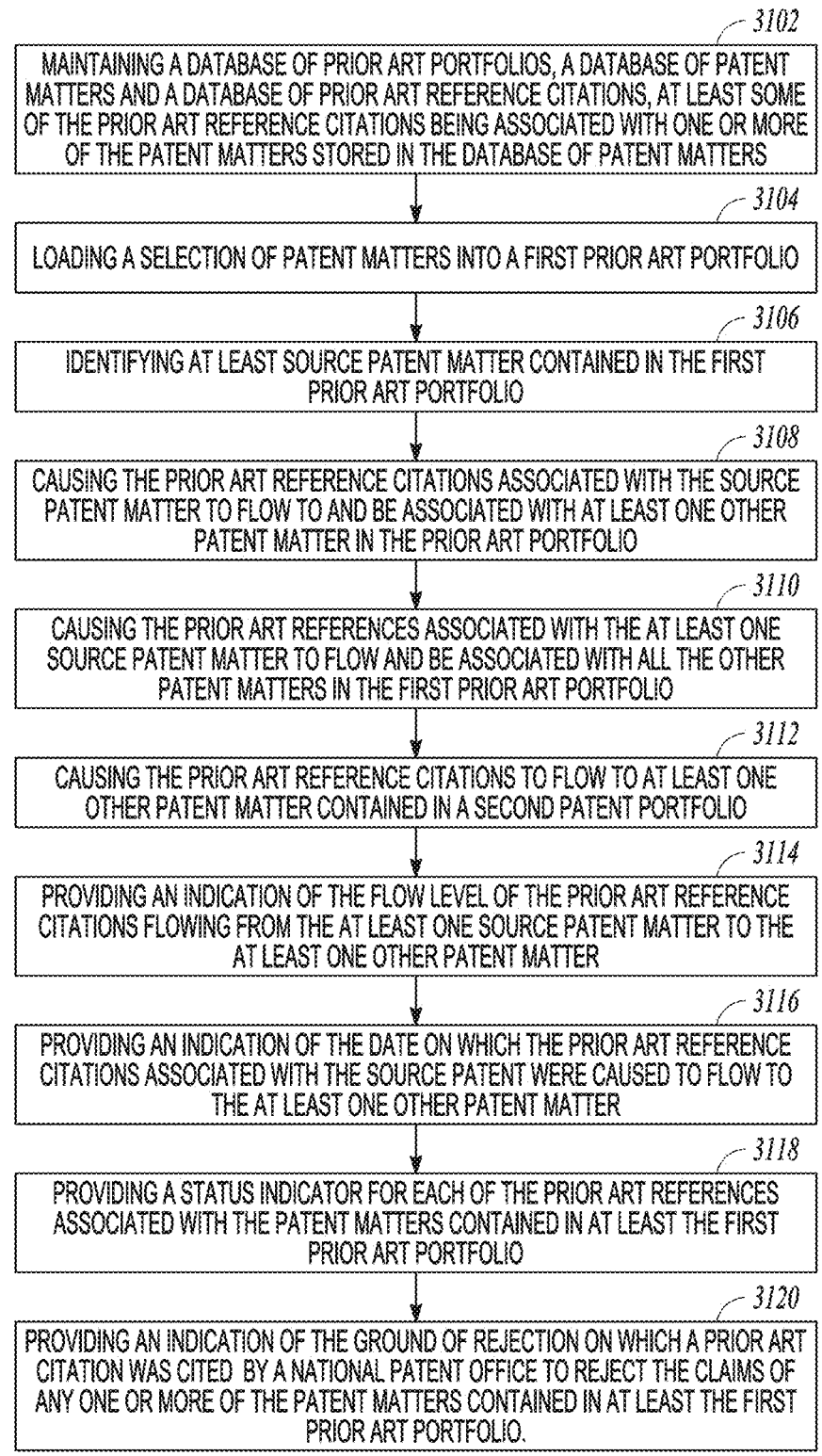
FIG. 31 is a block diagram showing a method of managing prior art, according to example embodiments.

FIG. 31 illustrates a method to map concepts to patent claims according to an example method embodiment. A user interface such as any of those illustrated in FIGS. 24 to 30 may be used to facilitate this example method. Further, in an example embodiment, the method may be implemented using the data models and server device described above (e.g., server device 106 with reference to FIG. 1), or using any of the modules described with reference to FIG. 2. At block 3102, a database of prior art portfolios, a database of patent matters and a database of prior art reference citations (or "references") are maintained, at least some of the prior art reference citations being associated with one or more of the patent matters stored in the database of patent matters. At block 3104, a selection or sub-set of patent matters is loaded into a first prior art portfolio for further analysis and potential cross-citation to other patent matters and/or prior art portfolios. At block 3106, at least one initial or "source" patent matter contained in the first prior art portfolio is identified. At block 3108, any one or more of the prior art reference citations cited against (or otherwise associated with the source patent matter by reason of potential subject matter relevancy, for example) is caused to flow and thereby be associated with at least one other patent matter in the prior art portfolio. In this way, the references cited or associated with a "source" matter in a given prior art portfolio can be cross-cited for further study (and potential citation to a national patent office) in another "downstream" matter in the same portfolio or, in other example embodiments, a different portfolio.

At block 3110 in other example embodiments, the prior art references associated with the at least one source patent matter may be caused to flow and be associated with all the other patent matters in the same (first) prior art portfolio. At block 3112 in other example embodiments, the references may be caused to flow to at least one patent matter contained in a different (or second) patent portfolio.

At block 3114, in further example embodiments, the method may include providing an indication of the flow level of the prior art reference citations flowing from the at least one patent matter to the at least one other patent matter. As described above, this flow level indication may be designated as a "0", "1" or a "2" depending on the successive levels of flow of a given reference from matter to matter, or in other example embodiments from portfolio to portfolio. At block 3116, in further example embodiments, the method may include providing an indication of the date on which a reference is first associated with or cited against a source patent matter, or the date on which a reference flows from the source patent matter to another matter or portfolio downstream. At block 3118, in further example embodiments the method may include providing a status indicator for each of the prior art references associated with the patent matters contained in at least the first prior art portfolio. At block 3120, in further example embodiments the method may further include providing an indication of the ground of rejection on which a prior art citation was cited by a national patent office to reject the claims of any one or more of the patent matters contained in at least the first prior art portfolio.

In further example embodiments, and with reference again to FIG. 2, the mapping module 224 may be configured to cause prior art reference citations associated with at least one source patent matter contained in a first Prior Art portfolio to flow to and be associated with at least one other patent matter contained in that Prior Art portfolio. The mapping module 224 may further be configured to allow references to flow to and be associated with patent matters in second or further Prior Art portfolios. The mapping module 224 may further be configured to identify and provide the flow level indications ("0", "1", or "2" etc), the date on which references flow from a source patent matter to another one, and/or the ground of rejection on which one or more of the prior art citations may have been advanced by a national patent office.

Referring again to FIG. 2, in further example embodiments, the web server engine 208 is configured to load a selection of patent matters into the first Prior Art portfolio. The patent matters may be selected manually by a user based on predetermined criteria or relevance to a target subject matter, or may be loaded automatically by the engine pursuant to a search conducted by the mining module 204 in response to a search query. The tracking module 216 is configured to identify any reference citations associated with a selected patent matter in the portfolio, referred to as "source" patent matter, in the Prior art portfolio. The tracking 216 or mapping module 224 is configured to associate the identified reference citations with at least one other patent matter in that Prior Art portfolio, or a second Prior Art portfolio. For clarity of description, this association process is called "flow" in this specification. The flow may be configured to occur automatically, or in response to a series of selections entered manually by a user.

A user may employ the methods, embodiments and systems of the invention to load matters (granted patents, pending applications, invention disclosures and the like) into identified "Prior Art" portfolios. Prior art citations associated with those patent matters can be caused automatically (or manually pursuant to specified criteria) to flow between matters in a portfolio, or between common matters listed in more than one Prior Art portfolio. The citations can be kept and viewed in lists in the portfolios, and the patent matters and associated citations can be added or deleted from portfolios pursuant to identified relationships (e.g. common priority claim, or same title etc), or not as the case may be. Any arbitrary patent matters or prior art reference citations can be added.

Prior art citations may be displayed in each matter and filtered for example by their nature or source (e.g. citations arriving from other matters or portfolios), the type of rejection (e.g. novelty 102/obviousness 103 etc), or by the number of flow levels (or "hops") it took for a citation to flow to and reach a given destination matter or portfolio from a source. Other forms of analysis may be employed to identify filtering criteria.

Figure 32:
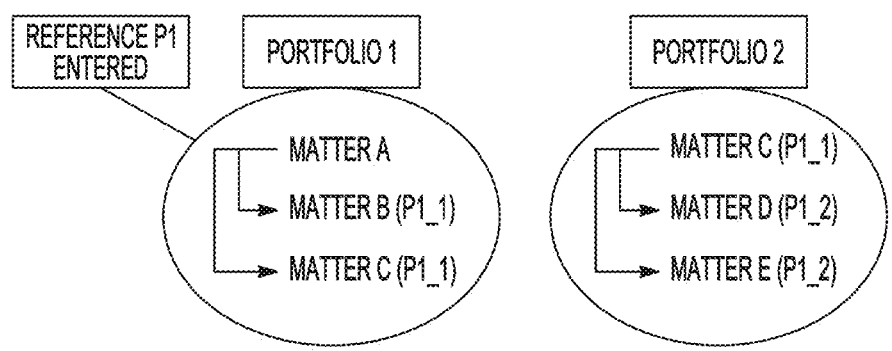
FIG. 32 is a use case diagram, according to example embodiments.

An example use case and further example embodiments are now described with reference to FIG. 32. Suppose Prior Art Portfolio 1 contains matters A, B and C while Prior Art Portfolio 2 contains matters C, D and E. Typically but not necessarily, matters A, B and C will be related to each other so as to be in the same patent family with, for example, a common priority claim under an international patent convention. The matters in Portfolio 2 will typically, but not necessarily, be related in some way to the matters in Portfolio 1. For example, matters D and E may be divisional cases of matter C. The typical situation is such that there is a duty to disclose and cross-cite potentially relevant prior art associated with each of the related matters A through E.

In an example embodiment, Reference P1 is entered into Matter A either automatically using a "scraper" tool, for example, or manually pursuant to one or more selection criteria adopted by a user. At this stage, and in this example embodiment, the Reference P1 has a flow level of "0". This level indicates that a reference was sent to a prior art portfolio for citation, but was not yet added to another individual matter (Flow level 1) within the portfolio before beginning to flow across matters and portfolios. In this way, a user is able to review references at "0" level before starting cross-citation or further propagation to other matters or portfolios. In further example embodiments, references at "0" level may be held in a "pre-portfolio" holding area without yet designating a single matter in that portfolio that would start the flow process. The holding area may be visually represented separately in any one of the user interfaces described above.

Referring back to FIG. 32, after entering Matter A, Reference P1 automatically flows into Matters B and C as P1-1 indicating flow level "1" or first generation flow. Reference P1 also automatically flows into Matters D and E in Portfolio 2 from common Matter C as P1-2, indicating flow level "2" or second generation flow. Further propagation or flow continues as long as the matters that Reference P1 has flowed into exist in other portfolios (with their proper generations indicated) until all possibilities are exhausted.

In some embodiments, a reference (such as P1) will not flow to be added into matters where it already exists (i.e. with which it is already associated), but the prior association in that matter of a flowing reference will not stop the further propagation of the reference. Hence, if Reference P1 in FIG. 32 was already associated with Matter D as P1-1 it would stay indicated as such but would still flow into Matter E as P1-2. In some embodiments, all references that flow automatically will flow into the related matters as "Unmarked" for their status indicating that they have not yet been marked in any fashion with regards to citing or not citing to a given local or international patent office.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method of managing prior art comprising:
    identifying a source patent matter in a patent portfolio;
    obtaining a document associated with the source patent matter;
    assigning an applicable prior art status value to the document based on an evaluation of document data of the document;
    classifying the document as a prior art reference based on the applicable prior art status value;
    converting the patent portfolio into a first prior art portfolio;
    adding an association between the prior art reference and the first prior art portfolio;
    recording an association date for the association between the prior art reference and the source patent matter of the first prior art portfolio, wherein the association date is a date when the prior art reference was first cited in the source patent matter of the first prior art portfolio;
    determining a citation chain between the source patent matter and a second patent matter, wherein the citation chain identifies successive levels of prior art reference flow from the source patent matter through one or more intermediate prior art portfolios to the second patent matter;
    causing the prior art reference to automatically flow to a second prior art portfolio, the second prior art portfolio including at least one common patent matter with the first prior art portfolio;
    determining an application status for a patent matter;
    causing the prior art reference to flow to the patent matter based on the application status;
    tracking a flow level indicator for each prior art portfolio in the citation chain, wherein the flow level indicator designates a successive generation level of prior art reference flow from the source patent matter, wherein a flow level of zero is assigned to the source patent matter, a flow level of one is assigned to prior art references flowing to other patent matters in the first prior art portfolio, and a flow level of two or higher is assigned to prior art references flowing to patent matters in the second prior art portfolio;
    and
    providing, in a display, a flow level indicator generated by calculating a number of prior art portfolios in the citation chain based on the tracked flow level indicators to determine relevancy of the prior art reference to the patent matter, wherein relevancy is inversely proportional to the calculated number of portfolios in the citation chain, the association date, and a mapping status indicator selected at least in part based on a document type of the prior art reference.

2. The computer implemented method of claim 1, further comprising:
    identifying a second patent portfolio with a common patent matter of the patent portfolio.

3. The computer implemented method of claim 2, further comprising:
    adding an association between the prior art reference and each patent matter of the second patent portfolio;
    recording an association date for the association between the prior art reference and each patent matter of the second patent portfolio.

4. The computer implemented method of claim 3 comprising:
    updating the display with a propagation level in relation to the prior art reference for each patent matter in the patent portfolio and each patent matter in the second patent portfolio, wherein the propagation level is based on propagation hops between the source patent matter and a respective patent matter.

5. The computer implemented method of claim 1, further comprising:
    providing a submission status indicator for each patent matter in the patent portfolio in relation to the prior art reference, wherein the submission status indicator indicates a submission status of the prior art reference to a national patent office.

6. The computer implemented method of claim 1, further comprising:
providing an indication of a ground of rejection on which the prior art reference was cited by a national patent office to reject claims of at least one patent matter contained in the patent portfolio.

7. The computer implemented method of claim 1, further comprising:
providing a citation source indication for the prior art reference.

8. A system for managing prior art comprising:
at least one processor;
memory including instructions that, when executed by the at least one processor, causes the at least one processor to perform operations to:
identify a source patent matter in a patent portfolio;
obtain a document associated with the source patent matter;
assign an applicable prior art status value to the document based on an evaluation of document data of the document;
classify the document as a prior art reference based on the applicable prior art status value; and a prior art reference associated with the source patent matter;
convert the patent portfolio into a first prior art portfolio;
add an association between the prior art reference and the first prior art portfolio;
record an association date for the association between the prior art reference and the source patent matter of the first prior art portfolio, wherein the association date is a date when the prior art reference was first cited in the source patent of the first prior art portfolio;
determine a citation chain between the source patent matter and a second patent matter, wherein the citation chain identifies successive levels of prior art reference flow from the source patent matter through one or more intermediate prior art portfolios to the second patent matter;
cause the prior art reference to automatically flow to a second prior art portfolio, the second prior art portfolio including at least one common patent matter with the first prior art portfolio;
determine an application status for a patent matter;
cause the prior art reference to flow to the patent matter based on the application status;
track a flow level indicator for each prior art portfolio in the citation chain, wherein the flow level indicator designates a successive generation level of prior art reference flow from the source patent matter, wherein a flow level of zero is assigned to the source patent matter, a flow level of one is assigned to prior art references flowing to other patent matters in the first prior art portfolio, and a flow level of two or higher is assigned to prior art references flowing to patent matters in the second prior art portfolio; and
provide, in a display, a flow level indicator generated by calculating a number of prior art portfolios in the citation chain based on the tracked flow level indicators to determine relevancy of the prior art reference to the patent matter, wherein relevancy is inversely proportional to the calculated number of portfolios in the citation chain, the association date, and a mapping status indicator selected at least in part based on a document type of the prior art reference.

9. The system of claim 8, further comprising instructions to:
identify a second patent portfolio with a common patent matter of the patent portfolio.

10. The system of claim 9, further comprising instructions to:
add an association between the prior art reference and each patent matter of the second patent portfolio;
record an association date for the association between the prior art reference and each patent matter of the second patent portfolio.

11. The system of claim 10 comprising instructions to:
update the display with a propagation level in relation to the prior art reference for each patent matter in the patent portfolio and each patent matter in the second patent portfolio, wherein the propagation level is based on propagation hops between the source patent matter and a respective patent matter.

12. The system of claim 8, further comprising instructions to:
provide a submission status indicator for each patent matter in the patent portfolio in relation to the prior art reference, wherein the submission status indicator indicates a submission status of the prior art reference to a national patent office.

13. The system of claim 8, further comprising instructions to:
provide an indication of a ground of rejection on which the prior art reference was cited by a national patent office to reject claims of at least one patent matter contained in the patent portfolio.

14. The system of claim 8, further comprising instructions to:
provide a citation source indication for the prior art reference.

15. At least one non-transitory machine-readable medium including instructions for managing prior art that, when executed by at least one processor, causes the at least one processor to perform operations to:
identify a source patent matter in a patent portfolio;
obtain a document associated with the source patent matter;
assign an applicable prior art status value to the document based on an evaluation of document data of the document;
classify the document as a prior art reference based on the applicable prior art status value;
and a prior art reference associated with the source patent matter;
convert the patent portfolio into a first prior art portfolio;
add an association between the prior art reference and the first prior art portfolio;
record an association date for the association between the prior art reference and the source patent matter of the first prior art portfolio, wherein the association date is a date when the prior art reference was first cited in the source patent of the first prior art portfolio;
determine a citation chain between the source patent matter and a second patent matter, wherein the citation chain identifies successive levels of prior art reference flow from the source patent matter through one or more intermediate prior art portfolios to the second patent matter;

cause the prior art reference to automatically flow to a second prior art portfolio, the second prior art portfolio including at least one common patent matter with the first prior art portfolio;

determine an application status for a patent matter;

cause the prior art reference to flow to the patent matter based on the application status;

track a flow level indicator for each prior art portfolio in the citation chain, wherein the flow level indicator designates a successive generation level of prior art reference flow from the source patent matter, wherein a flow level of zero is assigned to the source patent matter, a flow level of one is assigned to prior art references flowing to other patent matters in the first prior art portfolio, and a flow level of two or higher is assigned to prior art references flowing to patent matters in the second prior art portfolio; and provide, in a display, a flow level indicator generated by calculating a number of prior art portfolios in the citation chain based on the tracked flow level indicators to determine relevancy of the prior art reference to the patent matter, wherein relevancy is inversely proportional to the calculated number of portfolios in the citation chain, the association date, and a mapping status indicator selected at least in part based on a document type of the prior art reference.

16. The at least one non-transitory machine-readable medium of claim 15, further comprising instructions to:
identify a second patent portfolio with a common patent matter of the patent portfolio.

17. The at least one non-transitory machine-readable medium of claim 16, further comprising instructions to:
add an association between the prior art reference and each patent matter of the second patent portfolio;
record an association date for the association between the prior art reference and each patent matter of the second patent portfolio.

18. The at least one non-transitory machine-readable medium of claim 17 comprising instructions to:
update the display with a propagation level in relation to the prior art reference for each patent matter in the patent portfolio and each patent matter in the second patent portfolio, wherein the propagation level is based on propagation hops between the source patent matter and a respective patent matter.

19. The at least one non-transitory machine-readable medium of claim 15, further comprising instructions to:
provide a submission status indicator for each patent matter in the patent portfolio in relation to the prior art reference, wherein the submission status indicator indicates a submission status of the prior art reference to a national patent office.

20. The at least one non-transitory machine-readable medium of claim 15, further comprising instructions to:
provide an indication of a ground of rejection on which the prior art reference was cited by a national patent office to reject claims of at least one patent matter contained in the patent portfolio.

* * * * *